United States Patent
Inoue et al.

(10) Patent No.: US 9,868,484 B2
(45) Date of Patent: Jan. 16, 2018

(54) STRADDLED VEHICLE

(71) Applicant: YAMAHA HATSUDOKI KABUSHIKI KAISHA, Iwata-shi, Shizuoka-ken (JP)

(72) Inventors: Takehiro Inoue, Iwata (JP); Yutaka Kubo, Iwata (JP); Takeshi Ikeda, Iwata (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 14/896,372

(22) PCT Filed: Jun. 11, 2015

(86) PCT No.: PCT/JP2015/002949
§ 371 (c)(1),
(2) Date: Dec. 17, 2015

(87) PCT Pub. No.: WO2015/190114
PCT Pub. Date: Dec. 17, 2015

(65) Prior Publication Data
US 2016/0221626 A1 Aug. 4, 2016

(30) Foreign Application Priority Data

Jun. 11, 2014 (JP) .................... 2014-120235
Jun. 11, 2014 (JP) .................... 2014-120236
Dec. 18, 2014 (JP) .................... 2014-256393

(51) Int. Cl.
B62J 6/02 (2006.01)
B60Q 1/00 (2006.01)
(Continued)

(52) U.S. Cl.
CPC .............. B62J 6/02 (2013.01); B60Q 1/0035 (2013.01); B60Q 1/0041 (2013.01);
(Continued)

(58) Field of Classification Search
CPC ... B62J 6/02; B62J 17/02; B62J 99/00; B62K 21/02; B62K 21/12; B62K 21/26; F21S 48/12
(Continued)

(56) References Cited

U.S. PATENT DOCUMENTS

2003/0142502 A1* 7/2003 Kawai .................... B62J 6/02
362/475
2005/0083703 A1* 4/2005 Nakayama ............. B62J 6/18
362/473
(Continued)

FOREIGN PATENT DOCUMENTS

JP S6429041 U 2/1989
JP 2009-173220 A 8/2009
(Continued)

Primary Examiner — Jacob B Knutson
(74) Attorney, Agent, or Firm — Rabin & Berdo, P.C.

(57) ABSTRACT

An increase in the size of a body section of a straddled vehicle forward of a steering shaft in a left-right direction and a front-rear direction of a body frame is limited while a space is secured forward of the steering shaft. In left optical lens body 45L, top end TE is disposed below bottom edge B3 of handlebar 23, bottom end BE is disposed above a bottom end (virtual line Lc) of lower bracket 15, left end LE is disposed on the right of a right end (virtual line L6) of left grip 24L, and right end RE is disposed on the left of right edge B1 of left front-wheel support unit 12L. In right optical lens body 45R, top end TE is disposed below bottom edge B3 of handlebar 23, bottom end BE is disposed above the bottom end of lower bracket 15, right end RE is disposed on the left of a left end of right grip 24R, and left end LE is disposed on the right of left edge B2 of right front-wheel support unit 12R.

16 Claims, 46 Drawing Sheets

(51) Int. Cl.
- *B60Q 1/04* (2006.01)
- *F21S 8/10* (2006.01)
- *B62J 17/02* (2006.01)
- *B62J 99/00* (2009.01)
- *B62K 21/02* (2006.01)
- *B62K 21/12* (2006.01)
- *B62K 21/26* (2006.01)

(52) U.S. Cl.
CPC ............ *B60Q 1/0483* (2013.01); *B62J 17/02* (2013.01); *B62J 99/00* (2013.01); *B62K 21/02* (2013.01); *B62K 21/12* (2013.01); *B62K 21/26* (2013.01); *F21S 48/1154* (2013.01); *F21S 48/1159* (2013.01); *F21S 48/12* (2013.01); *F21S 48/1258* (2013.01); *F21S 48/328* (2013.01); *B62J 2099/004* (2013.01)

(58) Field of Classification Search
USPC ....... 362/473, 475, 476, 487, 506, 507, 538, 362/268, 543; 280/279
See application file for complete search history.

(56) References Cited

U.S. PATENT DOCUMENTS

| | | | |
|---|---|---|---|
| 2007/0069580 A1* | 3/2007 | Ohshio | F21S 48/1388 307/10.8 |
| 2008/0112174 A1* | 5/2008 | Nakano | B60Q 1/12 362/466 |
| 2010/0096829 A1 | 4/2010 | Nagao et al. | |
| 2013/0163263 A1* | 6/2013 | Kouchi | B62J 6/02 362/476 |
| 2013/0241413 A1* | 9/2013 | Ooba | B60Q 1/0041 315/82 |
| 2014/0003078 A1* | 1/2014 | Monma | B62J 6/02 362/516 |
| 2014/0268837 A1* | 9/2014 | Simchak | B60Q 1/12 362/465 |

FOREIGN PATENT DOCUMENTS

| | | |
|---|---|---|
| JP | 2013-129282 A | 7/2013 |
| JP | 2013-151179 A | 8/2013 |
| JP | 2013-193594 A | 9/2013 |
| WO | WO-2012/086626 A1 | 6/2012 |

\* cited by examiner

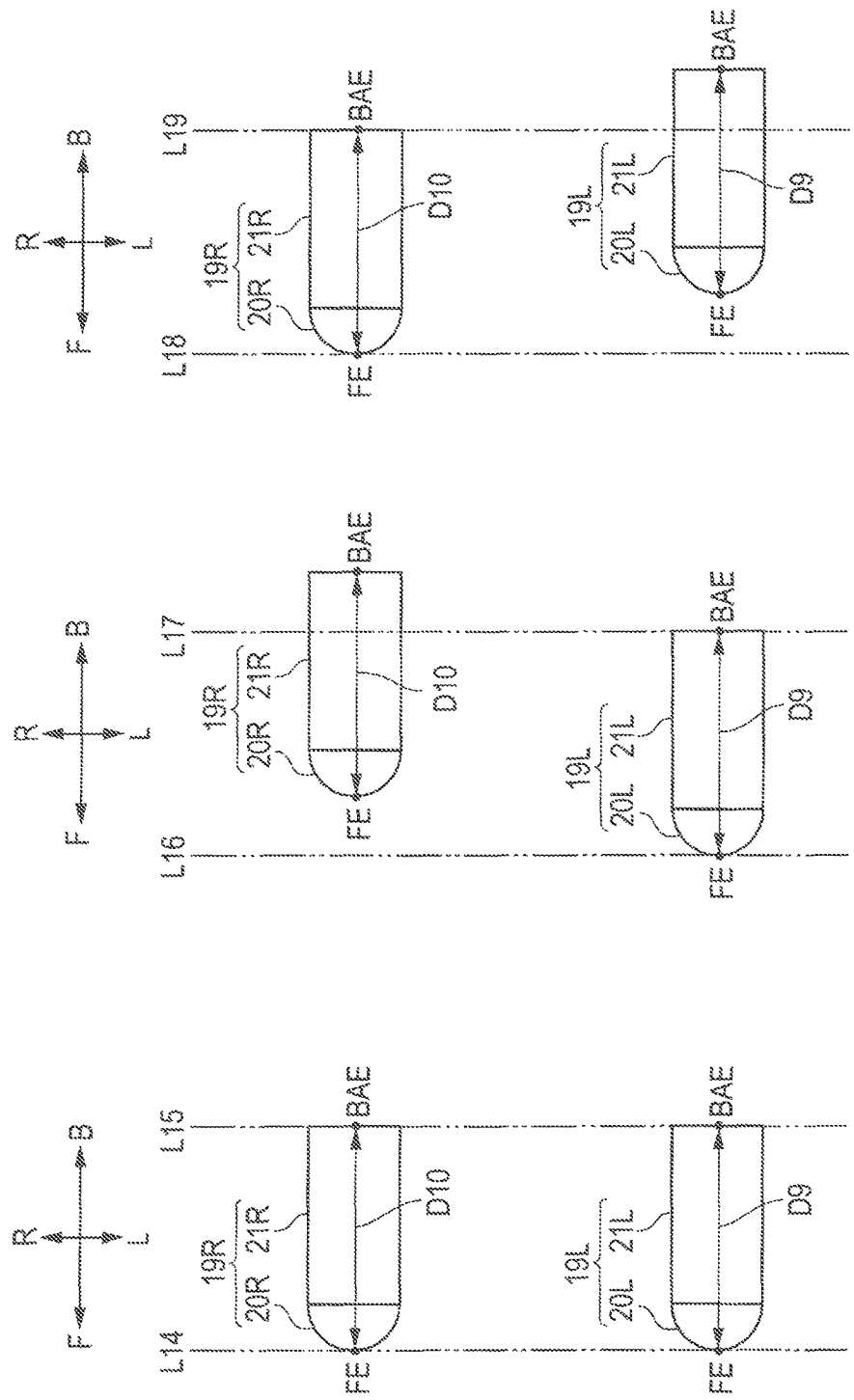

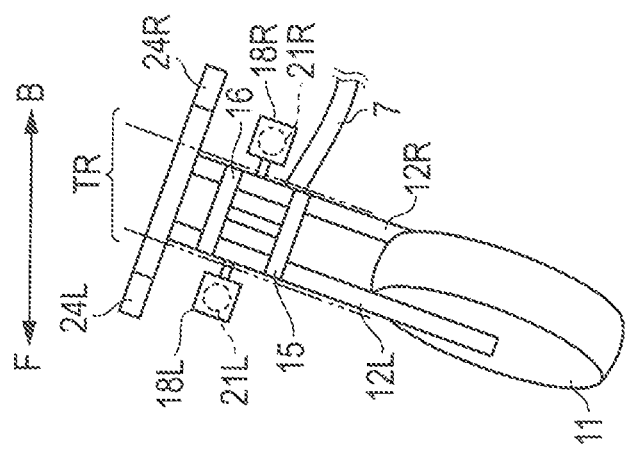
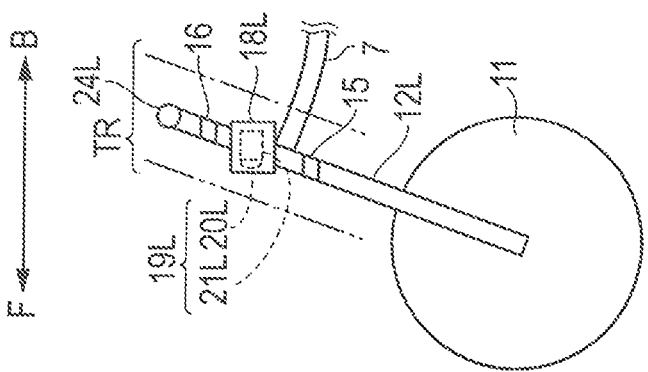
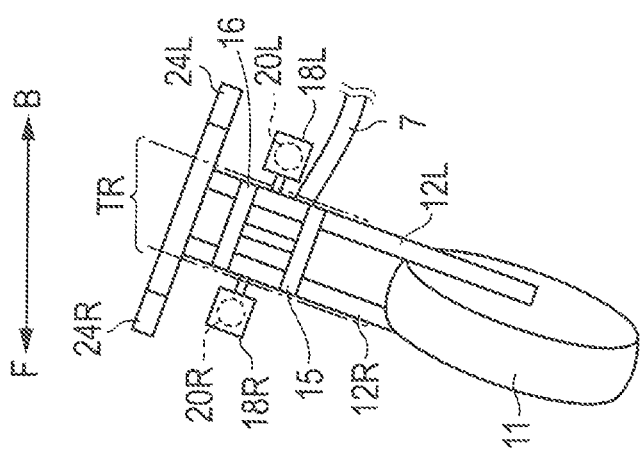
FIG. 14C
FIG. 14B
FIG. 14A

STRADDLED VEHICLE

TECHNICAL FIELD

The present invention relates to a straddled vehicle.

BACKGROUND ART

Patent literature (hereinafter referred to as "PTL") 1 discloses a straddled vehicle including: two highly-directional light units disposed on the left of a center of a body frame; and two highly-directional light units disposed on the right of the center of the body frame as viewed from a front in a front-rear direction of the body frame.

The highly-directional light units each include a light-emitting section that emits highly-directional light and an optical lens section that refracts the light from the light-emitting section and generates light distribution. The light distribution formed by the optical lens section constitutes at least part of a light distribution of a main beam or dipped beam of the straddled vehicle. Such a highly-directional light unit is attached to a casing to form a lamp unit.

The straddled vehicle disclosed in PTL 1 includes a body frame, a left front-wheel support unit, a right front-wheel support unit, an upper bracket, and a lower bracket. The left front-wheel support unit includes: a left upper member supported by the body frame; and a left lower member that supports the front wheel and is displaceable with respect to the left upper member in the up-down direction, while the left front-wheel support unit is located on the left of the steering shaft in the left-right direction of the body frame. The right front-wheel support unit includes a right upper member supported by the body frame and a bottom right member that supports the front wheel and is displaceable with respect to right upper member in the up-down direction, while the right front-wheel support unit is located on the right of the steering shaft in the left-right direction of the body frame. The lamp unit including four highly-directional light units is disposed within a range surrounded by the left front-wheel support unit, the right front-wheel support unit, the upper bracket and the lower bracket as viewed from the front of the body frame in the front-rear direction.

CITATION LIST

Patent Literature

PTL 1
Japanese Patent Application Laid-Open No. 2013-129282

SUMMARY OF INVENTION

Technical Problem

In the straddled vehicle disclosed in PTL 1, the lamp unit including the four highly-directional light units is disposed forward of the steering shaft. The lamp unit is disposed within a range surrounded by the left front-wheel support unit, the right front-wheel support unit, the upper bracket, and lower bracket as viewed from the front of the body frame in the front-rear direction. This provides a very compact configuration in the left-right direction of the body frame.

However, the straddled vehicle includes several parts such as a brake hose and wire harness disposed between the steering shaft and the lamp unit.

For this reason, in the straddled vehicle disclosed in PTL 1, the lamp unit is provided at a position forward of and spaced apart from the steering shaft in the front-rear direction of the body frame. As a result, the body portion of the straddled vehicle forward of the steering shaft increases in size in the front-rear direction of the body frame.

An object of the present invention is to provide a straddled vehicle capable of securing space forward of the steering shaft while limiting an increase in the size of the body portion of the straddled vehicle forward of the steering shaft in the left-right direction and the front-rear direction of the body frame.

Solution to Problem

A straddled vehicle according to an aspect of the present invention (hereinafter, referred to as "straddled vehicle of a first aspect") includes: a body frame; a front wheel portion; a steering shaft turnably supported by the body frame; an upper bracket having a central portion that is disposed at an upper portion of the steering shaft; a lower bracket having a central portion that is disposed at a lower portion of the steering shaft; a left front-wheel support unit disposed on the left of the steering shaft in a left-right direction of the body frame, the left front-wheel support unit including: a left upper member supported by a left portion of the upper bracket and a left portion of the lower bracket; and a left lower member that supports the front wheel portion and that is displaceable in an up-down direction with respect to the left upper member, the left front-wheel support unit turning integrally with the steering shaft; a right front-wheel support unit disposed on the right of the steering shaft in the left-right direction of the body frame, the right front-wheel support unit including: a right upper member supported by a right portion of the upper bracket and a right portion of the lower bracket; and a right lower member that supports the front wheel portion and that is displaceable in an up-down direction with respect to the right upper member, the right front-wheel support unit turning integrally with the steering shaft; a handlebar disposed at an upper part of the steering shaft, the handlebar being configured to turn integrally with the steering shaft and being long in the left-right direction of the body frame; a left grip disposed at a left portion of the handlebar; a right grip disposed at a right portion of the handlebar; a left light group that includes at least one or more highly-directional light units each including: a light-emitting section that emits highly-directional light; and an optical lens section that refracts light of the light-emitting section and forms at least part of a light distribution of a main beam or a dipped beam, the left light group being disposed on the left of the steering shaft in the left-right direction of the body frame; and a right light group that includes at least the one or more highly-directional light units, the right light group being disposed on the right of the steering shaft in the left-right direction of the body frame, in which, in the left light group, a top end portion of a left optical lens body composed of the optical lens section of the highly-directional light unit included in the left light group is disposed below a bottom edge of the handlebar in the up-down direction of the body frame as viewed from a front of the body frame in a front-rear direction, a bottom end portion of the left optical lens body is disposed above a bottom end portion of the lower bracket in the up-down direction of the body frame as viewed from the front of the body frame in the front-rear direction, a left end portion of the left optical lens body is disposed on the right of a right end portion of the left grip in the left-right direction of the body frame as viewed from the front of the body frame in the front-rear direction, a right end portion of the left optical lens body is disposed on the left of a right edge of the left front-wheel support unit in the left-right direction of the body frame as viewed from the front of the body frame in the front-rear direction, at least part of the left light group is disposed at a position overlapping with a turn range of the left front-wheel support unit as viewed from the left of the left-right direction of the body frame, in the right light group, a top end portion of a right optical lens body composed of the optical lens section of the highly-directional light unit included in the right light group is disposed below a bottom edge of the handlebar in the up-down direction of the body frame as viewed from the front of the body frame in the front-rear direction, a bottom end portion of the right optical lens body is disposed above a bottom end portion of the lower bracket in the up-down direction of the body frame as viewed from the front of the body frame in the front-rear direction, a right end portion of the right optical lens body is disposed on the left of a left end portion of the right grip in the left-right direction of the body frame as viewed from the front of the body frame in the front-rear direction, a left end portion of the right optical lens body is disposed on the right of a left edge of the right front-wheel support unit in the left-right direction of the body frame as viewed from the front of the body frame in the front-rear direction, and at least part of the right light group is disposed at a position overlapping with a turn range of the right front-wheel support unit as viewed from the right of the left-right direction of the body frame.

According to the straddled vehicle of the first aspect, each of the highly-directional light units includes: the light emitting section that emits highly-directional light; and the optical lens section that refracts the light from the light emitting section to form the light distribution of at least part of the main beam or the dipped beam. Therefore, each of the highly-directional light units is compact. The straddled vehicle includes: the left light group including at least one or more highly-directional light units, the left light group provided on the left of the steering shaft in the left-right direction of the body frame; and the right light group including at least one or more highly-directional light units, the right light group disposed on the right of the steering shaft in the left-right direction of the body frame. As described, the inventors have arrived at a technical concept of considering and disposing the left light group and the right light group including the compact highly-directional light units as left and right separate lamp units, instead of a technical concept of disposing the left light group and the right light group as an integrated lamp unit.

Considering separate lamp units, a possible location to dispose the units was investigated in the straddled vehicle including the body frame, the one front wheel portion, the steering shaft, the upper bracket, the lower bracket, the left front-wheel support unit and the right front-wheel support unit that turn integrally with the steering shaft, the handlebar that is long in the left-right direction of the body frame, the left grip, and the right grip. It has been found that since the highly-directional light units are compact, the highly-directional light units can be separately disposed in a space on the left of the left front-wheel support unit that turns integrally with the steering shaft and on the right of the left grip and in a space on the right of the right front-wheel support unit and on the left of the right grip. The highly-directional light units include: the light emitting section that emits highly-directional light; and the optical lens section that refracts the light from the light emitting section to form the light distribution of at least part of the main beam or the dipped beam. It has been found, therefore, that the light distribution of at least part of the main beam or the dipped beam can be formed even if the highly-directional light units are separately disposed on the left of the left front-wheel support unit and on the right of the right front-wheel support unit that turn integrally with the steering shaft.

Therefore, as viewed from the front side in the front-rear direction of the body frame, the top end portion of the left optical lens body is disposed below the bottom edge of the handlebar in the up-down direction of the body frame, the bottom end portion of the left optical lens body is disposed above the bottom end portion of the lower bracket in the up-down direction of the body frame, the left end portion of the left optical lens body is disposed on the right of the right end portion of the left grip in the left-right direction of the body frame, the right end portion of the left optical lens body is disposed on the left of the right edge of the left front-wheel support unit in the left-right direction of the body frame, and at least part of the left light group is disposed at a position overlapping with the turn range of the left front-wheel support unit as viewed from the left side in the left-right direction of the body frame. As viewed from the front side in the front-rear direction of the body frame, the top end portion of the right optical lens body is disposed below the bottom edge of the handlebar in the up-down direction of the body frame, the bottom end portion of the right optical lens body is disposed above the bottom end portion of the lower bracket in the up-down direction of the body frame, the right end portion of the right optical lens body is disposed on the left of the left end portion of the right grip in the left-right direction of the body frame, the left end portion of the right optical lens body is disposed on the right of the left edge of the right front-wheel support unit in the left-right direction of the body frame, and at least part of the right light group is disposed at a position overlapping the turn range of the right front-wheel support unit as viewed from the right side in the left-right direction of the body frame. As a result, an increase in the size of the body section of the straddled vehicle forward of the steering shaft in the left-right direction and the front-rear direction of the body frame can be limited while a space can be secured forward of the steering shaft.

Furthermore, the following aspects can also be adopted in the present invention.

A straddled vehicle according to a second aspect is the straddled vehicle according to the first aspect, in which a maximum lens width of the optical lens section of the highly-directional light unit of the left light group in the left-right direction is shorter than a length between a left edge of the left front-wheel support unit and a right end portion of the left grip in the left-right direction of the body frame as viewed from the front in the front-rear direction of the body frame, and a maximum lens width of the optical lens section of the highly-directional light unit of the right light group in the left-right direction is shorter than a length between a right edge of the right front-wheel support unit and a left end portion of the right grip in the left-right direction of the body frame as viewed from the front in the front-rear direction of the body frame.

According to the second aspect, the highly-directional light units of the left light group and the highly-directional light units of the right light group are compactly disposed in the left-right direction of the body frame as viewed from the front in the front-rear direction of the body frame. Therefore, according to the second aspect, an increase in the size of the body section of the straddled vehicle forward of the steering shaft in the left-right direction and the front-rear direction of the body frame can be limited while a space can be secured forward of the steering shaft.

A straddled vehicle according to a third aspect is the straddled vehicle according to the first aspect, in which a length between the left end portion of the left optical lens body and the right end portion of the left optical lens body in the left-right direction of the body frame is shorter than a length between a left edge of the left front-wheel support unit and the right end portion of the left grip in the left-right direction of the body frame as viewed from the front in the front-rear direction of the body frame, and a length between the right end portion of the right optical lens body and the left end portion of the right optical lens body in the left-right direction of the body frame is shorter than a length between a right edge of the right front-wheel support unit and the left end portion of the right grip in the left-right direction of the body frame as viewed from the front in the front-rear direction of the body frame.

According to the third aspect, the plurality of highly-directional light units of the left light group and the plurality of highly-directional light units of the right light group are more compactly disposed in the left-right direction of the body frame than in the up-down direction of the body frame as viewed from the front in the front-rear direction of the body frame. Therefore, according to the third aspect, an increase in the size of the body section of the straddled vehicle forward of the steering shaft in the left-right direction and the front-rear direction of the body frame can be limited while a space can be secured forward of the steering shaft.

A straddled vehicle according to a fourth aspect is the straddled vehicle according to the first aspect, in which, as viewed from the front of the body frame in the front-rear direction, at least part of the left optical lens body is disposed below the top end portion of the right optical lens body in the up-down direction of the body frame and above the bottom end portion of the right optical lens body in the up-down direction of the body frame.

According to the fourth aspect, since the left optical lens body and the right optical lens body are arranged in a compact form in the up-down direction of the body frame, which prevents an increase in the size of the straddled vehicle in the up-down direction of the body frame. Thus, according to the fourth aspect, it is possible to secure a space forward of the steering shaft while limiting an increase in the size of the body portion of the straddled vehicle forward of the steering shaft in the left-right direction and the front-rear direction of the body frame.

A straddled vehicle according to a fifth aspect is the straddled vehicle according to the first aspect, in which, as viewed from the front of the body frame in the front-rear direction, at least part of the optical lens section of the highly-directional light unit in the left right group is disposed below a top end portion of the optical lens section of the highly-directional light unit in the right light group in the up-down direction of the body frame and above a bottom end portion of the optical lens section of the highly-directional light unit in the right light group in the up-down direction of the body frame.

According to the fifth aspect, the highly-directional light unit of the left light group and the highly-directional light unit of the right light group are disposed at the same position in the up-down direction of the body frame, the highly-directional light unit of the left light group is disposed in a range so as not to be separated by more than the maximum lens width in the up-down direction of the optical lens section of the highly-directional light unit of the right light group in the up-down direction of the body frame, or the highly-directional light unit of the right light group is disposed in a range so as not to be separated by more than the maximum lens width in the up-down direction of the optical lens section of the highly-directional light unit of the left light group in the up-down direction of the body frame, as viewed from the front side in the front-rear direction of the body frame. Thus, according to the fifth aspect, it is possible to secure a space forward of the steering shaft while limiting an increase in the size of the body portion of the straddled vehicle forward of the steering shaft in the left-right direction and the front-rear direction of the body frame.

A straddled vehicle according to a sixth aspect is the straddled vehicle according to the first aspect, in which as viewed from above the body frame in the up-down direction of the body frame, at least part of the highly-directional light unit in the left light group is disposed behind a front end portion of the highly-directional light unit in the right light group in the front-rear direction of the body frame and forward of a rear end portion of the highly-directional light unit in the right light group in the front-rear direction of the body frame.

According to the sixth aspect, the highly-directional light unit of the left light group and the highly-directional light unit of the right light group are disposed at the same position in the front-rear direction of the body frame, the highly-directional light unit of the left light group is disposed in a range so as not to be separated by more than the length in the front-rear direction of the highly-directional light unit of the right light group in the front-rear direction of the body frame, or the highly-directional light unit of the right light group is disposed in a range so as not to be separated by more than the length in the front-rear direction of the highly-directional light unit of the left light group in the front-rear direction of the body frame, as viewed from above in the up-down direction of the body frame. Thus, according to the sixth aspect, it is possible to secure a space forward of the steering shaft while limiting an increase in the size of the body portion of the straddled vehicle forward of the steering shaft in the left-right direction and the front-rear direction of the body frame.

A straddled vehicle according to a seventh aspect is the straddled vehicle according to the first aspect, in which, in a case where a straight line passing through a center of the body frame in the up-down direction of the body frame is set to be a center virtual line, a length from a center of the optical lens section of the highly-directional light unit in the left light group to the center virtual line is greater than a length from a left end portion of the optical lens section of the highly-directional light unit in the right light group to the center virtual line and smaller than a length from a right end portion of the optical lens section of the highly-directional light unit in the right light group to the center virtual line as viewed from the front in the front-rear direction of the body frame, and a length from a center of the optical lens section of the highly-directional light unit in the right light group to the center virtual line is greater than a length from a right end portion of the optical lens section of the highly-directional light unit in the left light group to the center virtual line and smaller than a length from a left end portion of the optical lens section of the highly-directional light unit in the left light group to the center virtual line as viewed from the front in the front-rear direction of the body frame.

According to the seventh aspect, the highly-directional light unit of the left light group is disposed in a range so as not to be separated by more than ½ of the maximum lens width in the left-right direction of the optical lens section of the highly-directional light unit of the right light group in the left-right direction of the body frame, or highly-directional light unit R of the right light group is disposed in a range so as not to be by more than ½ of the maximum lens width in the left-right direction of the optical lens section of the highly-directional light unit of the left light group in the left-right direction of the body frame, as viewed from the front side in the front-rear direction of the body frame. Thus, according to the seventh aspect, it is possible to secure a space forward of the steering shaft while limiting an increase in the size of the body portion of the straddled vehicle forward of the steering shaft in the left-right direction and the front-rear direction of the body frame.

According to the fifth to the seventh aspects, the highly-directional light unit of the left light group and the highly-directional light unit of the right light group are symmetrically disposed or substantially symmetrically disposed as viewed from the front side in the front-rear direction of the body frame and as viewed from above in the up-down direction of the body frame.

A straddled vehicle according to an eighth aspect is the straddled vehicle according to the first aspect, in which, at least one of the highly-directional light units in the left light group is supported by the left front-wheel support unit, and at least one of the highly-directional light units in the right light group is supported by the right front-wheel support unit.

According to the eighth aspect, a space for attaching the highly-directional light units can be easily secured. The eighth aspect can prevent the light emitted outside from the optical lens sections of the highly-directional light units from interfering with the left front-wheel support unit, the right front-wheel support unit, or the arms of the rider. Therefore, according to the eighth aspect, an increase in the size of the body section of the straddled vehicle forward of the steering shaft in the left-right direction and the front-rear direction of the body frame can be limited while a space can be secured forward of the steering shaft.

A straddled vehicle according to a ninth aspect is the straddled vehicle according to the first aspect, further including: a left cover section that covers at least the left side of the body frame; and a right cover section that covers at least the right side of the body frame, in which at least one of the highly-directional light units in the left light group is supported by the left cover section, and at least one of the highly-directional light units in the right light group is supported by the right cover section.

According to the ninth aspect, the design freedom of the highly-directional light units can be improved by using the left cover section and the right cover section to attach the highly-directional light units. According to the ninth aspect, the highly-directional light units included in the left light group and the right light group are disposed in the turn range of the left front-wheel support unit and the turn range of the right front-wheel support unit and are not disposed apart from the ranges on the front side in the front-rear direction of the body frame or on the rear side in the front-rear direction of the body frame. This can prevent the light emitted outside from the optical lens sections from interfering with the left front-wheel support unit or the right front-wheel support unit. Therefore, according to the ninth aspect, an increase in the size of the body section of the straddled vehicle forward of the steering shaft in the left-right direction and the front-rear direction of the body frame can be limited while a space can be secured forward of the steering shaft.

A straddled vehicle according to a tenth aspect is the straddled vehicle according to the first aspect, in which a length between the top end portion of the left optical lens body and the bottom end portion of the left optical lens body in the up-down direction of the body frame is longer than a length between the left end portion of the left optical lens body and the right end portion of the left optical lens body in the left-right direction of the body frame, and a length between the top end portion of the right optical lens body and the bottom end portion of the right optical lens body in the up-down direction of the body frame is longer than a length between the right end portion of the right optical lens body and the left end portion of the right optical lens body in the left-right direction of the body frame.

According to the tenth aspect, the highly-directional light unit located at the leftmost position in the left-right direction of the body frame and the highly-directional light unit located at the rightmost position in the left-right direction of the body frame in the left light group are more compactly disposed in the left-right direction of the body frame, and the straddled vehicle is not enlarged in the left-right direction of the body frame. The highly-directional light unit located at the rightmost position in the left-right direction of the body frame and the highly-directional light unit located at the leftmost position in the left-right direction of the body frame in the right light group are more compactly disposed in the left-right direction of the body frame, and the straddled vehicle is not enlarged in the left-right direction of the body frame. Therefore, according to the tenth aspect, an increase in the size of the body section of the straddled vehicle forward of the steering shaft in the left-right direction and the front-rear direction of the body frame can be limited while a space can be secured forward of the steering shaft.

A straddled vehicle according to an eleventh aspect is the straddled vehicle according to the first aspect, in which the left light group includes two of the highly-directional light units that form a light distribution formed by the optical lens sections to become at least part of a light distribution of a main beam and the right light group includes two of the highly-directional light units that form a light distribution formed by the optical lens sections to become at least part of a light distribution of a dipped beam, or the left light group includes two of the highly-directional light units that form a light distribution formed by the optical lens sections to become at least part of a light distribution of a dipped beam and the right light group includes two of the highly-directional light units that form a light distribution formed by the optical lens sections to become at least part of a light distribution of a main beam.

According to the eleventh aspect, two highly-directional light units that form a light distribution formed by the optical lens sections to become at least part of a light distribution of a main beam and two highly-directional light units that form a light distribution formed by the optical lens sections to become at least part of a light distribution of a dipped beam can be separately disposed in the left-right direction of the body frame. Therefore, according to the eleventh aspect, an increase in the size of the body section of the straddled vehicle forward of the steering shaft in the left-right direction and the front-rear direction of the body frame can be limited while a space can be secured forward of the steering shaft.

A straddled vehicle according to a twelfth aspect is the straddled vehicle according to the first aspect, in which the left light group includes one of the highly-directional light units that forms a light distribution formed by the optical lens section to become at least part of a light distribution of a main beam and one of the highly-directional light units that forms a light distribution formed by the optical lens section to become at least part of a light distribution of a dipped beam, and the right light group includes one of the highly-directional light units that forms a light distribution formed by the optical lens section to become at least part of a light distribution of a main beam and one of the highly-directional light units that forms a light distribution formed by the optical lens section to become at least part of a light distribution of a dipped beam.

According to the twelfth aspect, one highly-directional light unit that forms a light distribution formed by the optical lens section to become at least part of a light distribution of a main beam and one highly-directional light unit that forms a light distribution formed by the optical lens section to become at least part of a light distribution of a dipped beam, and the right light group includes one of the highly-directional light units that forms a light distribution formed by the optical lens section to become at least part of a light distribution of a main beam and one of the highly-directional light units that forms a light distribution formed by the optical lens section to become at least part of a light distribution of a dipped beam can be disposed in the left-right direction of the body frame. Therefore, according to the twelfth aspect, an increase in the size of the body section of the straddled vehicle forward of the steering shaft in the left-right direction and the front-rear direction of the body frame can be limited while a space can be secured forward of the steering shaft.

A straddled vehicle according to a thirteenth aspect is the straddled vehicle according to the first aspect, further including a front surface cover that covers, in the front-rear direction of the body frame, a front side of at least part of an area between the right edge of the left front-wheel support unit and the left edge of the right front-wheel support unit and between a bottom end portion of the upper bracket and a top end portion of the lower bracket as viewed from the front side in the front-rear direction of the body frame.

According to the thirteenth aspect, an increase in the size of the body section of the straddled vehicle forward of the steering shaft in the left-right direction and the front-rear direction of the body frame can be limited, and the front side of the space in the front-rear direction of the body frame secured forward of the steering shaft can be covered.

A straddled vehicle according to a fourteenth aspect is the straddled vehicle according to the first aspect, at least part of an electric and/or electronic part other than the highly-directional light units, a throttle wire, a brake wire, a brake hose, a clutch wire, a wire harness and a key cylinder is disposed between a left virtual line passing through right end portions of the optical lens sections of the plurality of highly-directional light units located in the up-down direction of the body frame in the left light group and a right virtual line passing through left end portions of the optical lens sections of the plurality of highly-directional light units located in the up-down direction of the body frame in the right light group as viewed from the front of the body frame in the front-rear direction and behind a front end of the left light group and the right light group in the front-rear direction of the body frame and forward of a rear end of the left light group and the right light group in the front-rear direction of the body frame as viewed from above in the up-down direction of the body frame.

A straddled vehicle according to a fifteenth aspect is the straddled vehicle according to the first aspect, the highly-directional light unit is a module including one of the light emitting sections and one of the optical lens sections.

According to the fifteenth aspect, one light-emitting section and one optical lens section are modularized, which facilitates assembly into the vehicle body and allows the highly-directional light unit to be disposed in a compact form. Thus, according to the fifteenth aspect, it is possible to secure a space forward of the steering shaft while limiting an increase in the size of the body portion of the straddled vehicle forward of the steering shaft in the left-right direction and the front-rear direction of the body frame.

Advantageous Effects of Invention

According to the present invention, it is possible to secure a space forward of the steering shaft while limiting an increase in the size of the body portion of the straddled vehicle forward of the steering shaft in the left-right direction and the front-rear direction of the body frame.

BRIEF DESCRIPTION OF DRAWINGS

FIGS. 12A to 12C are diagrams describing examples of front-rear direction symmetrical conditions of the leftward highly-directional light unit and the rightward highly-directional light unit according to Embodiment 1 of the present invention;

FIGS. 14A to 14C are diagrams describing side-view arrangement conditions of the leftward highly-directional light unit and the rightward highly-directional light unit according to Embodiment 1 of the present invention;

DESCRIPTION OF EMBODIMENTS

Figure 1:
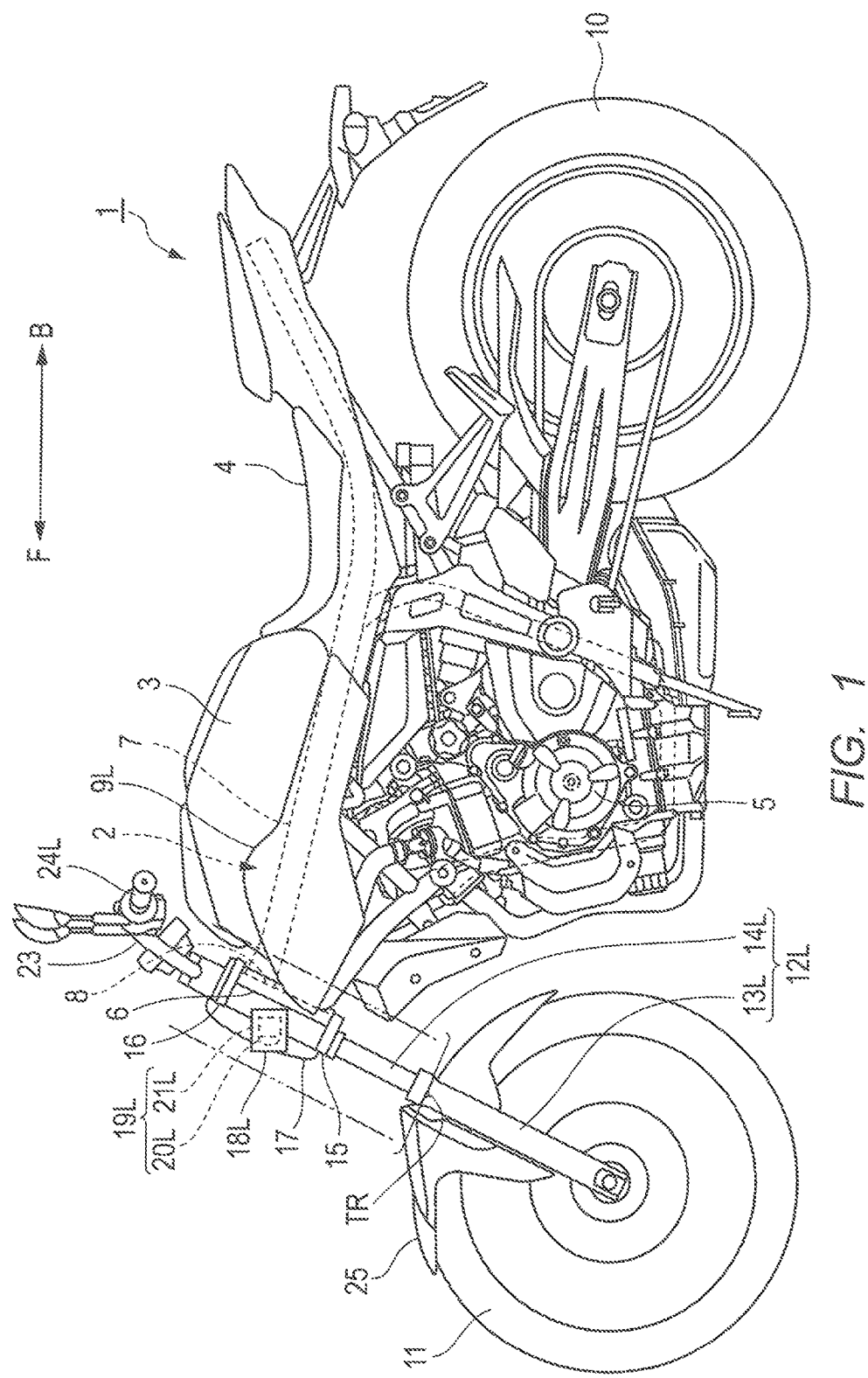
FIG. 1 is a side view illustrating a straddled vehicle according to Embodiment 1 of the present invention.

Hereinafter, embodiments of the present invention will be described with reference to the accompanying drawings.

Definitions of Directions

Hereinafter, the arrows described in the drawings are defined as follows. Arrow F denotes a front direction of the straddled vehicle in the front-rear direction of the body frame. Arrow B denotes a back direction of the straddled vehicle in the front-rear direction of the body frame. Arrow U denotes an up-direction of the straddled vehicle in the up-down direction of the body frame. Arrow D denotes a down-direction of the straddled vehicle in the up-down direction of the body frame. Arrow R denotes a right direction of the straddled vehicle in the left-right direction of the body frame. Arrow L denotes a left direction of the straddled vehicle in the left-right direction of the body frame.

Embodiment 1

Straddled vehicle 1 according to Embodiment 1 of the present invention will be described.

Figure 2:
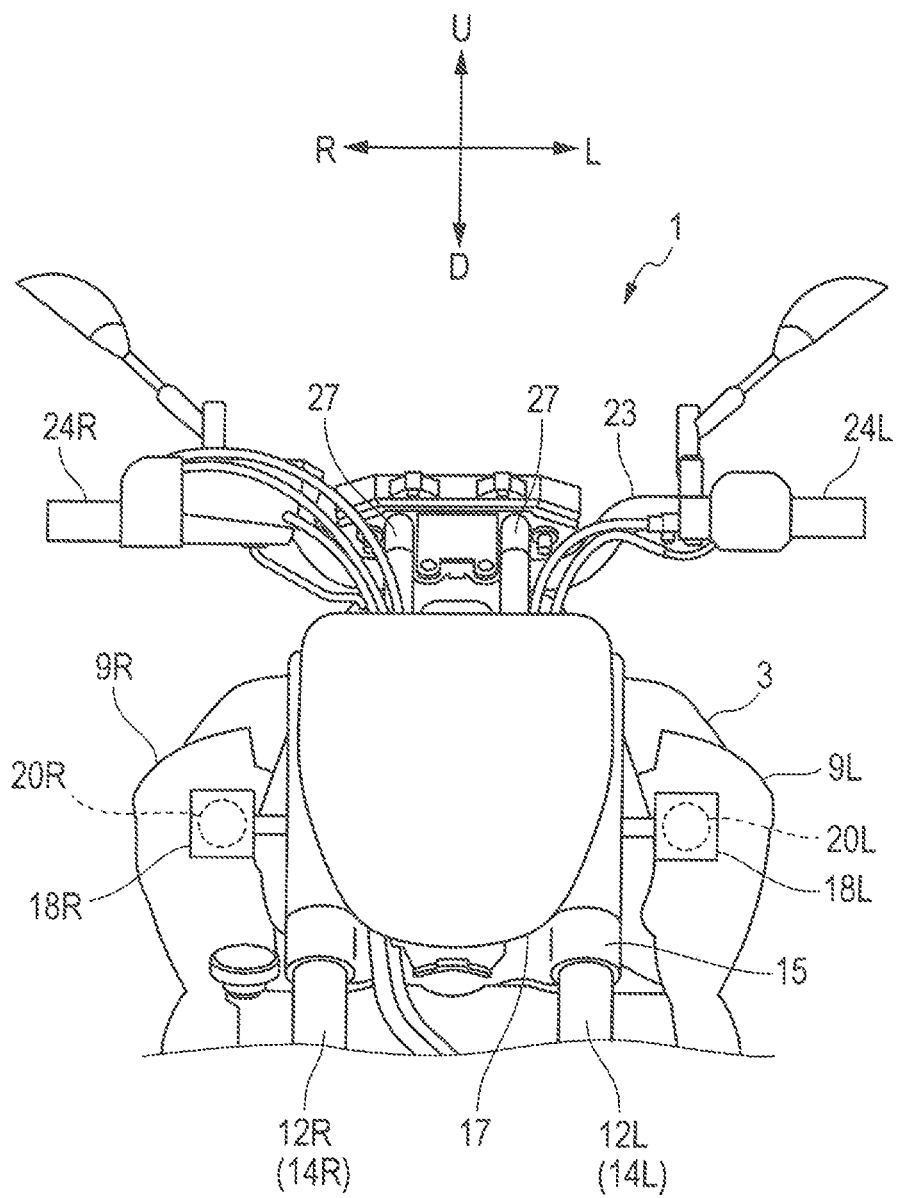
FIG. 2 is a front view of the straddled vehicle according to Embodiment 1 of the present invention.
Figure 3:
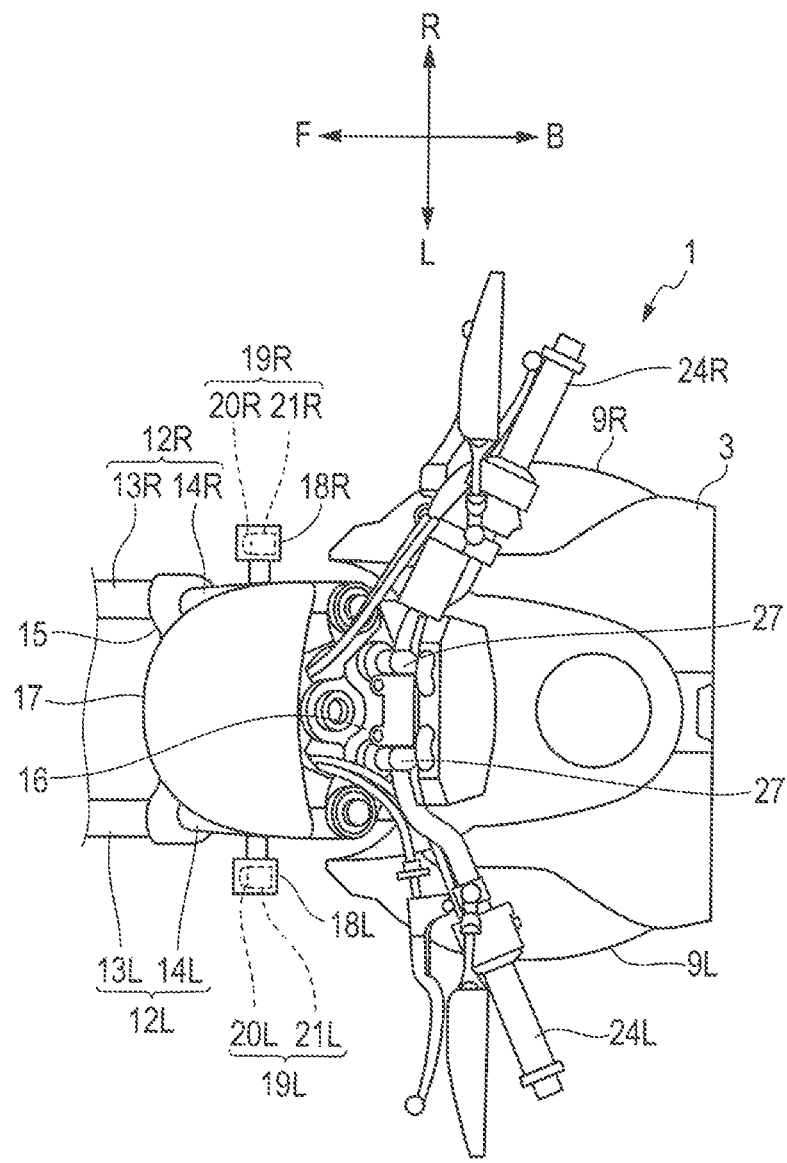
FIG. 3 is a plan view of the straddled vehicle according to Embodiment 1 of the present invention.

FIG. 1 is a side view illustrating straddled vehicle 1 according to the present embodiment. FIG. 2 is a front view of straddled vehicle 1 according to the present embodiment. FIG. 3 is a plan view of straddled vehicle 1 according to the present embodiment.

As shown in FIG. 1, straddled vehicle 1 includes body frame 2, fuel tank 3, seat 4, and power unit 5. Power unit 5 includes an engine section, a crank section, and a mission section. Straddled vehicle 1 is a naked type straddled vehicle.

Body frame 2 includes head pipe 6 and body frame 7. Body frame 7 is connected to head pipe 6 and is disposed behind head pipe 6.

Fuel tank 3 is disposed behind head pipe 6. Fuel tank 3 is disposed above body frame 7. Seat 4 is disposed behind fuel tank 3. Seat 4 is disposed above body frame 7. Power unit 5 is disposed below fuel tank 3. Power unit 5 is supported by body frame 7.

As illustrated in FIGS. 1 to 3, straddled vehicle 1 includes steering shaft 8, left cover section 9L, right cover section 9R, rear wheel 10, front wheel 11, left front-wheel support unit 12L, right front-wheel support unit 12R, lower bracket 15, upper bracket 16, front surface cover 17, left lamp unit 18L, right lamp unit 18R, and handlebar 23. Hereinafter, these components will be described.

Steering shaft 8 is supported by body frame 2 so as to be capable of turning (hereinafter, referred to as "turnably"). For example, steering shaft 8 is inserted into a hole of head pipe 6 and turns around a central axial line of head pipe 6.

Left cover section 9L covers at least the left side of body frame 2. Right cover section 9R covers at least the right side of body frame 2.

Left front-wheel support unit 12L is disposed on the left of front wheel 11 in the left-right direction of the body frame. Right front-wheel support unit 12R is disposed on the right of front wheel 11 in the left-right direction of the body frame. Left front-wheel support unit 12L and right front-wheel support unit 12R are arranged in pairs on left and right sides and rotatably support front wheel 11 and turn integrally with steering shaft 8. In FIG. 1, TR denotes a turning range of left front-wheel support unit 12L and right front-wheel support unit 12R. Details of the turning range will be described later with reference to FIGS. 14A to 14C.

Figure 4:
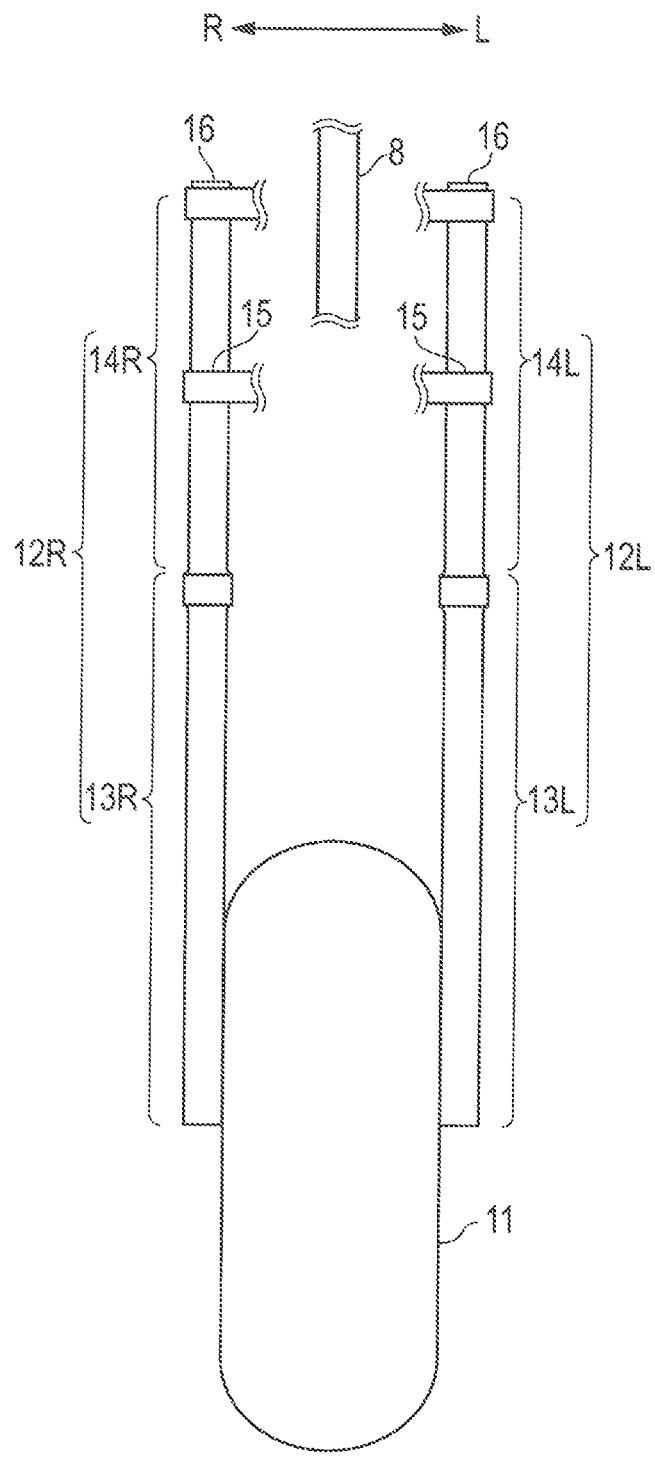
FIG. 4 is a front view illustrating a left front-wheel support unit, a right front-wheel support unit, an upper bracket, and a lower bracket according to Embodiment 1 of the present invention.

Left front-wheel support unit 12L and right front-wheel support unit 12R fix and support fender 25 that covers the upper part of front wheel 11. FIG. 4 is a front view illustrating left front-wheel support unit 12L and right front-wheel support unit 12R.

As shown in FIG. 4, left front-wheel support unit 12L is located on the left of steering shaft 8 in the left-right direction of body frame 2. Left front-wheel support unit 12L includes, for example, left upper member 14L supported by the left portion of upper bracket 16 and the left portion of lower bracket 15, and left lower member 13L that supports front wheel 11 and that is displaceable with respect to left upper member 14L in the up-down direction.

As shown in FIG. 4, right front-wheel support unit 12R is located on the right of steering shaft 8 in the left-right direction of body frame 2. Right front-wheel support unit 12R includes, for example, right upper member 14R supported by the right portion of upper bracket 16 and the right portion of lower bracket 15, right left lower member 13R that supports front wheel 11 and that is displaceable with respect to right upper member 14R in the up-down direction.

Both left front-wheel support unit 12L and right front-wheel support unit 12R may internally include a spring and a damper. Alternatively, one of left front-wheel support unit 12L and right front-wheel support unit 12R may include a spring while the other includes a damper. Alternatively, one of left front-wheel support unit 12L and right front-wheel support unit 12R may include a spring and a damper while the other includes neither a spring nor a damper.

Figure 5:
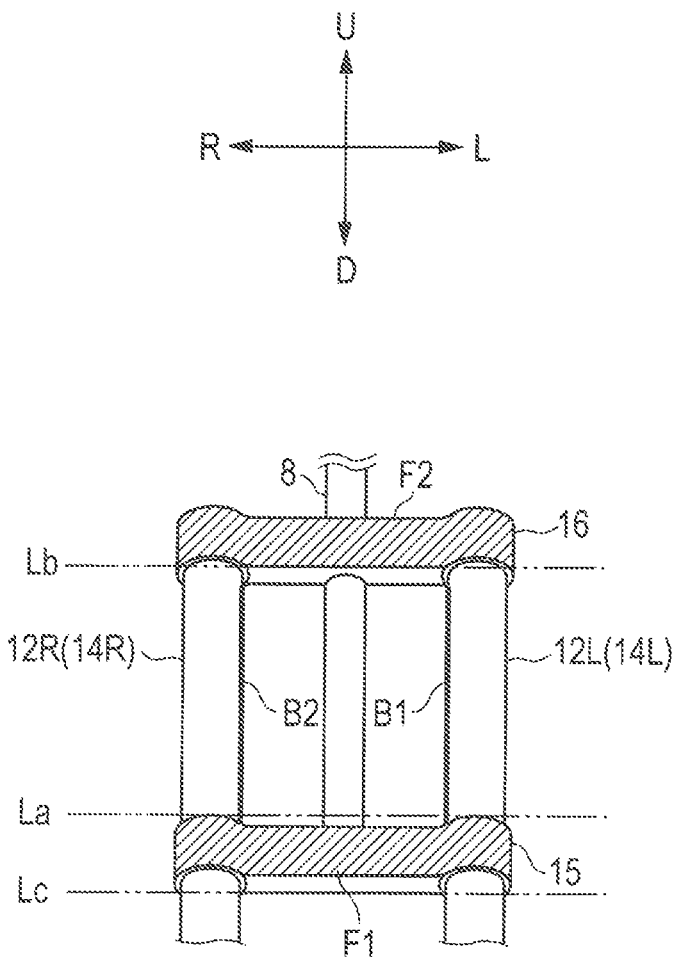
FIG. 5 is a front view illustrating an upper bracket and a lower bracket according to Embodiment 1 of the present invention.

Lower bracket 15 and upper bracket 16 are connected to steering shaft 8, left front-wheel support unit 12L, and right front-wheel support unit 12R. FIG. 5 is a front view illustrating left front-wheel support unit 12L, right front-wheel support unit 12R, lower bracket 15, and upper bracket 16.

As illustrated in FIG. 5, a left portion of lower bracket 15 is connected to a lower part of upper left member 14L of left front-wheel support unit 12L, a right portion is connected to a lower part of upper right member 14R of right front-wheel support unit 12R, and a center part is provided at a lower part of steering shaft 8. Lower bracket 15 includes lower bracket front surface F1 facing the front side in the front-rear direction of body frame 2, among the side surfaces of lower bracket 15. Virtual line La in FIG. 5 is a line passing through a top end of lower bracket front surface F1. Lower bracket 15 includes a lower bracket back surface (not illustrated) facing the rear side in the front-rear direction of body frame 2, among the side surfaces of lower bracket 15. Virtual line Lc in FIG. 5 is a line passing through a bottom end of the lower bracket back surface.

As illustrated in FIG. 5, a left portion of upper bracket 16 is connected to an upper part of upper left member 14L of left front-wheel support unit 12L, a right portion is connected to an upper part of upper right member 14R of right front-wheel support unit 12R, and a center part is provided at an upper part of steering shaft 8. Upper bracket 16 includes upper bracket front surface F2 facing the front side in the front-rear direction of body frame 2, among the side surfaces of upper bracket 16. Virtual line Lb of FIG. 5 is a line passing through a bottom end of upper bracket front surface F2.

In FIG. 5, B1 denotes a right edge of left front-wheel support unit 12L, and B2 denotes a left edge of right front-wheel support unit 12R.

Front surface cover 17 covers at least part of an area between right edge B1 of left front-wheel support unit 12L and left edge B2 of right front-wheel support unit 12R and between a bottom end (virtual line Lb) of upper bracket front surface F2 and a top end (virtual line La) of lower bracket front surface F1, as viewed from the front side in the front-rear direction of body frame 2. Although front surface cover 17 is mounted on straddled vehicle 1 in the example illustrated in FIGS. 1 to 3, front surface cover 17 may not be mounted on straddled vehicle 1.

Handlebar 23 is made up of a member that is long in the left-right direction of body frame 2 and is configured to turn integrally with steering shaft 8 in accordance with steering of a rider. As shown in FIG. 2 and FIG. 3, handlebar 23 is fixed to handlebar holders 27 disposed above upper bracket 16. Handlebar 23 includes left grip 24L disposed on the left of handlebar 23 and held by the rider and right grip 24R disposed on the right of handlebar 23 and held by the rider. Note that handlebar 23 may be constructed of a single member or may be constructed of a right handlebar member and a left handlebar member or may be constructed of another component.

Left lamp unit 18L is located on the left of left front-wheel support unit 12L in the left-right direction of body frame 2 and is fixed and supported by left front-wheel support unit 12L. Left lamp unit 18L includes leftward highly-directional light unit 19L in a casing. The highly-directional light unit is a light unit that emits highly-directional light and that refracts the light to form a light distribution, and the light distribution is a light distribution of at least part of a main beam or a dipped beam. Leftward highly-directional light unit 19L includes, for example, optical lens section 20L and case 21L.

Right lamp unit 18R is located on the right of right front-wheel support unit 12R in the left-right direction of body frame 2 and is fixed and supported by right front-wheel support unit 12R. Right lamp unit 18R includes rightward highly-directional light unit 19R in a casing. Rightward highly-directional light unit 19R includes, for example, optical lens section 20R and case 21R.

Light emitted outside from a light group including leftward highly-directional light unit 19L and rightward highly-directional light unit 19R forms a main beam and a dipped beam.

In the present description, the highly-directional light unit provided on the left of steering shaft 8 in the left-right direction of body frame 2 as viewed from the front side in the front-rear direction of body frame 2 is called a "leftward highly-directional light unit." One or a plurality of leftward highly-directional light units can be called a "left light group." One or a plurality of rightward highly-directional light units can be called a "right light group." The left light group and the right light group can be collectively called a "light group."

The main beam denotes a beam for also emitting light to an area higher than the center of left lamp unit 18L or right lamp unit 18R among the headlights that illuminate the front side to allow straddled vehicle 1 to run in the dark. The dipped beam denotes a beam suppressing the light emitted to the area higher than the center of left lamp unit 18L or right lamp unit 18R so that the light is not glaring for oncoming cars, among the headlights that illuminate the front side to allow straddled vehicle 1 to run in the dark.

Figure 6A:
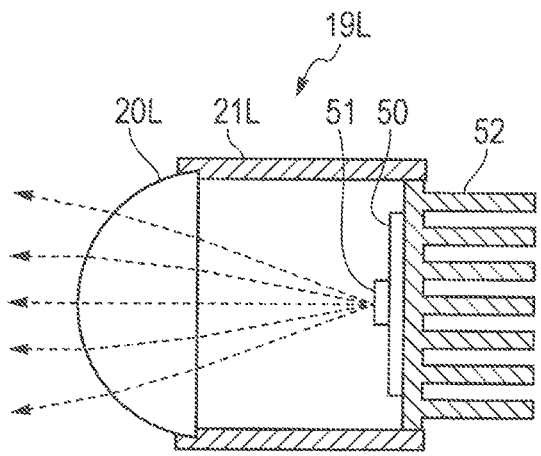
FIGS. 6A to 6C are side views illustrating examples of a leftward highly-directional light unit according to Embodiment 1 of the present invention.
Figure 6B:
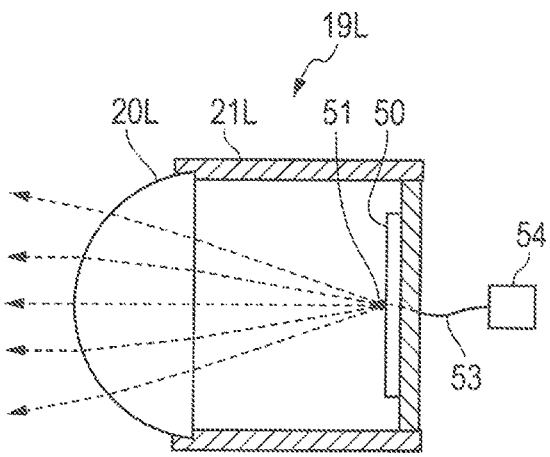
Figure 6C:
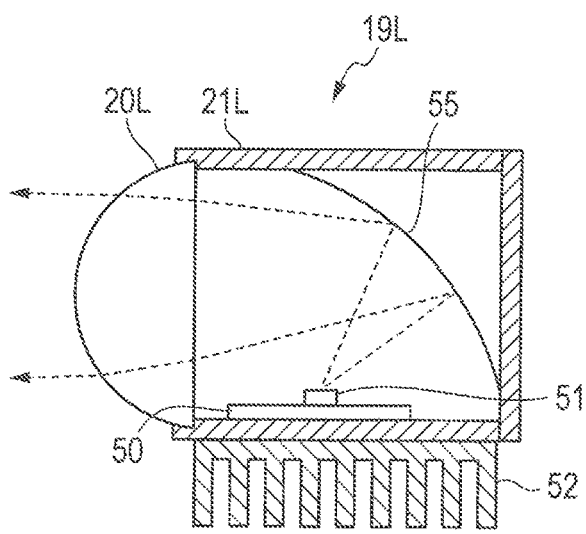

An example of the configuration of the highly-directional light unit will be described in detail with reference to FIGS. 6A to 6C. An example of leftward highly-directional light unit 19L will be described here. FIGS. 6A to 6C are side views of leftward highly-directional light unit 19L. Leftward highly-directional light unit 19L illustrated in FIGS. 6A to 6C includes: light emitting section 51 that emits highly-directional light; and optical lens section 20L that refracts the light from the light emitting section to form a light distribution of at least part of the main beam or the dipped beam.

Note that optical lens section 20L and light-emitting section 51 may or may not be modularized. The term "module" means components that are replaceable as a single unit. When modularized, light-emitting section 51 and optical lens section 20L can be more easily assembled into the body of straddled vehicle 1.

As shown in FIG. 6A, leftward highly-directional light unit 19L includes substrate 50 in the rear of case 21L. Light-emitting section 51 is disposed on an inner side surface of case 21L of substrate 50, and heat sink 52 is disposed on an outer side surface of case 21L of substrate 50.

In FIG. 6A, light-emitting section 51 is, for example, an LED (light emitting diode) and emits highly-directional light. Optical lens section 20L refracts light of light-emitting section 51 and forms a light distribution. The light distribution formed by optical lens section 20L becomes at least part of a light distribution of a main beam or a dipped beam.

Leftward highly-directional light unit 19L may also have a configuration shown in FIG. 6B or FIG. 6C in addition to the aforementioned configuration in FIG. 6A. In the configuration shown in FIG. 6B, substrate 50 holds light-emitting section 51 which is one end of optical fiber 53. Light source 54 is connected to the other end of optical fiber 53. Light source 54 is, for example, a semiconductor laser. In the configuration shown in FIG. 6C, substrate 50, light-emitting section 51 (e.g., LED) and heat sink 52 are arranged on a side surface of case 21L. Reflector 55 that reflects light of light-emitting section 51 is disposed in case 21L.

Although the examples of the configuration of leftward highly-directional light unit 19L have been described in detail, leftward highly-directional light unit 29L, rightward highly-directional light unit 19R, and rightward highly-directional light unit 29R also have any of the configurations of FIGS. 6A to 6C.

Note that substrate 50, light emitting section 51, heat sink 52, and the like are not illustrated in FIGS. 1 to 3 and the drawings described later (for example, FIGS. 12A to 12C, 14A to 14C, 15A to 15D, 16, 17, 21A and 21B, 22, 24 to 26, 28, 30, 32, 34, and 36).

<Necessary Conditions of Highly-Directional Light Units>

Necessary conditions of leftward highly-directional light unit 19L and rightward highly-directional light unit 19R will be described.

[Front-View Arrangement Conditions]

Front-view arrangement conditions of leftward highly-directional light unit 19L and rightward highly-directional light unit 19R as viewed from the front side in the front-rear direction of body frame 2 will be described with reference to FIG. 7.

The front-view arrangement conditions are conditions indicating the positions of the leftward highly-directional light unit and the rightward highly-directional light unit in the up-down direction of body frame 2 and in the left-right direction of body frame 2, as viewed from the front side in the front-rear direction of body frame 2.

Figure 7:
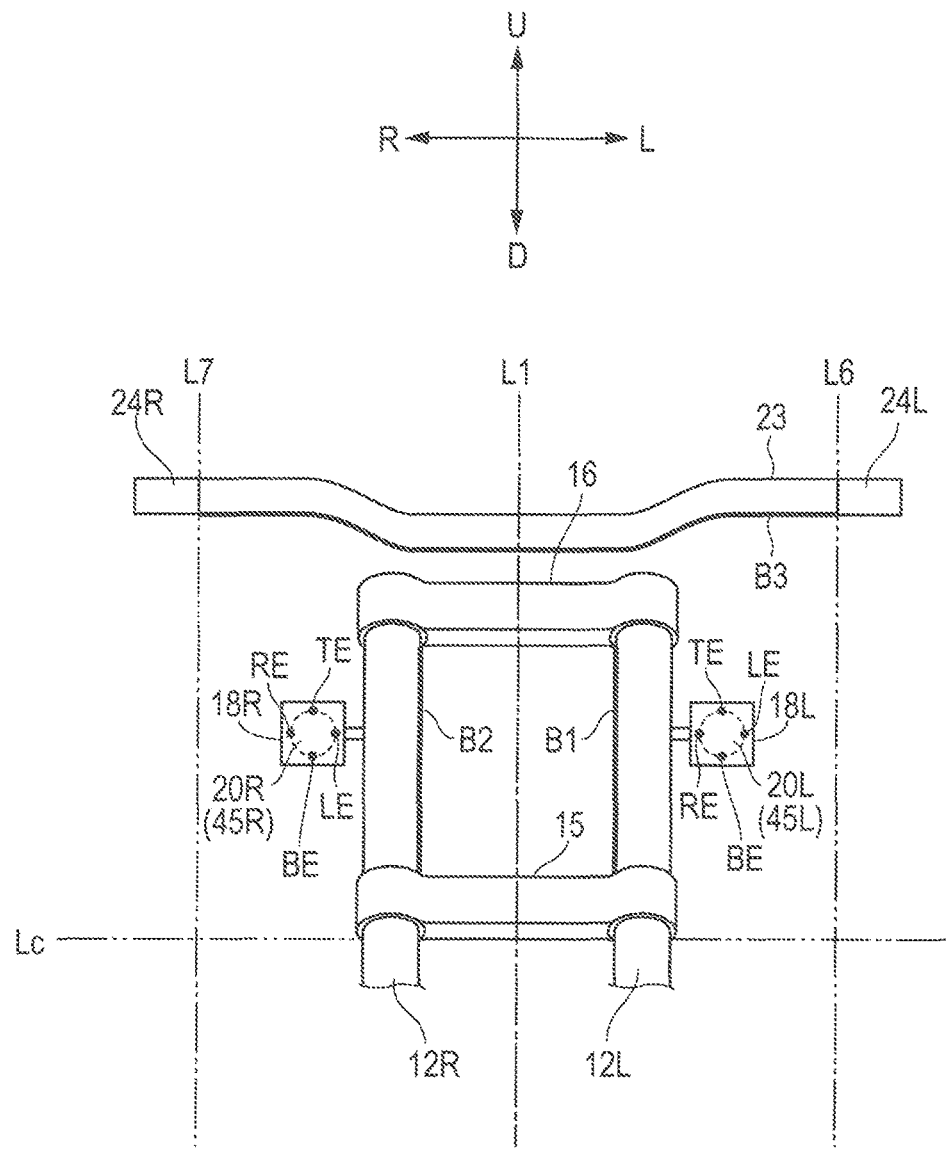
FIG. 7 is a diagram describing front-view arrangement conditions of the leftward highly-directional light unit and a rightward highly-directional light unit according to Embodiment 1 of the present invention.

FIG. 7 is a diagram describing the front-view arrangement conditions of leftward highly-directional light unit 19L and rightward highly-directional light unit 19R as viewed from the front side in the front-rear direction of body frame 2.

The definition of virtual lines L1, L6, and L7 illustrated in FIG. 7 is as follows. Virtual line L1 is a line passing through the center of body frame 2 in the up-down direction. Virtual line L6 is a line passing through the right end of left grip 24L. Virtual line L7 is a line passing through the left end of right grip 24R. In FIG. 7, B3 denotes the bottom edge of handlebar 23.

As illustrated in FIG. 7, optical lens section 20L of leftward highly-directional light unit 19L and optical lens section 20R of rightward highly-directional light unit 19R are disposed not to overlap virtual line L1. Optical lens section 20L of leftward highly-directional light unit 19L is on the left of virtual line L1 in the left-right direction of body frame 2. More specifically, leftward highly-directional light unit 19L is on the left of steering shaft 8 in the left-right direction of body frame 2. Optical lens section 20R of rightward highly-directional light unit 19R is on the right of virtual line L1 in the left-right direction of body frame 2. More specifically, rightward highly-directional light unit 19R is on the right of steering shaft 8 in the left-right direction of body frame 2.

In the present specification, a set of optical lens sections of leftward highly-directional light unit included in the left light group as viewed from the front of body frame 2 in the front-rear direction is called "left optical lens body." That is, the left optical lens body is made up of optical lens sections of leftward highly-directional light units included in the left light group. The top end of the left optical lens body is the top end of the optical lens section of the leftward highly-directional light unit at the uppermost position in the up-down direction of body frame 2 in the leftward highly-directional light units included in the left light group. The bottom end of the left optical lens body is the bottom end of the optical lens section of the leftward highly-directional light unit at the lowermost position in the up-down direction of body frame 2 in the leftward highly-directional light units included in the left light group. The left end of the left optical lens body is the left end of the optical lens section of the leftward highly-directional light unit at the leftmost position in the left-right direction of body frame 2 in the leftward highly-directional light units included in the left light group. The right end of the left optical lens body is the right end of the optical lens section of the leftward highly-directional light unit at the rightmost position in the left-right direction of body frame 2 in the leftward highly-directional light units included in the left light group.

Since only leftward highly-directional light unit 19L is the leftward highly-directional light unit included in the left light group in FIG. 7, left optical lens body 45L is optical lens section 20L. The top end of left optical lens body 45L is top end TE of optical lens section 20L. The bottom end of left optical lens body 45L is bottom end BE of optical lens section 20L. The left end of left optical lens body 45L is left end LE of optical lens section 20L. The right end of left optical lens body 45L is right end RE of optical lens section 20L.

In the present specification, as viewed from the front of body frame 2 in the front-rear direction, a set of optical lens sections of rightward highly-directional light units included in the right light group is called "right optical lens body." That is, the right optical lens body is made up of optical lens sections of rightward highly-directional light units included in the right light group. The top end of the right optical lens body is the top end of the optical lens section of the rightward highly-directional light unit at the uppermost position in the up-down direction of body frame 2 in the rightward highly-directional light units included in the right light group. The bottom end of the right optical lens body is the bottom end of the optical lens section of the rightward highly-directional light unit at the lowermost position in the up-down direction of body frame 2 in the rightward highly-directional light units included in the right light group. The left end of the right optical lens body is the left end of the optical lens section of the rightward highly-directional light unit at the leftmost position in the left-right direction of body frame 2 in the rightward highly-directional light units included in the right light group. The right end of the right optical lens body is the right end of the optical lens section of the rightward highly-directional light unit at the rightmost position in the left-right direction of body frame 2 in the rightward highly-directional light units included in the right light group.

Since only rightward highly-directional light unit 19R is the rightward highly-directional light unit included in the right light group in FIG. 7, right optical lens body 45R is optical lens section 20R. The top end of right optical lens body 45R is top end TE of optical lens section 20R. The bottom end of right optical lens body 45R is bottom end BE of optical lens section 20R. The left end of right optical lens body 45R is left end LE of optical lens section 20R. The right end of right optical lens body 45R is right end RE of optical lens section 20R.

As illustrated in FIG. 7, top end TE of optical lens section 20L is below bottom edge B3 of handlebar 23 in the up-down direction of body frame 2. Bottom end BE of optical lens section 20L is above the bottom end (virtual line Lc) of lower bracket 15 in the up-down direction of body frame 2. Left end LE of optical lens section 20L is on the right of the right end (virtual line L6) of left grip 24L in the left-right direction of body frame 2. Right end RE of optical lens section 20L is on the left of right edge B1 of left front-wheel support unit 12L in the left-right direction of body frame 2.

More specifically, in FIG. 7, the top end of left optical lens body 45L is disposed below bottom edge B3 of handlebar 23 in the up-down direction of body frame 2, and the bottom end of left optical lens body 45L is disposed above the bottom end (virtual line Lc) of lower bracket 15 in the up-down direction of body frame 2. The left end of left optical lens body 45L is disposed on the right of the right end (virtual line L6) of left grip 24L in the left-right direction of body frame 2, and the right end of left optical lens body 45L is disposed on the left of right edge B1 of left front-wheel support unit 12L in the left-right direction of body frame 2.

As illustrated in FIG. 7, top end TE of optical lens section 20R is below bottom edge B3 of handlebar 23 in the up-down direction of body frame 2. Bottom end BE of optical lens section 20R is above the bottom end (virtual line Lc) of lower bracket 15 in the up-down direction of body frame 2. Right end RE of optical lens section 20R is on the left of the left end (virtual line L7) of right grip 24R in the left-right direction of body frame 2. The left end LE of optical lens section 20R is on the right of left edge B2 of the right front-wheel support unit in the left-right direction of body frame 2.

More specifically, in FIG. 7, the top end of right optical lens body 45R is disposed below bottom edge B3 of handlebar 23 in the up-down direction of body frame 2, and the bottom end of right optical lens body 45R is disposed above the bottom end (virtual line Lc) of lower bracket 15 in the up-down direction of body frame 2. The right end of right optical lens body 45R is disposed on the left of the left end (virtual line L7) of right grip 24R in the left-right direction of body frame 2, and the left end of right optical lens body 45R is disposed on the right of left edge B2 of right front-wheel support unit 12R in the left-right direction of body frame 2.

Leftward highly-directional light unit 19L and rightward highly-directional light unit 19R are disposed at an interval in the left-right direction of body frame 2 based on the front-view arrangement conditions as viewed from the front side in the front-rear direction of body frame 2.

Leftward highly-directional light unit 19L and rightward highly-directional light unit 19R are disposed in a range between the bottom edge of handlebar 23 and the bottom end of the lower bracket in the up-down direction of body frame 2 based on the front-view arrangement conditions as viewed from the front side in the front-rear direction of body frame 2.

Leftward highly-directional light unit 19L and rightward highly-directional light unit 19R are disposed in a range between the right end of left grip 24L and the left end of right grip 24R in the left-right direction of body frame 2 based on the front-view arrangement conditions as viewed from the front side in the front-rear direction of body frame 2.

Figure 8:
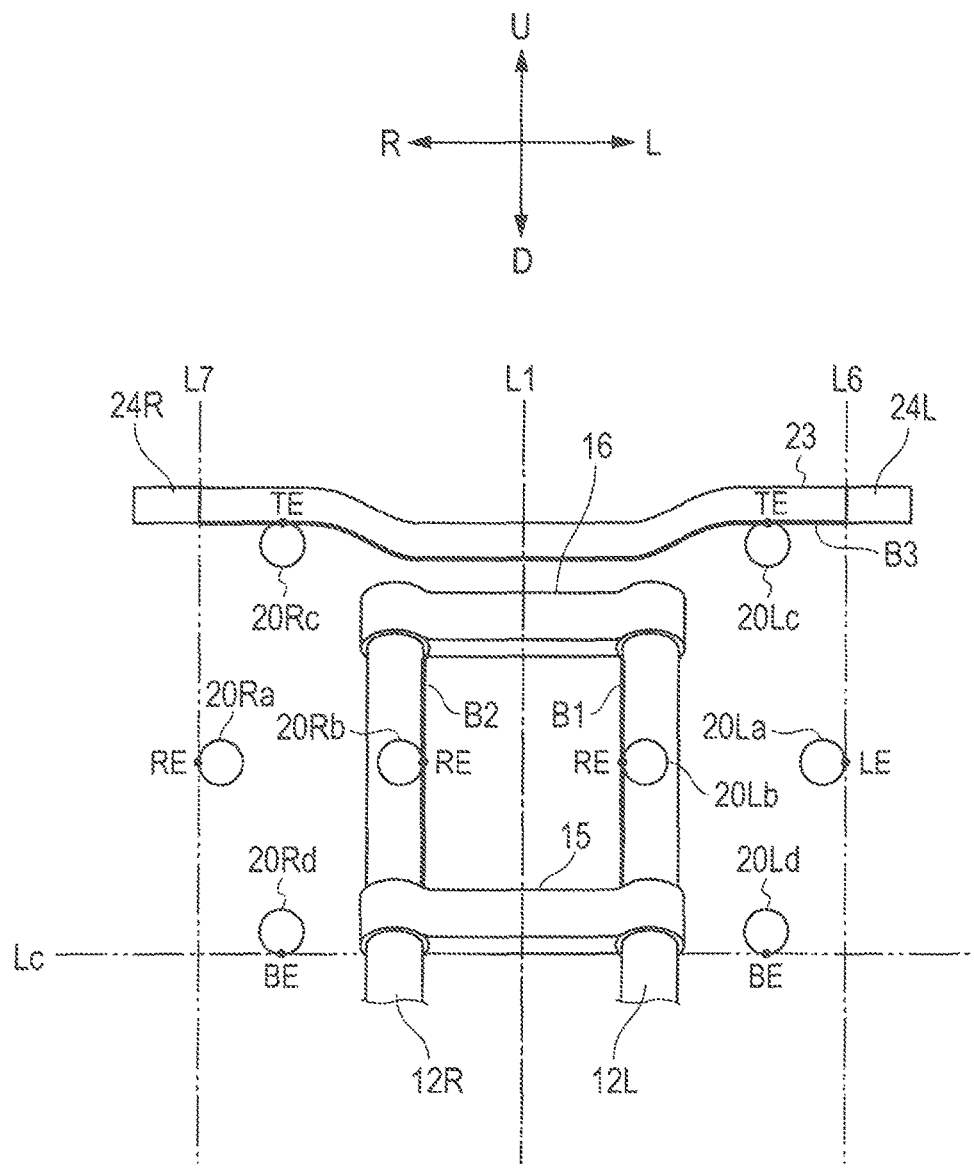
FIG. 8 is a diagram describing another example of the front-view arrangement conditions of the leftward highly-directional light unit and the rightward highly-directional light unit according to Embodiment 1 of the present invention.

The arrangement of optical lens section 20L of leftward highly-directional light unit 19L and optical lens section 20R of rightward highly-directional light unit 19R is not limited to the arrangement illustrated in FIG. 7. FIG. 8 illustrates another example of the arrangement of optical lens section 20L of leftward highly-directional light unit 19L and optical lens section 20R of rightward highly-directional light unit 19R. Illustrations of the casing of the left lamp unit and the casing of the right lamp unit are omitted in FIG. 8.

In FIG. 8, all of optical lens sections 20La, 20Lb, 20Lc, and 20Ld satisfy the front-view arrangement conditions. The arrangement of optical lens section 20L of leftward highly-directional light unit 19L may be any of optical lens sections 20La, 20Lb, 20Lc, and 20Ld illustrated in FIG. 8. In FIG. 8, all of optical lens sections 20Ra, 20Rb, 20Rc, and 20Rd satisfy the front-view arrangement conditions. The arrangement of optical lens section 20R of rightward highly-directional light unit 19R may be any of optical lens sections 20Ra, 20Rb, 20Rc, and 20Rd illustrated in FIG. 8.

[Side-View Arrangement Conditions]

Side-view arrangement conditions of leftward highly-directional light unit 19L and rightward highly-directional light unit 19R as viewed from the left-right direction of body frame 2 will be described with reference to FIGS. 14A to 14C.

The side-view arrangement conditions are conditions indicating the positions of the leftward highly-directional light unit and the rightward highly-directional light unit in the front-rear direction of body frame 2 as viewed from the left side or the right side in the left-right direction of body frame 2.

FIGS. 14A to 14C are diagrams describing the side-view arrangement conditions of leftward highly-directional light unit 19L and rightward highly-directional light unit 19R as viewed from the left side in the left-right direction of body frame 2. In FIGS. 14A to 14C, TR denotes the turn range (hereinafter, called "turn range TR") of left front-wheel support unit 12L and right front-wheel support unit 12R, as in FIG. 1.

FIG. 14A illustrates a state of the front side of straddled vehicle 1 as viewed from the left side in the left-right direction of body frame 2 when handlebar 23 is steered to the extreme left (when the steering angle in the left direction is a maximum value) with rear wheel 10 in an upright state. In the present description, "rear wheel 10 in the upright state" denotes a state in which the rider is not on straddled vehicle 1, and rear wheel 10 is perpendicular to the grounding surface when the fuel of fuel tank 3 is empty.

As illustrated in FIG. 14A, handlebar 23, front wheel 11, left front-wheel support unit 12L, right front-wheel support unit 12R, lower bracket 15, and upper bracket 16 turn to the left when handlebar 23 is steered to the extreme left. Left lamp unit 18L is fixed and supported by left front-wheel support unit 12L, and right lamp unit 18R is fixed and supported by right front-wheel support unit 12R. Therefore, left lamp unit 18L and right lamp unit 18R also turn to the left as illustrated in FIG. 14A. In this case, leftward highly-directional light unit 19L in left lamp unit 18L and rightward highly-directional light unit 19R in right lamp unit 18R do not overlap turn range TR.

FIG. 14B illustrates a state of the front side of straddled vehicle 1 as viewed from the left side in the left-right direction of body frame 2 when handlebar 23 is not steered (when the steering angle is 0°) with rear wheel 10 in the upright state.

As illustrated in FIG. 14B, leftward highly-directional light unit 19L in left lamp unit 18L overlaps turn range TR when handlebar 23 is not steered. Although not illustrated, rightward highly-directional light unit 19R in right lamp unit 18R also overlaps turn range TR when handlebar 23 illustrated in FIG. 14B is not steered.

FIG. 14C illustrates a state of the front side of straddled vehicle 1 as viewed from the left side in the left-right direction of body frame 2 when handlebar 23 is steered to the extreme right (when the steering angle in the right direction is a maximum value) with rear wheel 10 in the upright state.

As illustrated in FIG. 14C, handlebar 23, front wheel 11, left front-wheel support unit 12L, right front-wheel support unit 12R, lower bracket 15, and upper bracket 16 turn to the right when handlebar 23 is steered to the extreme right. Left lamp unit 18L is fixed and supported by left front-wheel support unit 12L, and right lamp unit 18R is fixed and supported by right front-wheel support unit 12R. Therefore, left lamp unit 18L and right lamp unit 18R also turn to the right as illustrated in FIG. 14C. In this case, leftward highly-directional light unit 19L in left lamp unit 18L and rightward highly-directional light unit 19R in right lamp unit 18R do not overlap turn range TR.

As described, leftward highly-directional light unit 19L is disposed at a position overlapping turn range TR as viewed from the left side in the left-right direction of body frame 2, and rightward highly-directional light unit 19R is disposed at a position overlapping turn range TR as viewed from the right side in the left-right direction of body frame 2.

Leftward highly-directional light unit 19L supported by left front-wheel support unit 12L and rightward highly-directional light unit 19R supported by right front-wheel support unit 12R are not disposed at positions apart from turn range TR on the front side in the front-rear direction of body frame 2 or on the rear side in the front-rear direction of body frame 2 based on the side-view arrangement conditions.

Although the entirety of leftward highly-directional light unit 19L and the entirety of rightward highly-directional light unit 19R overlap turn range TR in the example of arrangement illustrated in FIG. 14B, at least part of leftward highly-directional light unit 19L (for example, front end FE or back end BAE of leftward highly-directional light unit 19L) and/or at least part of rightward highly-directional light unit 19R (for example, front end FE or back end BAE of rightward highly-directional light unit 19R) may overlap turn range TR in the arrangement illustrated in FIG. 14B.

<Operational Effects of Necessary Conditions>

As explained above, leftward highly-directional light unit 19L and rightward highly-directional light unit 19R are disposed to satisfy the front-view arrangement conditions and the side-view arrangement conditions in straddled vehicle 1 according to this embodiment. More specifically, in straddled vehicle 1 according to this embodiment, the top end of left optical lens body 45L is disposed below bottom edge B3 of handlebar 23 in the up-down direction of body frame 2, the bottom end of left optical lens body 45L is disposed above the bottom end (virtual line Lc) of lower bracket 15 in the up-down direction of body frame 2, the left end of left optical lens body 45L is disposed on the right of the right end (virtual line L6) of left grip 24L in the left-right direction of body frame 2, and the right end of left optical lens body 45L is disposed on the left of right edge B1 of left front-wheel support unit 12L in the left-right direction of body frame 2, as viewed from the front side in the front-rear direction of body frame 2. In straddled vehicle 1 according to this embodiment, the top end of right optical lens body 45R is disposed below bottom edge B3 of handlebar 23 in the up-down direction of body frame 2, the bottom end of right optical lens body 45R is disposed above the bottom end (virtual line Lc) of lower bracket 15 in the up-down direction of body frame 2, the right end of right optical lens body 45R is disposed on the left of the left end (virtual line L7) of right grip 24R in the left-right direction of body frame 2, and the left end of right optical lens body 45R is disposed on the right of left edge B2 of right front-wheel support unit 12R in the left-right direction of body frame 2, as viewed from the front side in the front-rear direction of body frame 2.

In straddled vehicle 1 of this embodiment, as viewed from the front side in the front-rear direction of body frame 2, at least part of leftward highly-directional light unit 19L is provided at a position overlapping turn range TR of left front-wheel support unit 12L as viewed from the left side in the left-right direction of body frame 2, and at least part of rightward highly-directional light unit 19R is provided at a position overlapping turn range TR of right front-wheel support unit 12R as viewed from the right side in the left-right direction of body frame 2.

Therefore, in straddled vehicle 1 of this embodiment, leftward highly-directional light unit 19L and rightward highly-directional light unit 19R are disposed at an interval in the left-right direction of body frame 2 and are disposed in a range between the right end of left grip 24L and the left end of right grip 24R in the left-right direction of body frame 2, as viewed from the front side in the front-rear direction of body frame 2.

In straddled vehicle 1 of this embodiment, leftward highly-directional light unit 19L and rightward highly-directional light unit 19R are not disposed in a range surrounded by left front-wheel support unit 12L, right front-wheel support unit 12R, upper bracket 16, and lower bracket 15 as viewed from the front side in the front-rear direction of body frame 2, and a space can be provided at the center of the vehicle body.

In straddled vehicle 1 of this embodiment, leftward highly-directional light unit 19L and rightward highly-directional light unit 19R are not disposed forward of turn range TR in the front-rear direction of body frame 2, and an increase in the size of the body section in the front-rear direction can be limited.

Therefore, according to straddled vehicle 1 of this embodiment, the highly-directional light section including the light emitting section that emits highly-directional light and the optical lens section that refracts the light from the light emitting section to form a light distribution of at least part of the main beam or the dipped beam can be provided, and an increase in the size of the body section of the straddled vehicle forward of the steering shaft in the left-right direction and the front-rear direction of the body frame can be limited while a space can be secured forward of the steering shaft.

In straddled vehicle 1 of this embodiment, leftward highly-directional light unit 19L and rightward highly-directional light unit 19R are disposed in a range between bottom edge B3 of handlebar 23 and the top end (virtual line Lc) of lower bracket 15 in the up-down direction of body frame 2 based on the front-view arrangement conditions as viewed from the front side in the front-rear direction of body frame 2. This can prevent the light included in the main beam or the dipped beam from interfering with fender 25.

<Examples of Space Utilization>

Examples of the space will be described with reference to FIGS. 15A to 15D. FIGS. 15A to 15D are diagrams describing examples of the space.

Figure 15A:
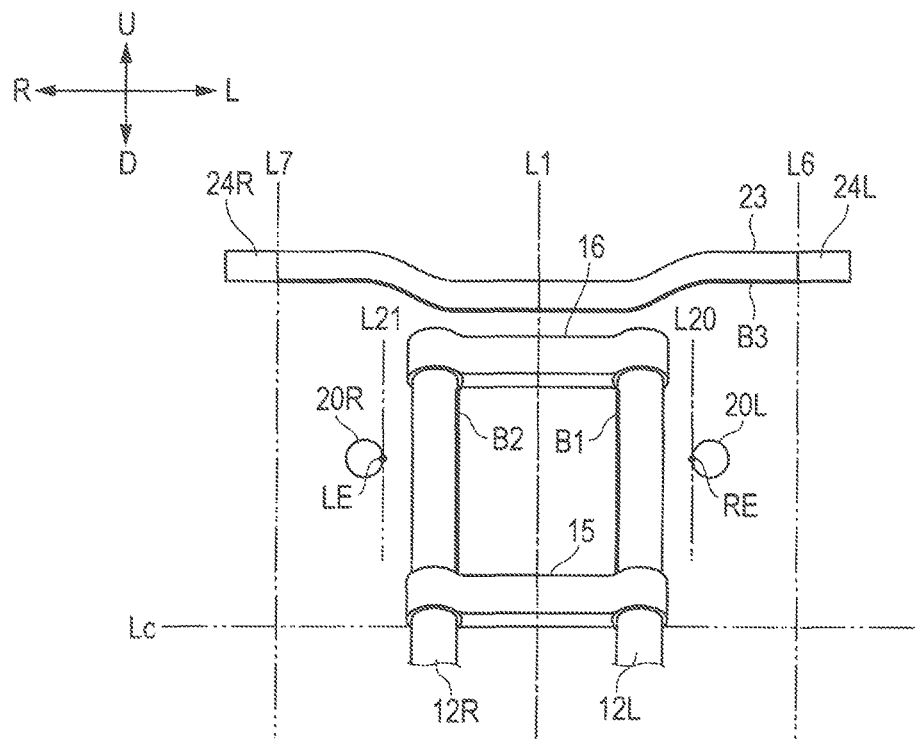
FIGS. 15A to 15D are diagrams describing a space according to Embodiment 1 of the present invention.

The range of the space in the left-right direction of body frame 2 will be described with reference to FIG. 15A. FIG. 15A is a view from the front side in the front-rear direction of body frame 2. In FIG. 15A, illustrations of the casing of left lamp unit 18L and the casing of right lamp unit 18R are omitted.

In FIG. 15A, virtual line L20 is a line passing through right end RE of optical lens section 20L of leftward highly-directional light unit 19L, the line extending in the up-down direction of body frame 2. Virtual line L21 is a line passing through left end LE of optical lens section 20R of rightward highly-directional light unit 19R, the line extending in the up-down direction of body frame 2. Although virtual lines L20 and L21 are lines extending in the up-down direction of body frame 2 in the example here, the lines are not limited to these. For example, virtual line L20 may be a straight line or a curved line other than the line passing through right end RE of optical lens section 20L. Similarly, virtual line L21 may be, for example, a straight line or a curved line other than the line passing through left end LE of optical lens section 20R.

In FIG. 15A, the range of the space in the left-right direction of body frame 2 is between virtual line L20 and virtual line L21.

Figure 15B:
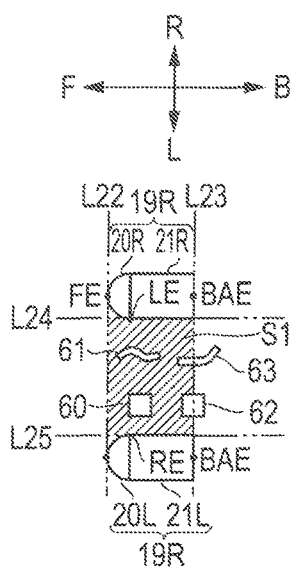

The range of the space in the front-rear direction of body frame 2 will be described with reference to FIG. 15B. FIG. 15B is a view from above in the up-down direction of body frame 2. In FIG. 15B, virtual line L22 is a line passing through front end FE of leftward highly-directional light unit 19L and front end FE of rightward highly-directional light unit 19R. Virtual line L23 is a line passing through back end BAE of leftward highly-directional light unit 19L and back end BAE of rightward highly-directional light unit 19R. Virtual line L24 is a line passing through left end LE of optical lens section 20R of rightward highly-directional light unit 19R. Virtual line L25 is a line passing through right end RE of optical lens section 20L of leftward highly-directional light unit 19L. The length between virtual line L24 and virtual line L25 is equal to the length between virtual line L21 and virtual line L20 illustrated in FIG. 15A.

In the present description, front end FE of leftward highly-directional light unit 19L is, for example, the front end of optical lens section 20L. In the present description, front end FE of rightward highly-directional light unit 19R is, for example, the front end of optical lens section 20R. In the present description, back end BAE of leftward highly-directional light unit 19L is, for example, the back end of one of case 21L, substrate 50 (see FIGS. 6A to 6C), and heat sink 52 (see FIGS. 6A to 6C). In the present description, back end BAE of rightward highly-directional light unit 19R is, for example, the back end of one of case 21R, substrate 50 (see FIGS. 6A to 6C), and heat sink 52 (see FIGS. 6A to 6C).

In FIG. 15B, the range of the space in the front-rear direction of body frame 2 is between virtual line L22 and virtual line L23.

As described, space S1 illustrated in FIG. 15B is secured between virtual line L20 and virtual line L21 in the left-right direction of body frame 2 (in other words, between virtual line L25 and virtual line L24) and between virtual line L22 and virtual line L23 in the front-rear direction of body frame 2.

In space S1, entire part 60 and part 61 are disposed, or part of part 62 and part 63 is disposed as illustrated in FIG. 15B. Part 60 and part 62 are, for example, electric and/or electronic parts or key cylinders or the like which are different from highly-directional light units. The electric and/or electronic parts different from highly-directional light units may be, for example, one of an engine control unit (ECU), an electronic control unit (ECU), a handlebar unit (hydraulic unit) that includes a motor and controls a liquid pressure of a hydraulic brake, a global positioning system (GPS) unit, an electronic toll collection system (ETC) unit, an ETC antenna, a horn, a laser unit, various electronic substrates and a battery. Part 61 or part 63 may be, for example, one of a throttle wire, a brake wire, a brake hose, a clutch wire and a wire harness.

Although space S1 is used to dispose components here, space S1 may be used as an air vent for introducing air from the outside. The air delivered into straddled vehicle 1 through space S1 is used in an air cleaner, an engine, or the like, is used to cool electrical and/or electronic components (details will be described later), a radiator, or the like, or is used to output sound of a hone to the outside.

Figure 15C:
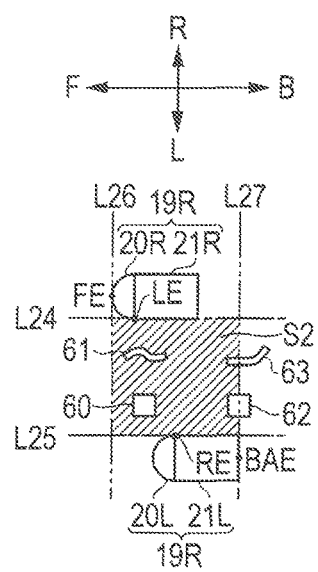
Figure 15D:
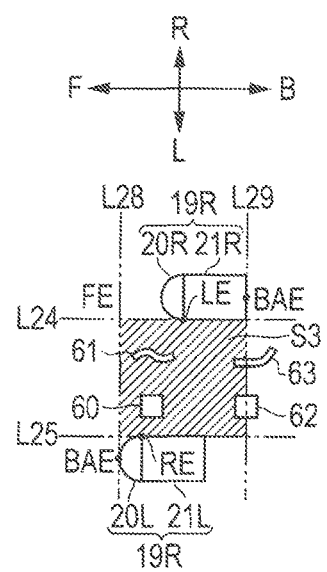

Although the range of space S1 in the front-rear direction of body frame 2 is set to the range between virtual line L22 and virtual line L23, the range is not limited to this. Other examples will be described with reference to FIGS. 15C and 15D. FIGS. 15C and 15D are views from above in the up-down direction of body frame 2.

For example, the range of the space in the front-rear direction of body frame 2 may be between virtual line L26 and virtual line L27 as illustrated in FIG. 15C. Virtual line L26 is a line passing through front end FE of rightward highly-directional light unit 19R. Virtual line L27 is a line passing through back end BAE of leftward highly-directional light unit 19L.

As described, space S2 illustrated in FIG. 15C is secured between virtual line L20 and virtual line L21 in the left-right direction of body frame 2 (in other words, between virtual line L25 and virtual line L24) and between virtual line L26 and virtual line L27 in the front-rear direction of body frame 2. Space S2 is a space wider than space S1 illustrated in FIG. 15B in the front-rear direction of body frame 2. Like space S1, space S2 is used to dispose parts 60 to 63 or is used as an air vent.

The range of the space in the front-rear direction of body frame 2 may be, for example, between virtual line L28 and virtual line L29 as illustrated in FIG. 15D. Virtual line L28 is a line passing through front end FE of leftward highly-directional light unit 19L. Virtual line L29 is a line passing through back end BAE of rightward highly-directional light unit 19R.

As described, space S3 illustrated in FIG. 15D is secured between virtual line L20 and virtual line L21 in the left-right direction of body frame 2 (in other words, between virtual line L25 and virtual line L24) and between virtual line L28 and virtual line L29 in the front-rear direction of body frame 2. Space S3 is a space wider than space S1 illustrated in FIG. 15B in the front-rear direction of body frame 2. Like space S1, space S3 is used to dispose parts 60 to 63 or is used as an air vent.

<Additional Conditions of Highly-Directional Light Sections>

In this embodiment, leftward highly-directional light unit 19L and rightward highly-directional light unit 19R may be disposed to further satisfy at least one of the following additional conditions, in addition to the front-view arrangement conditions and the side-view arrangement conditions that are necessary conditions. The additional conditions will be described.

[Lens Width Conditions]

Lens width conditions of leftward highly-directional light unit 19L and rightward highly-directional light unit 19R as viewed from the front side in the front-rear direction of body frame 2 will be described with reference to FIG. 9.

The lens width conditions are conditions indicating the lengths of the maximum lens width of the optical lens section of the leftward highly-directional light unit in the left-right direction and the maximum lens width of the optical lens section of the rightward highly-directional light unit in the left-right direction as viewed from the front side in the front-rear direction of body frame 2.

Figure 9:
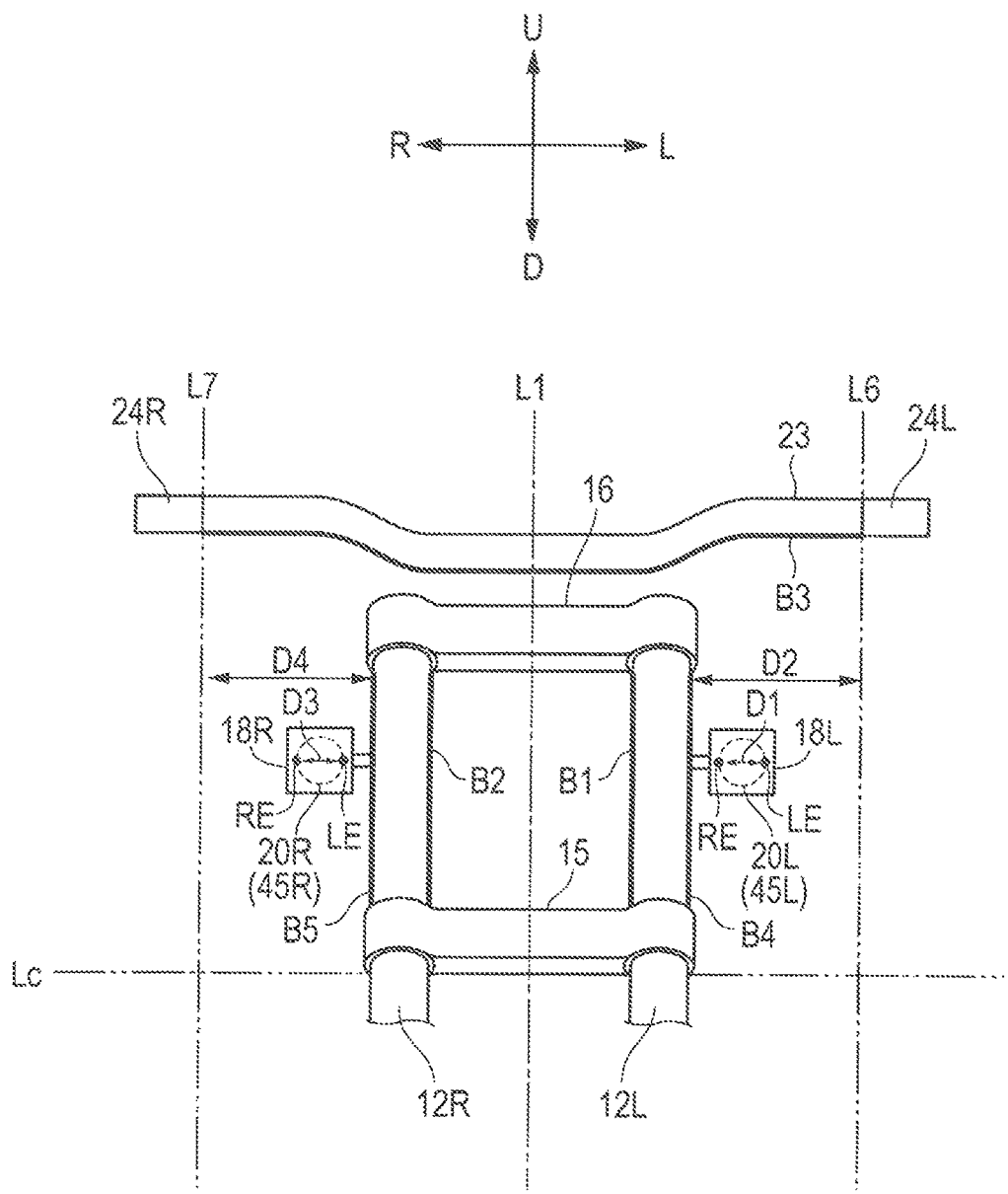
FIG. 9 is a diagram describing lens width conditions of the leftward highly-directional light unit and the rightward highly-directional light unit according to Embodiment 1 of the present invention.

FIG. 9 is a diagram describing the lens width conditions of leftward highly-directional light unit 19L and rightward highly-directional light unit 19R as viewed from the front side in the front-rear direction of body frame 2.

The definition of lengths D1 to D4 illustrated in FIG. 9 is as follows. Length D1 is a length between left end LE and right end RE of optical lens section 20L of leftward highly-directional light unit 19L in the left-right direction of body frame 2. That is, length D1 is a maximum lens width of optical lens section 20L in the left-right direction. In other words, length D1 is a length between left end LE and right end RE of left optical lens body 45L in the left-right direction of body frame 2. Length D2 is a length between the right end (virtual line L6) of left grip 24L and left edge B4 of left front-wheel support unit 12L in the left-right direction of body frame 2. Length D3 is a length between left end LE and right end RE of optical lens section 20R of rightward highly-directional light unit 19R in the left-right direction of body frame 2. That is, length D3 is a maximum lens width of optical lens section 20R in the left-right direction. In other words, length D3 is a length between left end LE and right end RE of right optical lens body 45R the left-right direction of body frame 2. Length D4 is a length between the left end (virtual line L7) of right grip 24R and right edge B5 of right front-wheel support unit 12R in the left-right direction of body frame 2.

As illustrated in FIG. 9, length D1 is shorter than length D2, and length D3 is shorter than length D4. Therefore, leftward highly-directional light unit 19L includes optical lens section 20L with the maximum lens width in the left-right direction shorter than the length between the right end of left grip 24L and left edge B4 of left front-wheel support unit 12L in the left-right direction of body frame 2. Rightward highly-directional light unit 19R includes optical lens section 20R with the maximum lens width in the left-right direction shorter than the length between the left end of right grip 24R and right edge B5 of right front-wheel support unit 12R in the left-right direction of body frame 2.

Leftward highly-directional light unit 19L is compactly disposed in the left-right direction of body frame 2 based on the lens width conditions as viewed from the front side in the front-rear direction of body frame 2. Rightward highly-directional light unit 19R is compactly disposed in the left-right direction of body frame 2 based on the lens width conditions as viewed from the front side in the front-rear direction of body frame 2.

Although the shape of optical lens section 20L and optical lens section 20R as viewed from the front side in the front-rear direction of body frame 2 is circular in FIG. 9, other shapes are possible. An example of satisfying the lens width conditions when the shape of the optical lens sections as viewed from the front side in the front-rear direction of body frame 2 is, for example, elliptical will be described with reference to FIG. 10.

Figure 10:
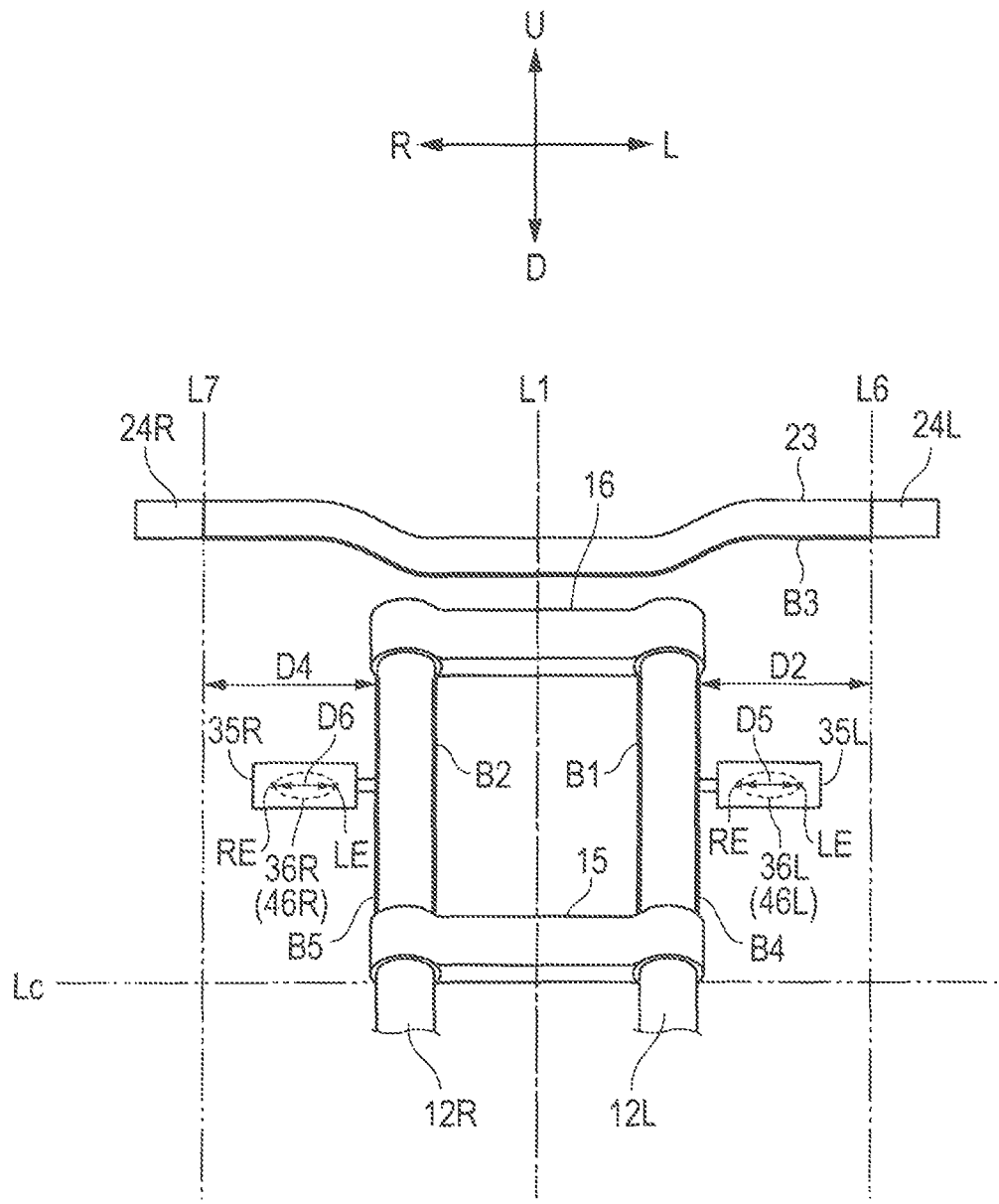
FIG. 10 is a diagram describing another example of the lens width conditions of the leftward highly-directional light unit and the rightward highly-directional light unit according to Embodiment 1 of the present invention.

In FIG. 10, left lamp unit 35L includes a leftward highly-directional light unit including optical lens section 36L in an elliptical shape as viewed from the front side in the front-rear direction of body frame 2, and right lamp unit 35R includes a rightward highly-directional light unit including optical lens section 36R in an elliptical shape as viewed from the front side in the front-rear direction of body frame 2.

Since the left light group includes only one leftward highly-directional light unit in FIG. 10, optical lens section 36L of the leftward highly-directional light unit is left optical lens body 46L. The top end of left optical lens body 46L is top end TE of optical lens section 36L. The bottom end of left optical lens body 46L is bottom end BE of optical lens section 36L. The left end of left optical lens body 46L is left end LE of optical lens section 36L. The right end of left optical lens body 46L is right end RE of optical lens section 36L.

Since the right light group includes only one rightward highly-directional light unit in FIG. 10, optical lens section 36R of the rightward highly-directional light unit is right optical lens body 46R. The top end of right optical lens body 46R is top end TE of optical lens section 36R. The bottom end of right optical lens body 46R is bottom end BE of optical lens section 36R. The left end of right optical lens body 46R is left end LE of optical lens section 36R. The right end of right optical lens body 46R is right end RE of optical lens section 36R.

Length D5 illustrated in FIG. 10 is a length between left end LE and right end RE of optical lens section 36L in the left-right direction of body frame 2. That is, length D5 is a maximum lens width of optical lens section 36L in the left-right direction. In other words, length D5 is a length between left end LE and right end RE of left optical lens body 46L in the left-right direction of body frame 2. Length D6 illustrated in FIG. 10 is a length between left end LE and right end RE of optical lens section 36R in the left-right direction of body frame 2. That is, length D6 is a maximum lens width of optical lens section 36R in the left-right direction. In other words, length D6 is a length between left end LE and right end RE of right optical lens body 46R in the left-right direction of body frame 2.

As illustrated in FIG. 10, length D5 is shorter than length D2, and length D6 is shorter than length D4. Therefore, the leftward highly-directional light unit included in left lamp unit 35L includes optical lens section 36L with the maximum lens width in the left-right direction shorter than the length between the right end of left grip 24L and left edge B4 of left front-wheel support unit 12L in the left-right direction of body frame 2. The rightward highly-directional light unit included in right lamp unit 35R includes optical lens section 36R with the maximum lends width in the left-right direction shorter than the length between the left end of right grip 24R and right edge B5 of right front-wheel support unit 12R in the left-right direction of body frame 2.

The leftward highly-directional light unit included in left lamp unit 35L is compactly disposed in the left-right direction of body frame 2 based on the lens width conditions as viewed from the front side in the front-rear direction of body frame 2. The rightward highly-directional light unit included in right lamp unit 35R is compactly disposed in the left-right direction of body frame 2 based on the lens width conditions as viewed from the front side in the front-rear direction of body frame 2.

[Up-Down Direction Symmetrical Conditions]

Up-down direction symmetrical conditions of leftward highly-directional light unit 19L and rightward highly-directional light unit 19R as viewed from the front side in the front-rear direction of body frame 2 will be described with reference to FIGS. 11A to 11E. Leftward highly-directional light unit 19L and rightward highly-directional light unit 19R form a pair of symmetrical lights in the example here.

The up-down direction symmetrical conditions are conditions indicating the position of one of the highly-directional light units of the pair of symmetrical lights relative to the other highly-directional light unit in the up-down direction of body frame 2 as viewed from the front side in the front-rear direction of body frame 2.

FIGS. 11A to 11E are diagrams describing examples of the up-down direction symmetrical conditions of leftward highly-directional light unit 19L and rightward highly-directional light unit 19R as viewed from the front side in the front-rear direction of body frame 2. Leftward highly-directional light unit 19L and rightward highly-directional light unit 19R are disposed as in any of the following FIGS. 11A to 11E.

Figure 11A:
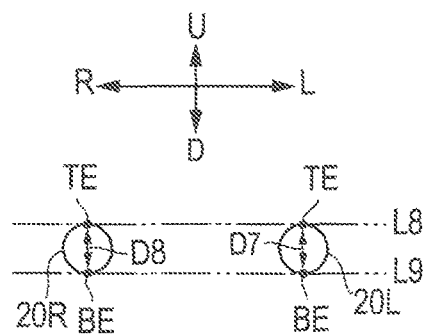
FIGS. 11A to 11E are diagrams describing examples of up-down direction symmetrical conditions of the leftward highly-directional light unit and the rightward highly-directional light unit according to Embodiment 1 of the present invention.

FIG. 11A will be described. In FIG. 11A, virtual line L8 is a line passing through top end TE of optical lens section 20L of leftward highly-directional light unit 19L and top end TE of optical lens section 20R of rightward highly-directional light unit 19R. Virtual line L9 is a line passing through bottom end BE of optical lens section 20L of leftward highly-directional light unit 19L and bottom end BE of optical lens section 20R of rightward highly-directional light unit 19R. Length D7 is a length between top end TE and bottom end BE of optical lens section 20 in the up-down direction of body frame 2. In other words, length D7 is a maximum lens width of optical lens section 20L in the up-down direction. Length D8 is a length between top end TE and bottom end BE of optical lens section 20R in the up-down direction of body frame 2. In other words, length D8 is a maximum lens width of optical lens section 20R in the up-down direction.

As illustrated in FIG. 11A, top end TE of optical lens section 20L and top end TE of optical lens section 20R as well as bottom end BE of optical lens section 20L and bottom end BE of optical lens section 20R are disposed at the same position in the up-down direction of body frame 2.

Figure 11B:
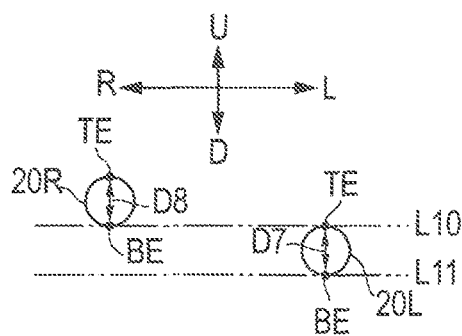

FIG. 11B will be described. In FIG. 11B, virtual line L10 is a line passing through top end TE of optical lens section 20L of leftward highly-directional light unit 19L. Virtual line L11 is a line passing through bottom end BE of optical lens section 20L of leftward highly-directional light unit 19L.

As illustrated in FIG. 11B, bottom end BE of optical lens section 20R is disposed below top end TE of optical lens section 20L in the up-down direction of body frame 2 and above bottom end BE of optical lens section 20L in the up-down direction of body frame 2. Therefore, optical lens section 20R is disposed in a range not separated by more than length D7 in the up-down direction of body frame 2.

Figure 11C:
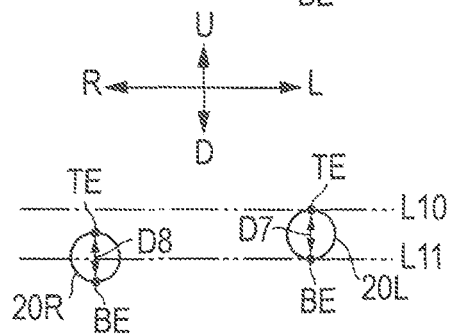

FIG. 11C will be described. As illustrated in FIG. 11C, top end TE of optical lens section 20R is disposed below top end TE of optical lens section 20L in the up-down direction of body frame 2 and above bottom end BE of optical lens section 20L in the up-down direction of body frame 2. Therefore, optical lens section 20R is disposed in a range not separated by more than length D7 in the up-down direction of body frame 2.

Figure 11D:
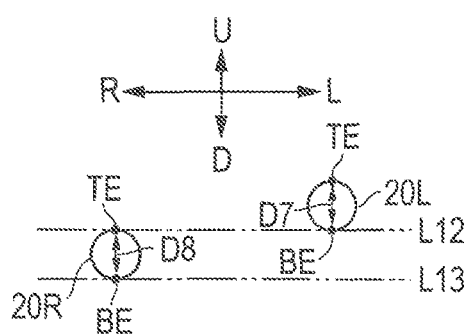

FIG. 11D will be described. In FIG. 11D, virtual line L12 is a line passing through top end TE of optical lens section 20R of rightward highly-directional light unit 19R. Virtual line L13 is a line passing through bottom end BE of optical lens section 20R of rightward highly-directional light unit 19R.

As illustrated in FIG. 11D, bottom end BE of optical lens section 20L is disposed below top end TE of optical lens section 20R in the up-down direction of body frame 2 and above bottom end BE of optical lens section 20R in the up-down direction of body frame 2. Therefore, optical lens section 20L is disposed in a range not separated by more than length D8 in the up-down direction of body frame 2.

Figure 11E:
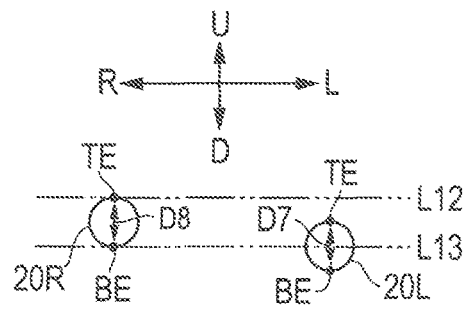

FIG. 11E will be described. As illustrated in FIG. 11E, top end TE of optical lens section 20L is disposed below top end TE of optical lens section 20R in the up-down direction of body frame 2 and above bottom end BE of optical lens section 20R in the up-down direction of body frame 2. Therefore, optical lens section 20L is disposed in a range not separated by more than length D8 in the up-down direction of body frame 2.

Leftward highly-directional light unit 19L and rightward highly-directional light unit 19R are disposed at the same position in the up-down direction of body frame 2 based on the up-down direction symmetrical conditions as viewed from the front side in the front-rear direction of body frame 2. Alternatively, rightward highly-directional light unit 19R is disposed in a range not separated by more than the maximum lens width in the up-down direction of optical lens section 20L of leftward highly-directional light unit 19L in the up-down direction of body frame 2 based on the up-down direction symmetrical conditions as viewed from the front side in the front-rear direction of body frame 2. Alternatively, leftward highly-directional light unit 19L is disposed in a range not separated by more than the maximum lens width in the up-down direction of optical lens section 20R of rightward highly-directional light unit 19R in the up-down direction of body frame 2 based on the up-down direction symmetrical conditions as viewed from the front side in the front-rear direction of body frame 2.

[Front-Rear Direction Symmetrical Conditions]

Front-rear direction symmetrical conditions of leftward highly-directional light unit 19L and rightward highly-directional light unit 19R as viewed from above in the up-down direction of body frame 2 will be described with reference to FIGS. 12A to 12C. Leftward highly-directional light unit 19L and rightward highly-directional light unit 19R form a pair of symmetrical lights in the example here.

The front-rear direction symmetrical conditions are conditions indicating the position of one of the highly-directional light units of the pair of symmetrical lights relative to the other highly-directional light unit in the front-rear direction of body frame 2, as viewed from the front side in the front-rear direction of body frame 2.

FIGS. 12A to 12C are diagrams describing examples of the front-rear direction symmetrical conditions of leftward highly-directional light unit 19L and rightward highly-directional light unit 19R as viewed from above in the up-down direction of body frame 2. Leftward highly-directional light unit 19L and rightward highly-directional light unit 19R are disposed as in any of the following FIGS. 12A to 12C.

FIG. 12A will be described. In FIG. 12A, virtual line L14 is a line passing through front end FE of leftward highly-directional light unit 19L and front end FE of rightward highly-directional light unit 19R. In FIG. 12A, virtual line L15 is a line passing through back end BAE of leftward highly-directional light unit 19L and back end BAE of rightward highly-directional light unit 19R.

In FIG. 12A, length D9 is a length between front end FE; and back end BAE of leftward highly-directional light unit 19L in the front-rear direction of body frame 2. In other words, length D9 is a length in the front-rear direction of leftward highly-directional light unit 19L. Length D10 is a length between front end FE and back end BAE of rightward highly-directional light unit 19R in the front-rear direction of body frame 2. In other words, length D10 is a length in the front-rear direction of rightward highly-directional light unit 19R.

As shown in FIG. 12A, front end FE of leftward highly-directional light unit 19L, front end FE of rightward highly-directional light unit 19R and, rear end BAE of leftward highly-directional light unit 19L and rear end BAE of rightward highly-directional light unit 19R are arranged without any misalignment from each other in the front-rear direction of body frame 2. That is, leftward highly-directional light unit 19L and rightward highly-directional light unit 19R are arranged at the same position in the front-rear direction of body frame 2.

Next, FIG. 12B will be described. In FIG. 12B, virtual line L16 is a straight line passing through front end FE of leftward highly-directional light unit 19L. Virtual line L17 is a straight line passing through rear end BAE of leftward highly-directional light unit 19L.

As shown in FIG. 12B, front end FE of rightward highly-directional light unit 19R is disposed behind front end FE of leftward highly-directional light unit 19L in the front-rear direction of body frame 2 and forward of rear end BAE of leftward highly-directional light unit 19L in the front-rear direction of body frame 2. That is, rightward highly-directional light unit 19R is disposed within a range of misalignment not greater than length D9 in the front-rear direction of body frame 2.

Next, FIG. 12C will be described. In FIG. 12C, virtual line L18 is a straight line passing through front end FE of rightward highly-directional light unit 19R. Virtual line L19 is a straight line passing through rear end BAE of rightward highly-directional light unit 19R.

As shown in FIG. 12C, front end FE of leftward highly-directional light unit 19L is disposed behind front end FE of rightward highly-directional light unit 19R in the front-rear direction of body frame 2 and forward of rear end BAE of rightward highly-directional light unit 19R in the front-rear direction of body frame 2. That is, leftward highly-directional light unit 19L is disposed within a range of misalignment not greater than length D10 in the front-rear direction of body frame 2.

Leftward highly-directional light unit 19L and rightward highly-directional light unit 19R are disposed at the same position in the front-rear direction of body frame 2 based on the front-rear direction symmetrical conditions as viewed from above in the up-down direction of body frame 2. Alternatively, rightward highly-directional light unit 19R is disposed in a range not separated by more than the length in the front-rear direction of leftward highly-directional light unit 19L in the front-rear direction of body frame 2 based on the front-rear direction symmetrical conditions as viewed from above in the up-down direction of body frame 2. Alternatively, leftward highly-directional light unit 19L is disposed in a range not separated by more than the length in the front-rear direction of rightward highly-directional light unit 19R in the front-rear direction of body frame 2 based on the front-rear direction symmetrical conditions as viewed from above in the up-down direction of body frame 2.

[Left-Right Direction Symmetrical Conditions]

Figure 13:
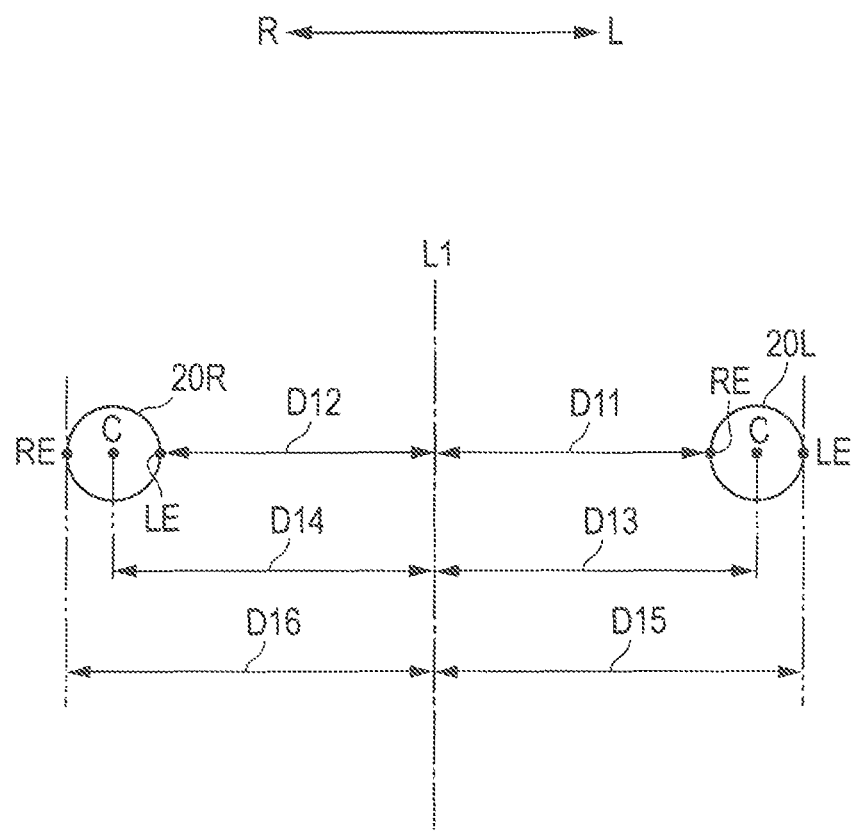
FIG. 13 is a diagram describing left-right direction symmetrical conditions of the leftward highly-directional light unit and the rightward highly-directional light unit according to Embodiment 1 of the present invention.

Left-right direction symmetrical conditions of leftward highly-directional light unit 19L and rightward highly-directional light unit 19R as viewed from the front side in the front-rear direction of body frame 2 will be described with reference to FIG. 13. Leftward highly-directional light unit 19L and rightward highly-directional light unit 19R form a pair of symmetrical lights in the example here. The left-right direction symmetrical conditions are conditions indicating the position of one of the highly-directional light units of the pair of symmetrical lights relative to the other highly-directional light unit in the left-right direction of body frame 2, as viewed from the front side in the front-rear direction of body frame 2. FIG. 13 is a diagram describing the left-right direction symmetrical conditions of leftward highly-directional light unit 19L and rightward highly-directional light unit 19R as viewed from the front side in the front-rear direction of body frame 2.

The definitions of lengths D11 to D16 illustrated in FIG. 13 are as follows. Length D11 is a length between right end RE of optical lens section 20L of leftward highly-directional light unit 19L and virtual line L1 in the left-right direction of body frame 2. Length D12 is a length between left end LE of optical lens section 20R of rightward highly-directional light unit 19R and virtual line L1 in the left-right direction of body frame 2. Length D13 is a length between center C of optical lens section 20L of leftward highly-directional light unit 19L and virtual line L1 in the left-right direction of body frame 2. Length D14 is a length between center C of optical lens section 20R of rightward highly-directional light unit 19R and virtual line L1 in the left-right direction of body frame 2. Length D15 is a length between left end LE of optical lens section 20L of leftward highly-directional light unit 19L and virtual line L1 in the left-right direction of body frame 2. Length D16 is a length between right end RE of optical lens section 20R of rightward highly-directional light unit 19R and virtual line L1 in the left-right direction of body frame 2.

As illustrated in FIG. 13, length D13 is greater than length D12 and smaller than length D16. Length D14 is greater than length D11 and smaller than length D15.

Leftward highly-directional light unit 19L is disposed in a range not separated by more than ½ of the maximum lens width in the left-right direction of optical lens section 20R of rightward highly-directional light unit 19R in the left-right direction of the body frame based on the left-right direction symmetrical conditions as viewed from the front side in the front-rear direction of body frame 2. Alternatively, rightward highly-directional light unit 19R is disposed in a range not separated by more than ½ of the maximum lens width in the left-right direction of optical lens section 20L of leftward highly-directional light unit 19L in the left-right direction of the body frame based on the left-right direction symmetrical conditions as viewed from the front side in the front-rear direction of body frame 2.

When leftward highly-directional light unit 19L and rightward highly-directional light unit 19R form a pair of symmetrical lights, one of the high-directional light units of the pair of symmetrical lights is disposed in a range not separated by more than the maximum lens width in the up-down direction of the optical lens section of the other high-directional light unit of the pair of symmetrical lights in the up-down direction of body frame 2 as viewed from the front side in the front-rear direction of body frame 2, is disposed in a range not separated by more than the length in the front-rear direction of the other high-directional light unit of the pair of symmetrical lights in the front-rear direction of body frame 2 as viewed from above in the up-down direction of body frame 2, and is disposed in a range not separated by more than ½ of the maximum lens width in the left-right direction of the optical lens section of the other high-directional light unit of the pair of symmetrical lights in the left-right direction of body frame 2 as viewed from the front side in the front-rear direction of body frame 2 based on the up-down direction symmetrical conditions, the front-rear direction symmetrical conditions, and the left-right direction symmetrical conditions described above. Therefore, the front-rear direction symmetrical conditions, and the left-right direction symmetrical conditions, leftward highly-directional light unit 19L and rightward highly-directional light unit 19R are symmetrically disposed or substantially symmetrically disposed based on the up-down direction symmetrical conditions as viewed from the front side in the front-rear direction of body frame 2 and from above in the up-down direction of body frame 2.

Variation of Embodiment 1

In the configuration described in Embodiment 1, the straddled vehicle includes one leftward highly-directional light unit and one rightward highly-directional light unit. In the configuration described below in a variation of Embodiment 1, the straddled vehicle includes two leftward highly-directional light units and two rightward highly-directional light units.

Figure 16:
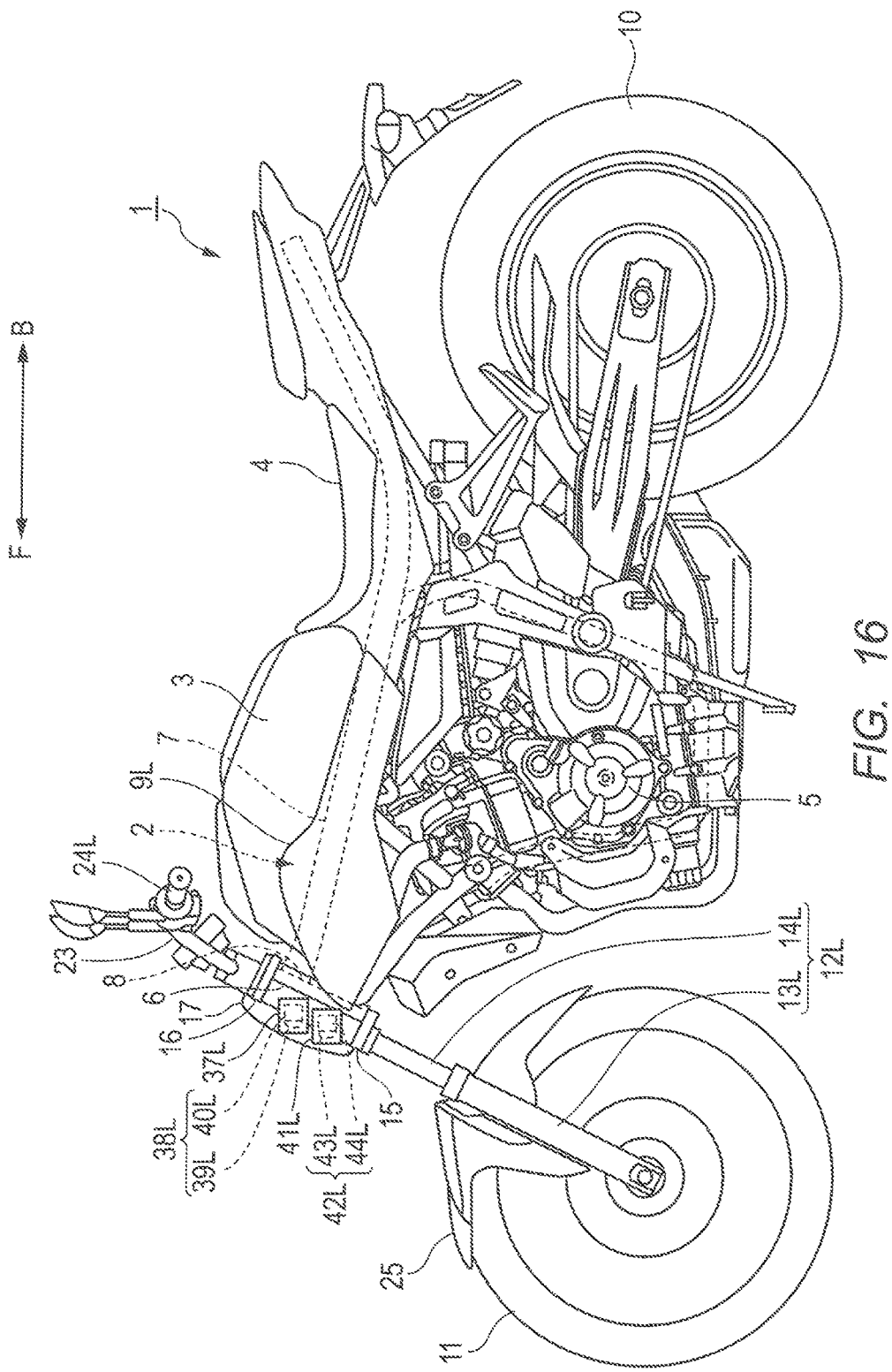
FIG. 16 is a side view illustrating the straddled vehicle according to Variation of Embodiment 1 of the present invention.
Figure 17:
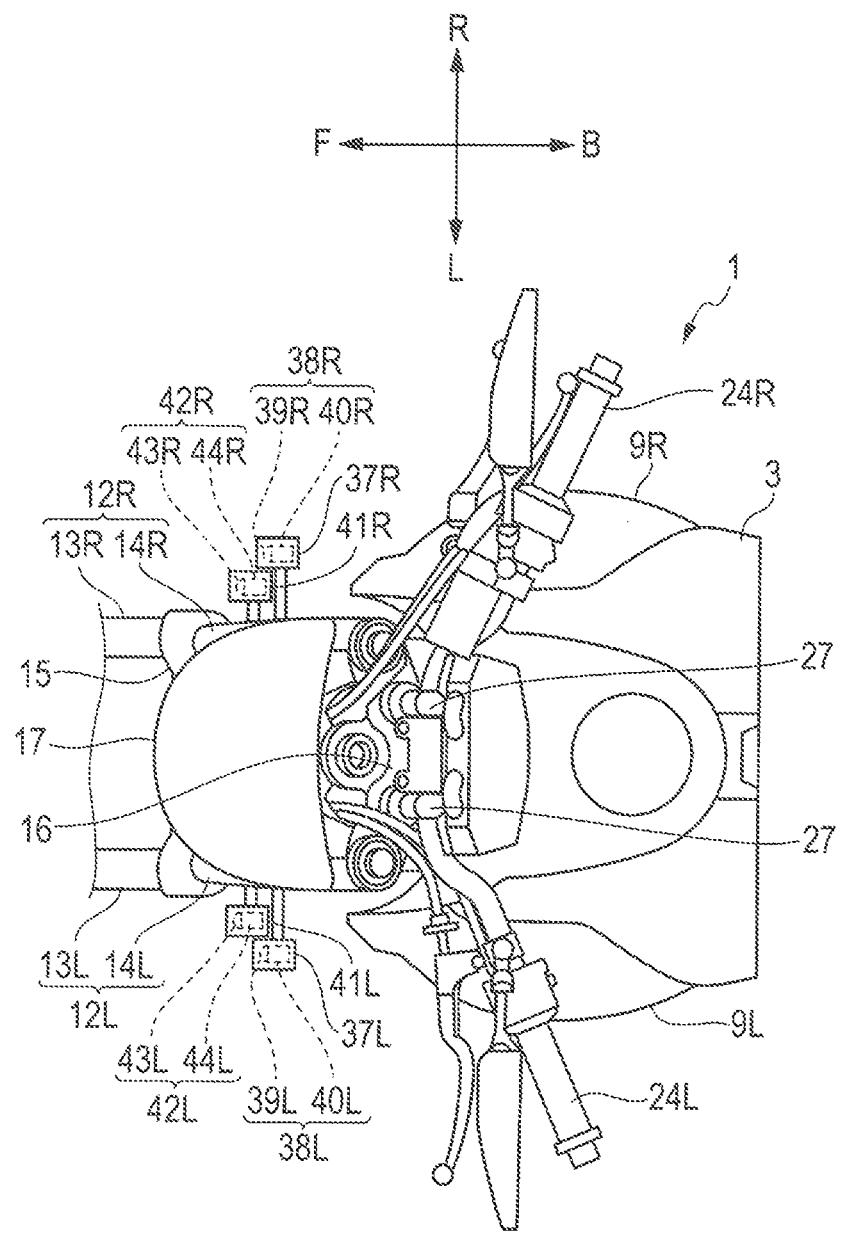
FIG. 17 is a plan view illustrating the straddled vehicle according to a variation of Embodiment 1 of the present invention.

FIG. 16 is a side view of straddled vehicle 1 according to this variation. FIG. 17 is a plan view of straddled vehicle 1 according to this variation. In FIGS. 16 and 17, the same constituent elements as the constituent elements illustrated in FIGS. 1 and 3 are designated with the same reference signs, and the description will not be repeated.

As illustrated in FIGS. 16 and 17, left lamp unit 37L is fixed and supported above by left front-wheel support unit 12L, and left lamp unit 41L is fixed and supported below by left front-wheel support unit 12L, on the left side of left front-wheel support unit 12L in the left-right direction of body frame 2.

Left lamp unit 37L includes leftward highly-directional light unit 38L in the casing. Leftward highly-directional light unit 38L includes, for example, optical lens section 39L and case 40L.

Left lamp unit 41L includes leftward highly-directional light unit 42L in the casing. The leftward highly-directional light unit 42L includes, for example, optical lens section 43L and case 44L.

Although leftward highly-directional light unit 38L and leftward highly-directional light unit 42L are included in separate lamp units in the example here, leftward highly-directional light unit 38L and leftward highly-directional light unit 42L may be included in a single lamp unit. Leftward highly-directional light unit 38L and leftward highly-directional light unit 42L can be collectively called a left light group.

As illustrated in FIG. 17, right lamp unit 37R is fixed and supported above by right front-wheel support unit 12R, and right lamp unit 41R is fixed and supported below by right front-wheel support unit 12R, on the right side of right front-wheel support unit 12R in the left-right direction of body frame 2.

Right lamp unit 37R includes rightward highly-directional light unit 38R in the casing. Rightward highly-directional light unit 38R includes, for example, optical lens section 39R and case 40R.

Right lamp unit 41R includes rightward highly-directional light unit 42R in the casing. Rightward highly-directional light unit 42R includes, for example, optical lens section 43R and case 44R.

Although rightward highly-directional light unit 38R and rightward highly-directional light unit 42R are included in separate lamp units in the example here, rightward highly-directional light unit 38R and rightward highly-directional light unit 42R may be included in a single lamp unit. Rightward highly-directional light unit 38R and rightward highly-directional light unit 42R can be collectively called a right light group.

The light emitted outside from the light group including leftward highly-directional light unit 38L, leftward highly-directional light unit 42L, rightward highly-directional light unit 38R, and rightward highly-directional light unit 42R forms a main beam and a dipped beam. The details will be described later with reference to FIGS. 20A to 20H.

Leftward highly-directional light unit 38L, leftward highly-directional light unit 42L, rightward highly-directional light unit 38R, and rightward highly-directional light unit 42R have any of the configurations illustrated in FIGS. 6A to 6C.

<Necessary Conditions of Highly-Directional Light Units>

Leftward highly-directional light unit 38L, leftward highly-directional light unit 42L, rightward highly-directional light unit 38R, and rightward highly-directional light unit 42R are disposed to satisfy the front-view arrangement conditions and the side-view arrangement conditions described above.

Figure 18:
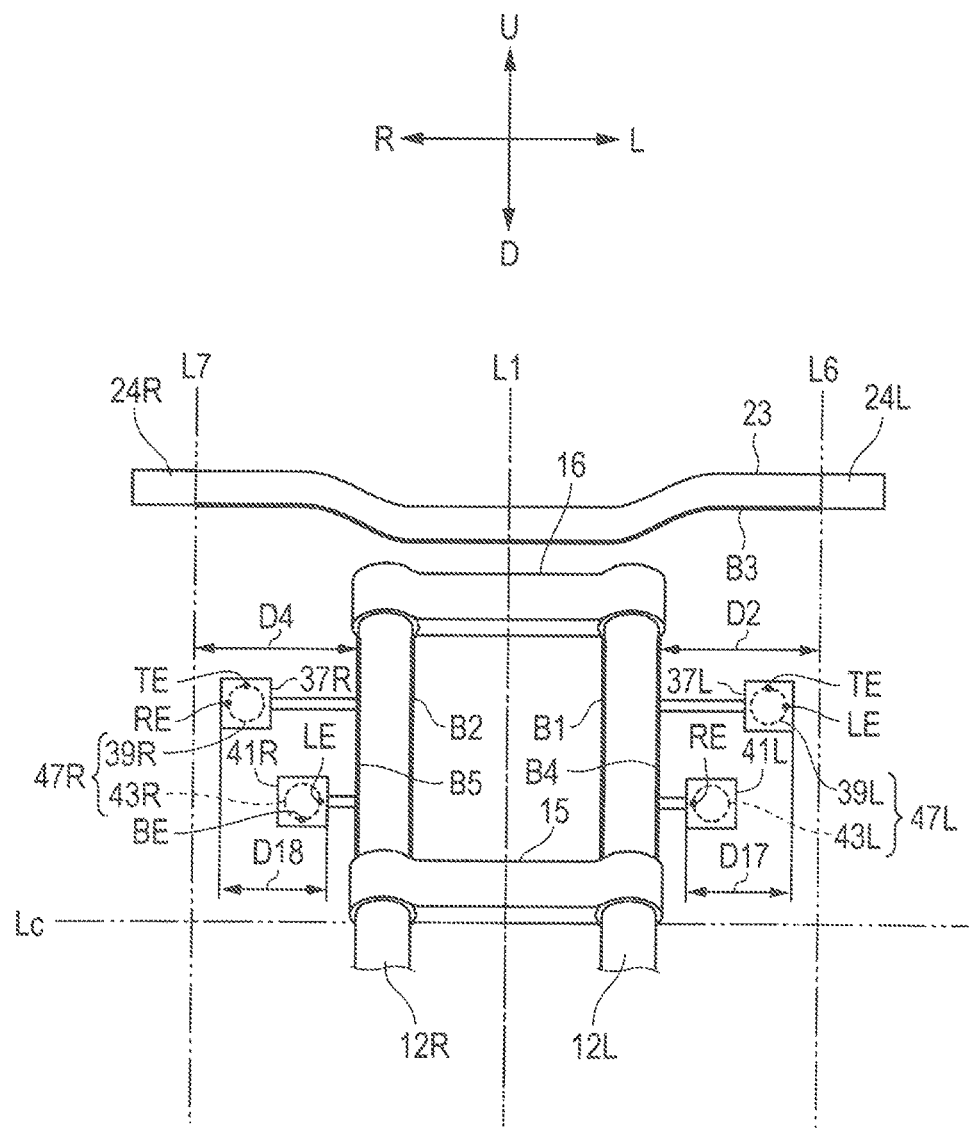
FIG. 18 is a diagram describing left-right length conditions of leftward highly-directional light units and rightward highly-directional light units according to the variation of Embodiment 1 of the present invention.

The front-view arrangement conditions will be specifically described with reference to FIG. 18. FIG. 18 illustrates an example of arrangement of leftward highly-directional light unit 38L, leftward highly-directional light unit 42L, rightward highly-directional light unit 38R, and rightward highly-directional light unit 42R as viewed from the front side in the front-rear direction of body frame 2.

In FIG. 18, optical lens section 39L of leftward highly-directional light unit 38L is at the leftmost position in the left-right direction of body frame 2 and at the uppermost position in the up-down direction of body frame 2 in the left light group, as viewed from the front side in the front-rear direction of body frame 2. Optical lens section 43L of leftward highly-directional light unit 42L is at the rightmost position in the left-right direction of body frame 2 and at the lowermost position in the up-down direction of body frame 2 in the left light group, as viewed from the front side in the front-rear direction of body frame 2.

In FIG. 18, optical lens section 39R of rightward highly-directional light unit 38R is at the rightmost position in the left-right direction of body frame 2 and at the uppermost position in the up-down direction of body frame 2 in the right light group, as viewed from the front side in the front-rear direction of body frame 2. Optical lens section 43R of rightward highly-directional light unit 42R is at the leftmost position in the left-right direction of body frame 2 and at the lowermost position in the up-down direction of body frame 2 in the right light group, as viewed from the front side in the front-rear direction of body frame 2.

In FIG. 18, left optical lens body 47L includes optical lens section 39L of leftward highly-directional light unit 38L and optical lens section 43L of leftward highly-directional light unit 42L. The top end of left optical lens body 47L is top end TE of optical lens section 39L at the uppermost position in the up-down direction of body frame 2. The bottom end of left optical lens body 47L is bottom end BE of optical lens section 43L at the lowermost position in the up-down direction of body frame 2. The left end of left optical lens body 47L is left end LE of optical lens section 39L at the leftmost position in the left-right direction of body frame 2. The right end of left optical lens body 47L is right end RE of optical lens section 43L at the rightmost position in the left-right direction of body frame 2.

In FIG. 18, right optical lens body 47R includes optical lens section 39R of rightward highly-directional light unit 38R and optical lens section 43R of rightward highly-directional light unit 42R. The top end of right optical lens body 47R is top end TE of optical lens section 39R at the uppermost position in the up-down direction of body frame 2. The bottom end of right optical lens body 47R is bottom end BE of optical lens section 43R at the lowermost position in the up-down direction of body frame 2. The left end of right optical lens body 47R is left end LE of optical lens section 43R at the leftmost position in the left-right direction of body frame 2. The right end of right optical lens body 47R is right end RE of optical lens section 39R at the rightmost position in the left-right direction of body frame 2.

As illustrated in FIG. 18, in straddled vehicle 1 of this variation, top end TE of optical lens section 39L of leftward highly-directional light unit 38L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L, as viewed from the front side in the front-rear direction of body frame 2.

As illustrated in FIG. 18, in straddled vehicle 1 of this variation, top end TE of optical lens section 43L of leftward highly-directional light unit 42L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L, as viewed from the front side in the front-rear direction of body frame 2.

As illustrated in FIG. 18, in straddled vehicle 1 of this variation, the top end of left optical lens body 47L (top end TE of optical lens section 39L) is disposed below bottom edge B3 of handlebar 23 in the up-down direction of body frame 2, and the bottom end of left optical lens body 47L (bottom end BE of optical lens section 43L) is disposed above the bottom end (virtual line Lc) of lower bracket 15 in the up-down direction of body frame 2, as viewed from the front side in the front-rear direction of body frame 2. The left end of left optical lens body 47L (left end LE of optical lens section 39L) is disposed on the right of the right end (virtual line L6) of left grip 24L in the left-right direction of body frame 2, and the right end of left optical lens body 47L (right end RE of optical lens section 43L) is disposed on the left of right edge B1 of left front-wheel support unit 12L in the left-right direction of body frame 2.

As illustrated in FIG. 18, in straddled vehicle 1 of this variation, top end TE of optical lens section 39R of rightward highly-directional light unit 38R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2.

As illustrated in FIG. 18, in straddled vehicle 1 of this variation, top end TE of optical lens section 43R of rightward highly-directional light unit 42R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2.

As illustrated in FIG. 18, in straddled vehicle 1 of this Variation, the top end of right optical lens body 47R (top end TE of optical lens section 39R) is disposed below bottom edge B3 of handlebar 23 in the up-down direction of body frame 2, and the bottom end of right optical lens body 47R (bottom end BE of optical lens section 43R) is disposed above the bottom end (virtual line Lc) of lower bracket 15 in the up-down direction of body frame 2. The right end of right optical lens body 47R (right end RE of optical lens section 39R) is disposed on the left of the left end (virtual line L7) of right grip 24R in the left-right direction of body frame 2, and the left end of right optical lens body 45R (left end LE of optical lens section 43R) is disposed on the right of left edge B2 of right front-wheel support unit 12R in the left-right direction of body frame 2.

As described, leftward highly-directional light unit 38L, leftward highly-directional light unit 42L, rightward highly-directional light unit 38R, and rightward highly-directional light unit 42R are disposed to satisfy the front-view arrangement conditions in straddled vehicle 1 according to this variation.

Although not illustrated, at least part of leftward highly-directional light unit 38L and/or at least part of leftward highly-directional light unit 42L are provided at positions overlapping turn range TR of left front-wheel support unit 12L as viewed from the left side in the left-right direction of body frame 2 in straddled vehicle 1 according to this variation. At least part of rightward highly-directional light unit 38R and/or at least part of rightward highly-directional light unit 42R are provided at positions overlapping turn range TR of right front-wheel support unit 12R as viewed from the right side in the left-right direction of body frame 2.

As described, leftward highly-directional light unit 38L, leftward highly-directional light unit 42L, rightward highly-directional light unit 38R, and rightward highly-directional light unit 42R are disposed to satisfy the side-view arrangement conditions in straddled vehicle 1 according to this variation.

Therefore, in straddled vehicle 1 according to this variation, leftward highly-directional light units 38L and 42L and rightward highly-directional light units 38R and 42R are disposed at intervals in the left-right direction of body frame 2 and are disposed in a range between the right end of left grip 24L and the left end of right grip 24R in the left-right direction of body frame 2, as viewed from the front side in the front-rear direction of body frame 2.

In straddled vehicle 1 according to this variation, leftward highly-directional light units 38L and 42L and rightward highly-directional light units 38R and 42R are not disposed in a range surrounded by left front-wheel support unit 12L, right front-wheel support unit 12R, upper bracket 16, and lower bracket 15 as viewed from the front side in the front-rear direction of body frame 2, and a space can be provided at the center of the vehicle body.

In straddled vehicle 1 according to this variation, leftward highly-directional light units 38L and 42L and rightward highly-directional light units 38R and 42R are not disposed forward of turn range TR in the front-rear direction of body frame 2, and an increase in the size of the body section in the front-rear direction can be limited.

Therefore, according to straddled vehicle 1 of this variation, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited, and a space can be secured forward of the steering shaft.

In straddled vehicle 1 of this variation, leftward highly-directional light units 38L and 42L and rightward highly-directional light units 38R and 42R are disposed in a range between bottom edge B3 of handlebar 23 and the top end (virtual line Lc) of lower bracket 15 in the up-down direction of body frame 2 based on the front-view arrangement conditions as viewed from the front side in the front-rear direction of body frame 2. This can prevent the light included in the main beam or the dipped beam from interfering with fender 25.

<Additional Conditions of Highly-Directional Light Units>

In this variation, leftward highly-directional light unit 38L, leftward highly-directional light unit 42L, rightward highly-directional light unit 38R, and rightward highly-directional light unit 42R may be disposed to satisfy at least one of the following additional conditions in addition to the front-view arrangement conditions and the side-view arrangement conditions that are necessary conditions.

[Up-Down Direction Symmetrical Conditions, Front-Rear Direction Symmetrical Conditions, and Left-Right Direction Symmetrical Conditions]

In this variation, leftward highly-directional light unit 38L, leftward highly-directional light unit 42L, rightward highly-directional light unit 38R, and rightward highly-directional light unit 42R may be disposed to satisfy at least one of the up-down direction symmetrical conditions, the front-rear direction symmetrical conditions, and the left-right direction symmetrical conditions described above.

For example, among leftward highly-directional light unit 38L, leftward highly-directional light unit 42L, rightward highly-directional light unit 38R, and rightward highly-directional light unit 42R, leftward highly-directional light unit 38L and rightward highly-directional light unit 38R form a pair of symmetrical lights, and leftward highly-directional light unit 42L and rightward highly-directional light unit 42R form a pair of symmetrical lights. In this case, the pairs of symmetrical lights may be disposed to satisfy at least one of the up-down direction symmetrical conditions described with reference to FIGS. 11A to 11E, the front-rear direction symmetrical conditions described with reference to FIGS. 12A to 12C, and the left-right direction symmetrical conditions described with reference to FIG. 13.

[Left-Right Length Conditions]

In this variation, leftward highly-directional light unit 38L, leftward highly-directional light unit 42L, rightward highly-directional light unit 38R, and rightward highly-directional light unit 42R may be disposed to satisfy the following left-right length conditions, in place of the lens width conditions.

The left-right length conditions of leftward highly-directional light unit 38L, leftward highly-directional light unit 42L, rightward highly-directional light unit 38R, and rightward highly-directional light unit 42R as viewed from the front side in the front-rear direction of body frame 2 will be described with reference to FIG. 18.

The left-right length conditions are conditions indicating a relationship between (1) the length of an interval in the left-right direction of body frame 2 between the left end of the optical lens section of the highly-directional light unit located at the leftmost position in the left-right direction of body frame 2 in the plurality of leftward highly-directional light units (left light group) and the right end of the optical lens section of the highly-directional light unit located at the rightmost position in the left-right direction of body frame 2 (in other words, the length between the left end and the right end of the left optical lens body in the left-right direction of body frame 2) and (2) the length of an interval in the left-right direction of body frame 2 between the right end of left grip 24L and the left edge of left front-wheel support unit 12L, as viewed from the front side in the front-rear direction of body frame 2.

The left-right length conditions are conditions indicating a relationship between (1) the length of an interval in the left-right direction of body frame 2 between the right end of the optical lens section of the highly-directional light unit located at the rightmost position in the left-right direction of body frame 2 in the plurality of rightward highly-directional light units (right light group) and the left end of the optical lens section of the highly-directional light unit located at the leftmost position in the left-right direction of body frame 2 (in other words, the length between the right end and the left end of the right optical lens body in the left-right direction of body frame 2) and (2) the length of an interval in the left-right direction of body frame 2 between the left end of right grip 24R and the right edge of right front-wheel support unit 12R, as viewed from the front side in the front-rear direction of body frame 2.

FIG. 18 is a diagram describing the left-right length conditions of leftward highly-directional light unit 38L, leftward highly-directional light unit 42L, rightward highly-directional light unit 38R, and rightward highly-directional light unit 42R as viewed from the front side in the front-rear direction of body frame 2.

As illustrated in FIG. 18, of left lamp unit 37L and left lamp unit 41L, left lamp unit 37L is at the leftmost position in the left-right direction of body frame 2, and left lamp unit 41L is at the rightmost position in the left-right direction of body frame 2. Therefore, leftward highly-directional light unit 38L included in left lamp unit 37L is at the leftmost position in the left-right direction of body frame 2, and leftward highly-directional light unit 42L included in left lamp unit 41L is at the rightmost position in the left-right direction of body frame 2.

As illustrated in FIG. 18, of right lamp unit 37R and right lamp unit 41R, right lamp unit 37R is at the rightmost side in the left-right direction of body frame 2, and right lamp unit 41R is at the leftmost position in the left-right direction of body frame 2. Therefore, rightward highly-directional light unit 38R included in right lamp unit 37R is at the rightmost position in the left-right direction of body frame 2, and rightward highly-directional light unit 42R included in right lamp unit 41R is at the leftmost position in the left-right direction of body frame 2.

Length D17 illustrated in FIG. 18 indicates a length between left end LE of optical lens section 39L of leftward highly-directional light unit 38L and right end RE of optical lens section 43L of leftward highly-directional light unit 42L in the left-right direction of body frame 2. In other words, length D17 is a length between the left end and the right end of left optical lens body 47L in the left-right direction of body frame 2. Length D18 illustrated in FIG. 18 indicates a length between right end RE of optical lens section 39R of rightward highly-directional light unit 38R and left end LE of optical lens section 43R of rightward highly-directional light unit 42R in the left-right direction of body frame 2. In other words, length D18 is a length between the right end and the left end of right optical lens body 47R in the left-right direction of body frame 2. Length D2 and length D4 are the same as in FIG. 9.

As illustrated in FIG. 18, length D17 is shorter than length D2, and length D18 is shorter than length D4.

Leftward highly-directional light unit 38L and leftward highly-directional light unit 42L are more compactly disposed in the left-right direction of body frame 2 than in the up-down direction of body frame 2 based on the left-right length conditions as viewed from the front side in the front-rear direction of body frame 2. Rightward highly-directional light unit 38R and rightward highly-directional light unit 42R are more compactly disposed in the left-right direction of body frame 2 than in the up-down direction of body frame 2 based on the left-right length conditions as viewed from the front side in the front-rear direction of body frame 2.

[Up-Down Left-Right Length Conditions]

In this variation, leftward highly-directional light unit 38L, leftward highly-directional light unit 42L, rightward highly-directional light unit 38R, and rightward highly-directional light unit 42R may be disposed to satisfy the following up-down left-right length conditions.

The up-down left-right length conditions of leftward highly-directional light unit 38L, leftward highly-directional light unit 42L, rightward highly-directional light unit 38R, and rightward highly-directional light unit 42R as viewed from the front side in the front-rear direction of body frame 2 will be described with reference to FIG. 19.

The up-down left-right length conditions are conditions indicating a relationship between (1) the length of an interval in the up-down direction of body frame 2 between the top end of the optical lens section of the highly-directional light unit located at the uppermost position in the up-down direction of body frame 2 in the plurality of leftward highly-directional light units (left light group) and the bottom end of the optical lens section of the highly-directional light unit located at the lowermost position in the up-down direction of body frame 2 (in other words, the length between the top end and the bottom end of the left optical lens body in the up-down direction of body frame 2) and (2) the length of an interval in the left-right direction of body frame 2 between the left end of the optical lens section of the highly-directional light unit located at the leftmost position in the left-right direction of body frame 2 in the plurality of leftward highly-directional light units (left light group) and the right end of the optical lens section of the highly-directional light unit at the rightmost position in the left-right direction of body frame 2 (in other words, the length between the left end and the right end of the left optical lens body in the up-down direction of body frame 2), as viewed from the front side in the front-rear direction of body frame 2.

The up-down left-right length conditions are conditions indicating a relationship between (1) the length of an interval in the up-down direction of body frame 2 between the top end of the optical lens section of the highly-directional light unit located at the uppermost position in the up-down direction of body frame 2 in the plurality of rightward highly-directional light units (right light group) and the bottom end of the optical lens section of the highly-directional light unit located at the lowermost position in the up-down direction of body frame 2 (in other words, the length between the top end and the bottom end of the right optical lens body in the up-down direction of body frame 2) and (2) the length of an interval in the left-right direction of body frame 2 between the right end of the optical lens section of the highly-directional light unit located at the rightmost position in the left-right direction of body frame 2 in the plurality of rightward highly-directional light units (right light group) and the left end of the optical lens section of the highly-directional light unit located at the leftmost position in the left-right direction of body frame 2 (in other words, the length between the right end and the left end of the right optical lens body in the up-down direction of body frame 2), as viewed from the front side in the front-rear direction of body frame 2.

Figure 19:
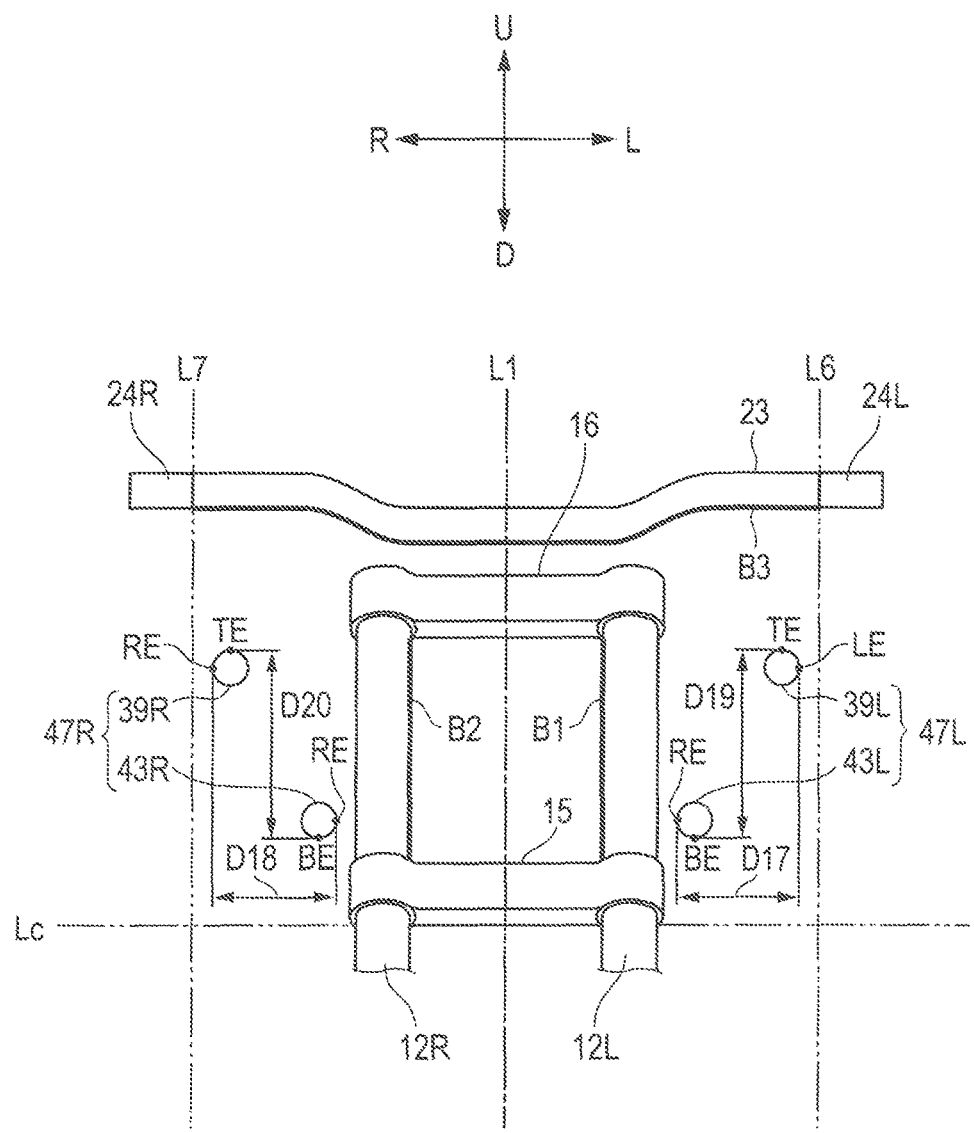
FIG. 19 is a diagram describing up-down left-right length conditions of the leftward highly-directional light units and the rightward highly-directional light units according to the variation of Embodiment 1 of the present invention.

FIG. 19 is a diagram describing the up-down left-right length conditions of leftward highly-directional light unit 38L, leftward highly-directional light unit 42L, rightward highly-directional light unit 38R, and rightward highly-directional light unit 42R as viewed from the front side in the front-rear direction of body frame 2. In FIG. 19, illustrations of the casing of left lamp units 37L and 41L and the casing of right lamp units 37R and 41R are omitted.

As illustrated in FIG. 19, of optical lens section 39L and optical lens section 43L, optical lens section 39L is at the leftmost position in the left-right direction of body frame 2 and is at the uppermost position in the up-down direction of body frame 2. Therefore, leftward highly-directional light unit 38L including optical lens section 39L is at the leftmost position in the left-right direction of body frame 2 and is at the uppermost position in the up-down direction of body frame 2. As illustrated in FIG. 19, of optical lens section 39L and optical lens section 43L, optical lens section 43L is at the rightmost position in the left-right direction of body frame 2 and is at the lowermost position in the up-down direction of body frame 2. Therefore, leftward highly-directional light unit 42L including the optical lens section 43L is at the rightmost position in the left-right direction of body frame 2 and is at the lowermost position in the up-down direction of body frame 2.

As illustrated in FIG. 19, of optical lens section 39R and optical lens section 43R, optical lens section 39R is at the rightmost position in the left-right direction of body frame 2 and is at the uppermost position in the up-down direction of body frame 2. Therefore, rightward highly-directional light unit 38R including optical lens section 39R is at the rightmost position in the left-right direction of body frame 2 and is at the uppermost position in the up-down direction of body frame 2. As illustrated in FIG. 19, of optical lens section 39R and optical lens section 43R, optical lens section 43R is at the leftmost position in the left-right direction of body frame 2 and is at the lowermost position in the up-down direction of body frame 2. Therefore, rightward highly-directional light unit 42R including optical lens section 43R is at the leftmost position in the left-right direction of body frame 2 and is at the lowermost position in the up-down direction of body frame 2.

Length D19 illustrated in FIG. 19 indicates a length between top end TE of optical lens section 39L of leftward highly-directional light unit 38L and bottom end BE of optical lens section 43L of leftward highly-directional light unit 42L in the up-down direction of body frame 2. In other words, length D19 is a length between the top end and the bottom end of left optical lens body 47L in the up-down direction of body frame 2. Length D20 illustrated in FIG. 19 indicates a length between top end TE of optical lens section 39R of rightward highly-directional light unit 38R and bottom end BE of optical lens section 43R of rightward highly-directional light unit 42R in the up-down direction of body frame 2. In other words, length D20 is a length between the top end and the bottom end of right optical lens body 47R in the up-down direction of body frame 2. Length D17 and length D18 are the same as in FIG. 18.

As illustrated in FIG. 19, length D19 is longer than length D17, and length D20 is longer than length D18.

Of leftward highly-directional light units 38L and 42L, leftward highly-directional light unit 38L located at the leftmost position in the left-right direction of body frame 2 and leftward highly-directional light unit 42L located at the rightmost position in the left-right direction of body frame 2 are more compactly disposed in the left-right direction of body frame 2 based on the up-down left-right length conditions. Therefore, straddled vehicle 1 does not increase in size in the left-right direction of body frame 2. Of rightward highly-directional light units 38R and 42R, rightward highly-directional light unit 38R located at the rightmost position in the left-right direction of body frame 2 and rightward highly-directional light unit 42R located at the leftmost position in the left-right direction of body frame 2 are more compactly disposed in the left-right direction of body frame 2 based on the up-down left-right length conditions. Therefore, straddled vehicle 1 does not increase in size in the left-right direction of body frame 2.

<Example of Layout of Highly-Directional Light Units>

The layout of the highly-directional light units in this variation will be described with reference to FIGS. 20A to 20H.

FIGS. 20A to 20H are front views indicating examples of the layout of the highly-directional light units as viewed from the front side in the front-rear direction of body frame 2, in which the left light group includes highly-directional light units 38L and 42L, and the right light group includes highly-directional light units 38R and 42R. Leftward highly-directional light units 38L and 42L and rightward highly-directional light units 38R and 42R have any of the configurations illustrated in FIGS. 20A to 20H.

In FIG. 20A to FIG. 20H, "H" represents a highly-directional light unit in which a light distribution formed by an optical lens section becomes at least part of a light distribution of a main beam (hereinafter referred to as "main beam highly-directional light unit"). "L" represents a highly-directional light unit in which a light distribution formed by an optical lens section becomes at least part of a light distribution of a dipped beam (hereinafter referred to as "dipped beam highly-directional light unit").

Figure 20A:
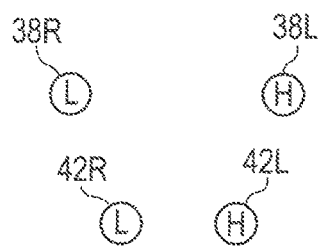
FIGS. 20A to 20H are diagrams describing light type conditions of the leftward highly-directional light units and the rightward highly-directional light units according to the variation of Embodiment 1 of the present invention.
Figure 20B:
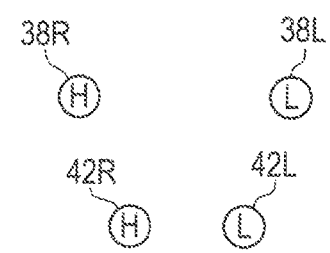
Figure 20C:
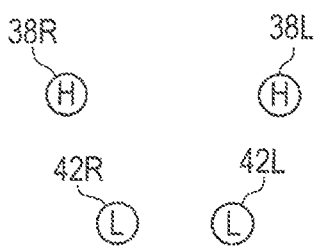
Figure 20D:
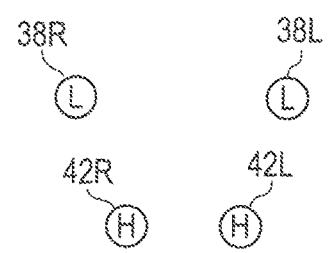
Figure 20E:
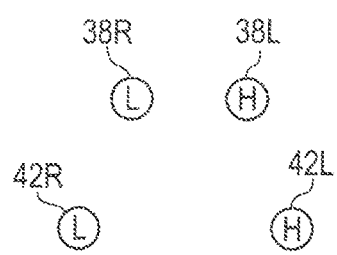

In the examples of FIGS. 20A and 20E, leftward highly-directional light unit 38L and leftward highly-directional light unit 42L are highly-directional light units for main beam, and rightward highly-directional light unit 38R and rightward highly-directional light unit 42R are highly-directional light unit for dipped beam.

Figure 20F:
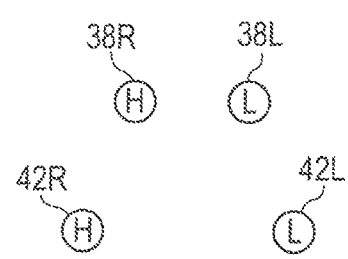

In the examples of FIGS. 20B and 20F, leftward highly-directional light unit 38L and leftward highly-directional light unit 42L are highly-directional light units for dipped beam, and rightward highly-directional light unit 38R and rightward highly-directional light unit 42R are highly-directional light units for main beam.

Figure 20G:
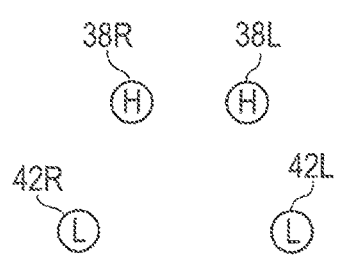

In the examples of FIGS. 20C and 20G, leftward highly-directional light unit 38L and rightward highly-directional light unit 38R are highly-directional light units for main beam, and leftward highly-directional light unit 42L and rightward highly-directional light unit 42R are highly-directional light units for dipped beam.

Figure 20H:
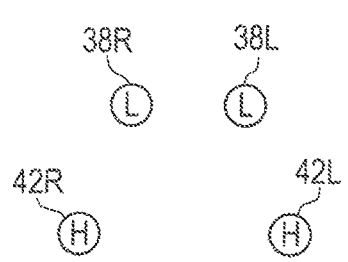

In the examples of FIGS. 20D and 20H, leftward highly-directional light unit 38L and rightward highly-directional light unit 38R are highly-directional light units for dipped beam, and leftward highly-directional light unit 42L and rightward highly-directional light unit 42R are highly-directional light units for main beam.

The above-described layout allows the two main beam highly-directional light units and the two dipped beam highly-directional light units to be arranged in a separated manner in the left-right direction of body frame 2. Furthermore, the above-described layout allows one main beam highly-directional light unit and one dipped beam highly-directional light unit to be arranged in the left-right direction of body frame 2.

<Patterns of Arrangement of Highly-Directional Light Units>

Patterns of arrangement of the highly-directional light units according to this variation will be described with reference to FIGS. 20A to 20H.

FIGS. 20A to 20H are front views illustrating examples of the pattern of arrangement of the highly-directional light units as viewed from the front side in the front-rear direction of body frame 2, in which the left light group includes highly-directional light units 38L and 42L, and the right light group includes highly-directional light units 38R and 42R. Leftward highly-directional light units 38L and 42L and rightward highly-directional light units 38R and 42R have any of the configurations illustrated in FIGS. 20A to 20H.

In the examples of FIGS. 20A to 20D, leftward highly-directional light unit 42L located at the rightmost position in the left-right direction of body frame 2 in the left light group is located at the lowermost position in the up-down direction of body frame 2 in the left light group. Rightward highly-directional light unit 42R located at the leftmost position in the left-right direction of body frame 2 in the right light group is located at the lowermost position in the up-down direction of body frame 2 in the right light group. Leftward highly-directional light unit 38L located at the leftmost position in the left-right direction of body frame 2 in the left lights is located at the uppermost position in the up-down direction of body frame 2 in the left light group. Rightward highly-directional light unit 38R located at the rightmost position in the left-right direction of body frame 2 in the right light group is located at the uppermost position in the up-down direction of body frame 2 in the right light group.

In the examples of FIGS. 20E to 20H, leftward highly-directional light unit 38L located at the rightmost position in the left-right direction of body frame 2 in the left light group is located at the uppermost position in the up-down direction of body frame 2 in the left light group. Rightward highly-directional light unit 38R located at the leftmost position in the left-right direction of body frame 2 in the right light group is located at the uppermost position in the up-down direction of body frame 2 in the right light group. Leftward highly-directional light unit 42L located at the leftmost position in the left-right direction of body frame 2 in the left light group is located at the lowermost position in the up-down direction of body frame 2 in the left light group. Rightward highly-directional light unit 42R located at the rightmost position in the left-right direction of body frame 2 in the right light group is located at the lowermost position in the up-down direction of body frame 2 in the right light group.

The interval in the left-right direction of body frame 2 between leftward highly-directional light unit 42L in the left light group located at the rightmost position in the left-right direction of body frame 2 and located at the lowermost position in the up-down direction of body frame 2 and rightward highly-directional light unit 42R in the right light group located at the leftmost position in the left-right direction of body frame 2 and located at the lowermost position in the up-down direction of body frame 2 can be narrower than the interval in the left-right direction of body frame 2 between leftward highly-directional light unit 38L in the left light group located at the leftmost position in the left-right direction of body frame 2 and located at the uppermost position in the up-down direction of body frame 2 and rightward highly-directional light unit 38R in the right light group located at the rightmost position in the left-right direction of body frame 2 and located at the uppermost position in the up-down direction of body frame 2 based on the patterns of arrangement as viewed from the front side in the front-rear direction of body frame 2.

The interval in the left-right direction of body frame 2 between leftward highly-directional light unit 38L in the left light group located at the rightmost position in the left-right direction of body frame 2 and located at the uppermost position in the up-down direction of body frame 2 and rightward highly-directional light unit 38R in the right light group located at the leftmost position in the left-right direction of body frame 2 and located at the uppermost position in the up-down direction of body frame 2 can be narrower than the interval in the left-right direction of body frame 2 between leftward highly-directional light unit 42L in the left light group located at the leftmost position in the left-right direction of body frame 2 and located at the lowermost position in the up-down direction of body frame 2 and rightward highly-directional light unit 42R in the right light group located at the rightmost position in the left-right direction of body frame 2 and located at the lowermost position in the up-down direction of body frame 2 based on the patterns of arrangement as viewed in the front side in the front-rear direction of body frame 2.

<Example of Space Utilization>

Figure 21A:
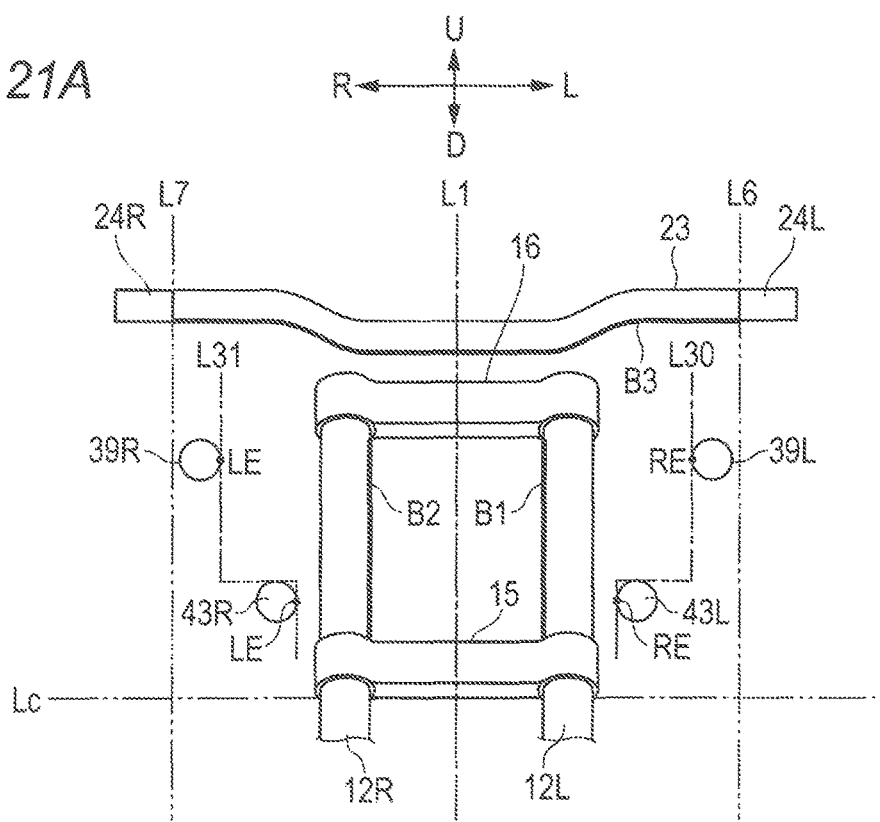
FIGS. 21A and 21B are diagrams describing a space according to the variation of Embodiment 1 of the present invention.
Figure 21B:
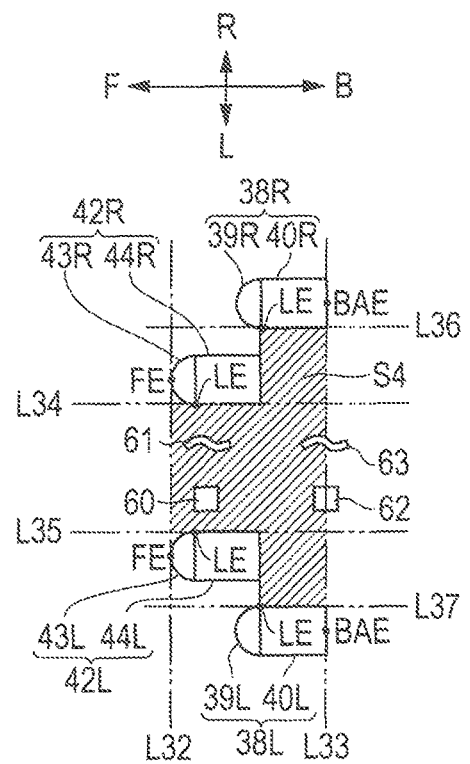

An example of the space secured in straddled vehicle 1 according to this variation will be described with reference to FIGS. 21A and 21B. FIGS. 21A and 21B are diagrams describing an example of the space.

A range of the space in the left-right direction of body frame 2 will be described with reference to FIG. 21A. FIG. 21A is a view from the front side in the front-rear direction of body frame 2. In FIG. 21A, illustrations of the casing of left lamp units 37L and 41L and the casing of right lamp units 37R and 41R are omitted.

In FIG. 21A, virtual line L30 is a line passing through right end RE of optical lens section 39L of leftward highly-directional light unit 38L and right end RE of optical lens section 43L of leftward highly-directional light unit 42L. Virtual line L31 is a line passing through left end LE of optical lens section 39R of rightward highly-directional light unit 38R and left end LE of optical lens section 43R of rightward highly-directional light unit 42R. The shapes of virtual line L30 and virtual line L31 are not limited to the ones illustrated in FIG. 21A.

In FIG. 21A, the range of the space in the left-right direction of body frame 2 is between virtual line L30 and virtual line L31.

A range of the space in the front-rear direction of body frame 2 will be described with reference to FIG. 21B. FIG. 21B is a view from above in the up-down direction of body frame 2. In FIG. 21B, virtual line L32 is a line passing through front end FE of leftward highly-directional light unit 42L and front end FE of rightward highly-directional light unit 42R. Virtual line L33 is a line passing through back end BAE of leftward highly-directional light unit 38L and back end BAE of rightward highly-directional light unit 38R. Virtual line L34 is a line passing through left end LE of optical lens section 43R of rightward highly-directional light unit 42R. Virtual line L35 is a line passing through right end RE of optical lens section 43L of leftward highly-directional light unit 42L. Virtual line L36 is a line passing through left end LE of optical lens section 39R of rightward highly-directional light unit 38R. Virtual line L37 is a line passing through right end RE of optical lens section 39L of leftward highly-directional light unit 38L. The length between virtual line L34 and virtual line L35 in the left-right direction of body frame 2 is equal to the length between left end LE of optical lens section 43R and right end RE of optical lens section 43L in the left-right direction of body frame 2, between virtual line L30 and virtual line L31 in the left-right direction of body frame 2 illustrated in FIG. 21A. The length between virtual line L36 and virtual line L37 in the left-right direction of body frame 2 is equal to the length between left end LE of optical lens section 39R and right end RE of optical lens section 39L in the left-right direction of body frame 2, between virtual line L30 and virtual line L31 in the left-right direction of body frame 2 illustrated in FIG. 21A.

In FIG. 21B, the range of the space in the front-rear direction of body frame 2 is between virtual line L32 and virtual line L33.

As described, space S4 illustrated in FIG. 21B is secured between virtual line L30 and virtual line L31 in the left-right direction of body frame 2 (in other words, between virtual line L34 and virtual line L35 in the left-right direction of body frame 2 and between virtual line L36 and virtual line L37 in the left-right direction of body frame 2) and between virtual line L32 and virtual line L33 in the front-rear direction of body frame 2.

In space S4, the entirety of part 60 and part 61 is disposed, or part of part 62 and part 63 is disposed as illustrated in FIG. 21B. Parts 60 to 63 are the same as in FIG. 15B. Although space S4 is used to dispose the parts, space S4 may be used as an air vent.

Embodiment 2

In the configuration described in Embodiment 1, the leftward highly-directional light unit is supported by the left front-wheel support unit, and the rightward highly-directional light unit is supported by the right front-wheel support unit in the straddled vehicle. In the configuration in Embodiment 2 to be described below, the leftward highly-directional light unit is provided in the left cover, and the rightward highly-directional light unit is provided in the right cover in the straddled vehicle.

Figure 22:
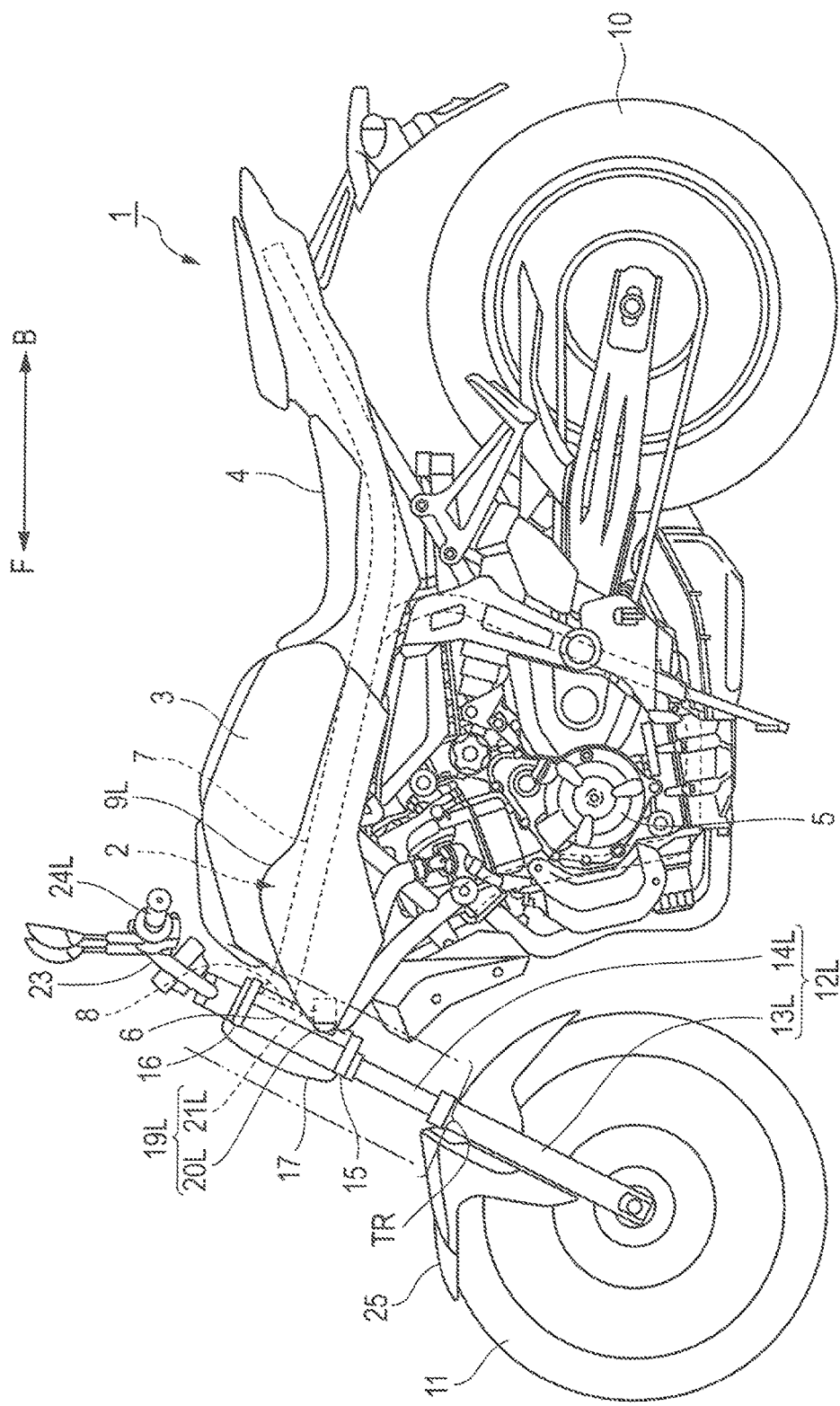
FIG. 22 is a side view illustrating the straddled vehicle according to Embodiment 2 of the present invention.
Figure 23:
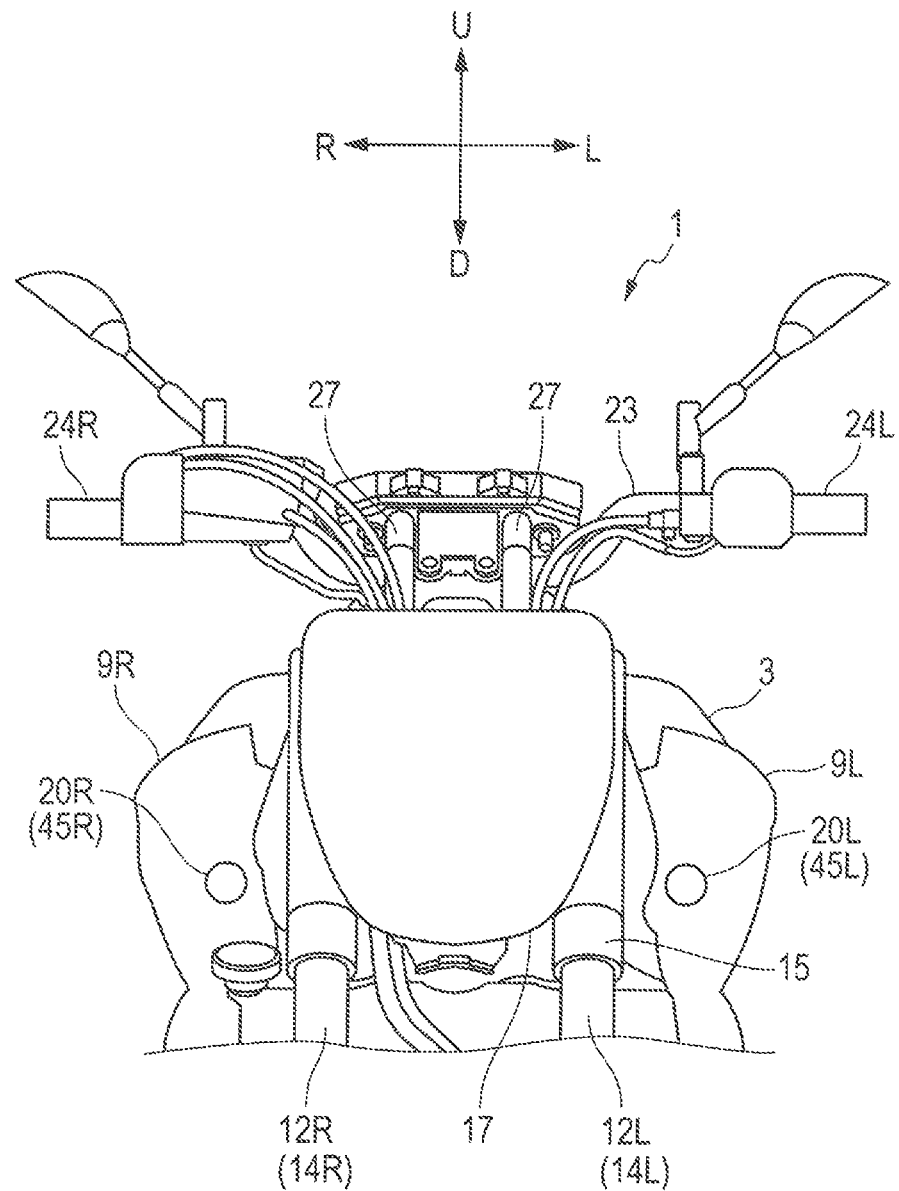
FIG. 23 is a front view of the straddled vehicle according to Embodiment 2 of the present invention.
Figure 24:
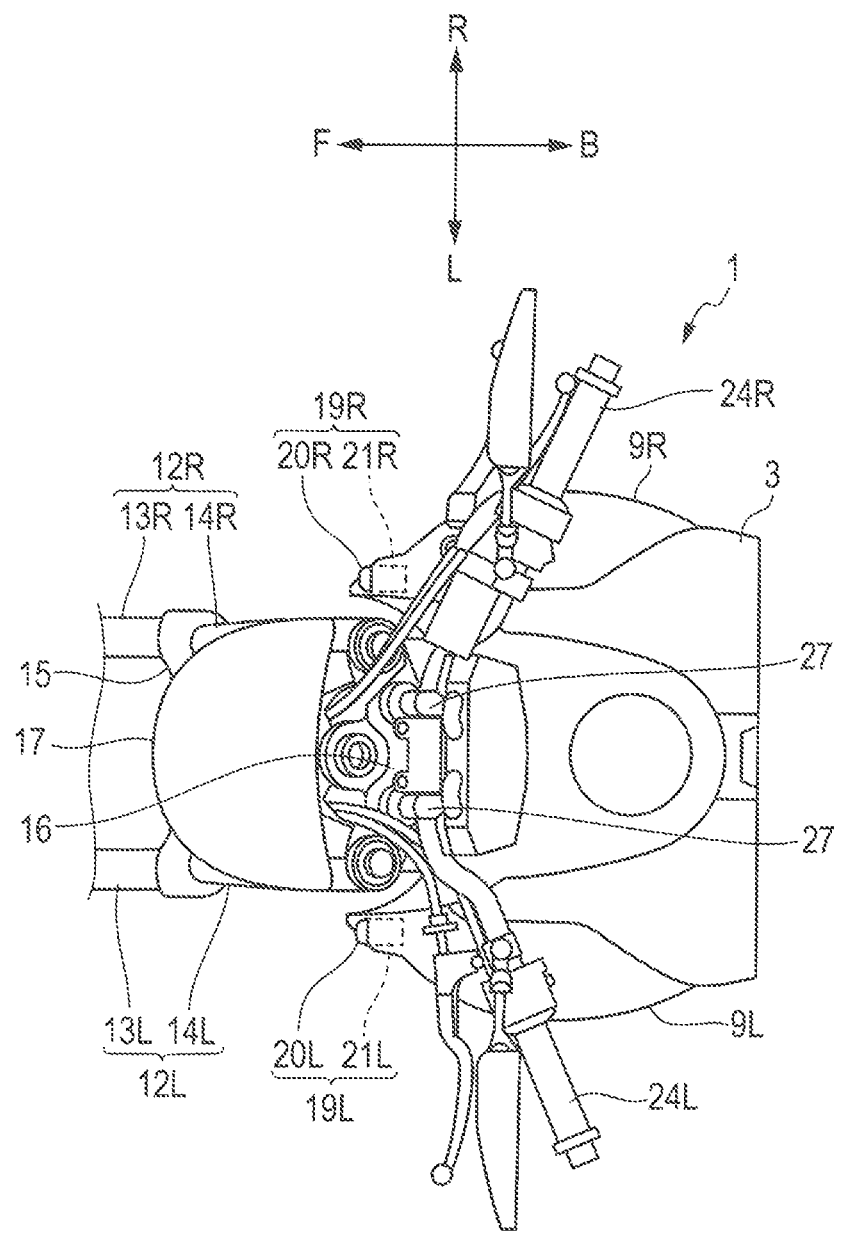
FIG. 24 is a plan view of the straddled vehicle according to Embodiment 2 of the present invention.

FIG. 22 is a side view of straddled vehicle 1 according to this embodiment. FIG. 23 is a front view of straddled vehicle 1 according to this embodiment. FIG. 24 is a plan view of straddled vehicle 1 according to this embodiment. In FIGS. 22 to 24, the same constituent elements as the constituent elements illustrated in FIGS. 1 to 3 are designated with the same reference signs, and the description will not be repeated.

As illustrated in FIG. 22, straddled vehicle 1 includes body frame 2, fuel tank 3, seat 4, power unit 5, steering shaft 8, left cover section 9L, right cover section 9R, rear wheel 10, front wheel 11, left front-wheel support unit 12L, right front-wheel support unit 12R, lower bracket 15, upper bracket 16, front surface cover 17, left lamp unit 18L, right lamp unit 18R, and handlebar 23.

As illustrated in FIGS. 22 and 23, leftward highly-directional light unit 19L is fixed and supported by left cover 9L, and rightward highly-directional light unit 19R is fixed and supported by right cover 9R.

As illustrated in FIGS. 22 and 23, case 21L of leftward highly-directional light unit 19L is inside of left cover 9L, and case 21R of rightward highly-directional light unit 19R is inside of right cover 9R.

As illustrated in FIGS. 22 and 23, optical lens section 20L of leftward highly-directional light unit 19L is exposed to the outside of left cover 9L, and optical lens section 20R of rightward highly-directional light unit 19R is exposed to the outside of right cover 9R.

The configurations of leftward highly-directional light unit 19L and rightward highly-directional light unit 19R are already described in Embodiment 1, and the description will not be repeated here.

<Necessary Conditions of Highly-Directional Light Units>

Leftward highly-directional light unit 19L and rightward highly-directional light unit 19R are disposed to satisfy the front-view arrangement conditions and the side-view arrangement conditions described in Embodiment 1. Only the side-view arrangement conditions will be described in detail here.

[Side-View Arrangement Conditions]

Figure 25C:
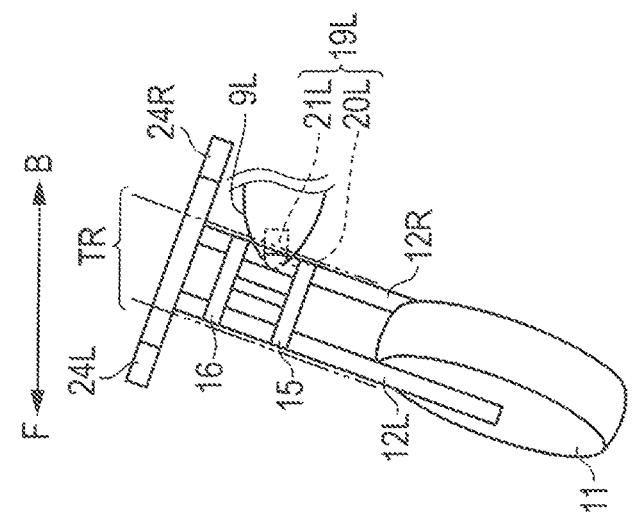
FIGS. 25A to 25C are a diagram describing side-view arrangement conditions of the leftward highly-directional light unit and the rightward highly-directional light unit according to Embodiment 2 of the present invention.
Figure 25B:
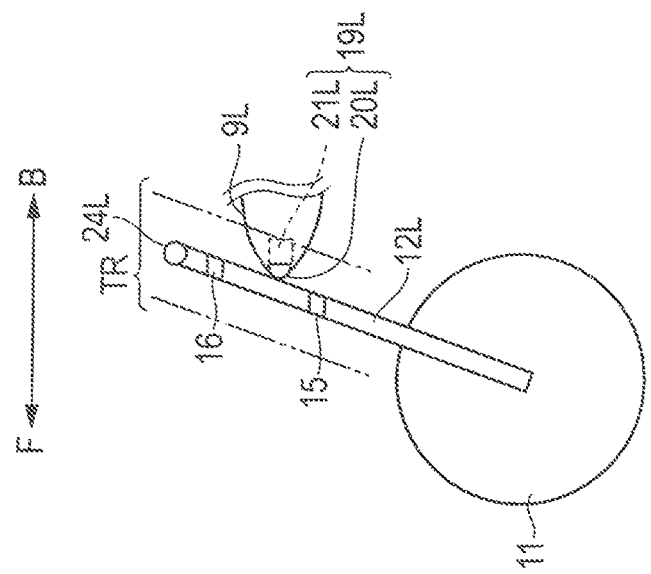
Figure 25A:
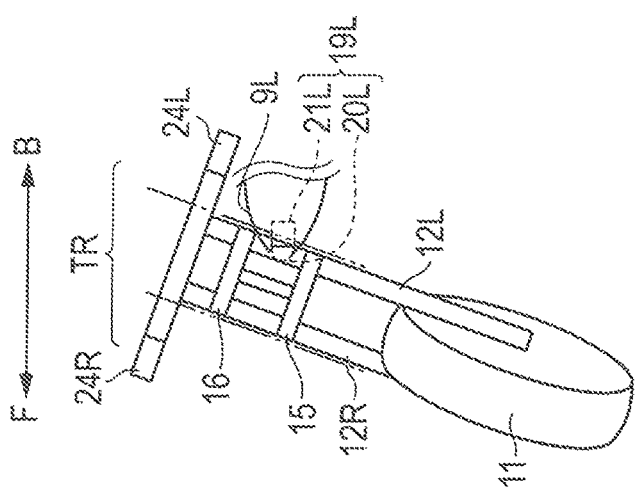

The side-view arrangement conditions of leftward highly-directional light unit 19L and rightward highly-directional light unit 19R as viewed in the left-right direction of body frame 2 will be described with reference to FIGS. 25A to 25C. FIGS. 25A to 25C are diagrams describing the side-view arrangement conditions of leftward highly-directional light unit 19L and rightward highly-directional light unit 19R as viewed from the left side in the left-right direction of body frame 2.

FIG. 25A illustrates a state of the front side of straddled vehicle 1 as viewed from the left side in the left-right direction of body frame 2 when handlebar 23 is steered to the extreme left (when the steering angle in the left direction is a maximum value) with rear wheel 10 in the upright state.

As illustrated in FIG. 25A, handlebar 23, front wheel 11, left front-wheel support unit 12L, right front-wheel support unit 12R, lower bracket 15, and upper bracket 16 turn to the left when handlebar 23 is steered to the extreme left. On the other hand, leftward highly-directional light unit 19L is fixed and supported by left cover 9L, and rightward highly-directional light unit 19R is fixed and supported by right cover 9R. Therefore, leftward highly-directional light unit 19L and rightward highly-directional light unit 19R do not turn to the left. In this case, part of leftward highly-directional light unit 19L overlaps turn range TR as viewed from the left side in the left-right direction of body frame 2 as illustrated in FIG. 25A. Although not illustrated, part of rightward highly-directional light unit 19R also overlaps turn range TR as viewed from the right side in the left-right direction of body frame 2 when handlebar 23 illustrated in FIG. 25A is steered to the left.

FIG. 25B illustrates a state of the front side of straddled vehicle 1 as viewed from the left side in the left-right direction of body frame 2 when handlebar 23 is not steered (when the steering angle is 0 degree) with rear wheel 10 in the upright state.

As illustrated in FIG. 25B, entire leftward highly-directional light unit 19L overlaps turn range TR as viewed from the left side in the left-right direction of body frame 2 when handlebar 23 is not steered. Although not illustrated, the entirety of rightward highly-directional light unit 19R also overlaps turn range TR as viewed from the right side in the left-right direction of body frame 2 when handlebar 23 illustrated in FIG. 25B is not steered.

FIG. 25C illustrates a state of the front side of straddled vehicle 1 as viewed from the left side in the left-right direction of body frame 2 when handlebar 23 is steered to the extreme right (when the steering angle in the right direction is a maximum value) with rear wheel 10 in the upright state.

As illustrated in FIG. 25C, handlebar 23, front wheel 11, left front-wheel support unit 12L, right front-wheel support unit 12R, lower bracket 15, and upper bracket 16 turn to the right when handlebar 23 is steered to the extreme right. On the other hand, leftward highly-directional light unit 19L is fixed and supported by left cover 9L, and rightward highly-directional light unit 19R is fixed and supported by right cover 9R. Therefore, leftward highly-directional light unit 19L and rightward highly-directional light unit 19R do not turn to the right. In this case, part of leftward highly-directional light unit 19L overlaps turn range TR as viewed from the left side in the left-right direction of body frame 2 as illustrated in FIG. 25C. Although not illustrated, part of rightward highly-directional light unit 19R also overlaps turn range TR as viewed from the right side in the left-right direction of body frame 2 when handlebar 23 illustrated in FIG. 25C is steered to the right.

As described, leftward highly-directional light unit 19L is provided at a position overlapping turn range TR as viewed from the left side in the left-right direction of body frame 2, and rightward highly-directional light unit 19R is provided at a position overlapping turn range TR as viewed from the right side in the left-right direction of body frame 2.

Leftward highly-directional light unit 19L supported by left front-wheel support unit 12L and rightward highly-directional light unit 19R supported by right front-wheel support unit 12R are not disposed at positions apart from turn range TR on the front side in the front-rear direction of body frame 2 or on the rear side in the front-rear direction of body frame 2 based on the side-view arrangement conditions. The light emitted by leftward highly-directional light unit 19L supported by left cover 9L and rightward highly-directional light unit 19R supported by right cover 9R is unlikely to interfere with left front-wheel support unit 12L and right front-wheel support unit 12R.

Although part of leftward highly-directional light unit 19L and part of rightward highly-directional light unit 19R overlap turn range TR in the examples of arrangement illustrated in FIGS. 25A and 25C, the entirety of leftward highly-directional light unit 19L and/or the entirety of rightward highly-directional light unit 19R may be disposed to overlap turn range TR in FIGS. 25A and 25C. Although the entirety of leftward highly-directional light unit 19L and the entirety of rightward highly-directional light unit 19R overlap turn range TR in the example of arrangement illustrated in FIG. 25B, at least part of leftward highly-directional light unit 19L (for example, front end FE or back end BAE of leftward highly-directional light unit 19L) and/or at least part of rightward highly-directional light unit 19R (for example, front end FE or back end BAE of rightward highly-directional light unit 19R) may be disposed to overlap turn range TR in FIG. 25B.

As explained above, leftward highly-directional light unit 19L and rightward highly-directional light unit 19R are disposed to satisfy the front-view arrangement conditions and the side-view arrangement conditions in straddled vehicle 1 of this embodiment.

More specifically, top end TE of optical lens section 20L of leftward highly-directional light unit 19L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L as viewed from the front side in the front-rear direction of body frame 2 in straddled vehicle 1 according to this embodiment. In other words, top end TE of left optical lens body 45L is disposed below bottom edge B3 of handlebar 23, bottom end BE of left optical lens body 45L is disposed above the bottom end (virtual line Lc) of lower bracket 15, left end LE of left optical lens body 45L is disposed on the right of the right end (virtual line L6) of left grip 24L, and right end RE of left optical lens body 45L is disposed on the left of right edge B1 of left front-wheel support unit 12L, as viewed from the front side in the front-rear direction of body frame 2. At least part of leftward highly-directional light unit 19L is provided at a position overlapping turn range TR of left front-wheel support unit 12L as viewed from the left side in the left-right direction of body frame 2.

In straddled vehicle 1 of this embodiment, top end TE of optical lens section 20R of rightward highly-directional light unit 19R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2. In other words, top end TE of right optical lens body 45R is disposed below bottom edge B3 of handlebar 23, bottom end BE of right optical lens body 45R is disposed above the bottom end (virtual line Lc) of lower bracket 15, right end RE of right optical lens body 45R is disposed on the left of the left end (virtual line L7) of right grip 24R, and left end LE of right optical lens body 45R is disposed on the right of left edge B2 of right front-wheel support unit 12R, as viewed from the front side in the front-rear direction of body frame 2. At least part of rightward highly-directional light unit 19R is provided at a position overlapping turn range TR of right front-wheel support unit 12R as viewed from the right side in the left-right direction of body frame 2.

Therefore, leftward highly-directional light unit 19L and rightward highly-directional light unit 19R are disposed at an interval in the left-right direction of body frame 2 and are disposed in a range between the right end of left grip 24L and the left end of right grip 24R in the left-right direction of body frame 2, as viewed from the front side in the front-rear direction of body frame 2 in straddled vehicle 1 according to this embodiment.

In straddled vehicle 1 according to this embodiment, leftward highly-directional light unit 19L and rightward highly-directional light unit 19R are not disposed in a range surrounded by left front-wheel support unit 12L, right front-wheel support unit 12R, upper bracket 16, and lower bracket 15 as viewed from the front side in the front-rear direction of body frame 2, and a space can be provided at the center of the vehicle body.

In straddled vehicle 1 according to this embodiment, leftward highly-directional light unit 19L and rightward highly-directional light unit 19R are not disposed on the front side of turn range TR in the front-rear direction of body frame 2, and an increase in the size of the body section in the front-rear direction can be limited.

Therefore, according to straddled vehicle 1 of this embodiment, the highly-directional light unit including the light emitting section that emits highly-directional light unit and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

In straddled vehicle 1 of this embodiment, leftward highly-directional light unit 19L and rightward highly-directional light unit 19R are disposed in a range between bottom edge B3 of handlebar 23 and the top end (virtual line Lc) of lower bracket 15 in the up-down direction of body frame 2 based on the front-view arrangement conditions as viewed from the front side in the front-rear direction of body frame 2. This can prevent the light included in the main beam or the dipped beam from interfering with fender 25.

<Additional Conditions of Highly-Directional Light Units>

In this embodiment, leftward highly-directional light unit 19L and rightward highly-directional light unit 19R may be disposed to further satisfy at least one of the lens width conditions, the up-down direction symmetrical conditions, the front-rear direction symmetrical conditions, and the left-right direction symmetrical conditions described above, while satisfying the front-view arrangement conditions and the side-view arrangement conditions.

Variation 1 of Embodiment 2

In the configuration described in Embodiment 2, the straddled vehicle includes one leftward highly-directional light unit and one rightward highly-directional light unit. In the configuration described below in Variation 1 of Embodiment 2, the straddled vehicle includes two leftward highly-directional light units and two rightward highly-directional light units.

Figure 26:
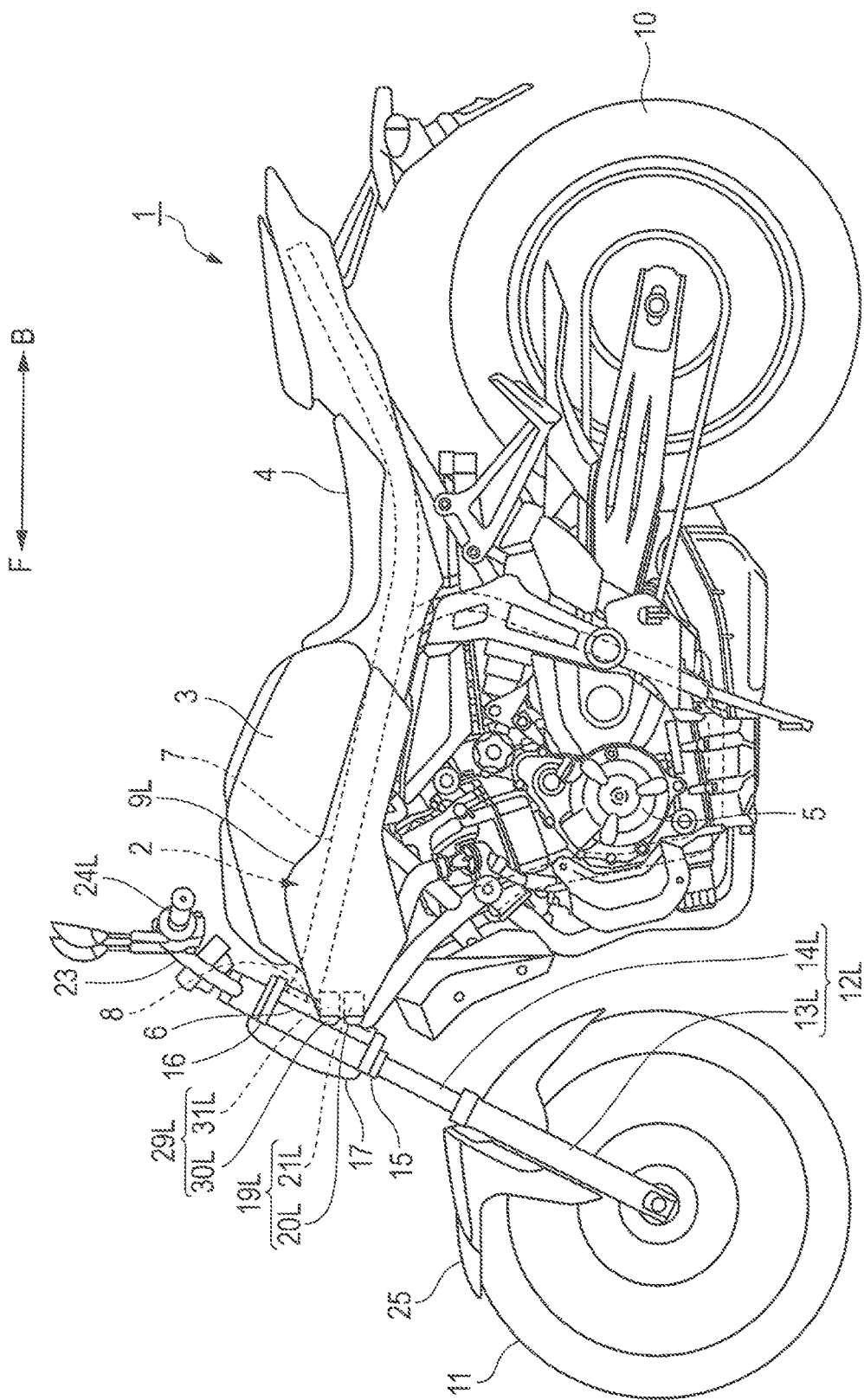
FIG. 26 is a side view illustrating the straddled vehicle according to Variation 1 of Embodiment 2 of the present invention.
Figure 27:
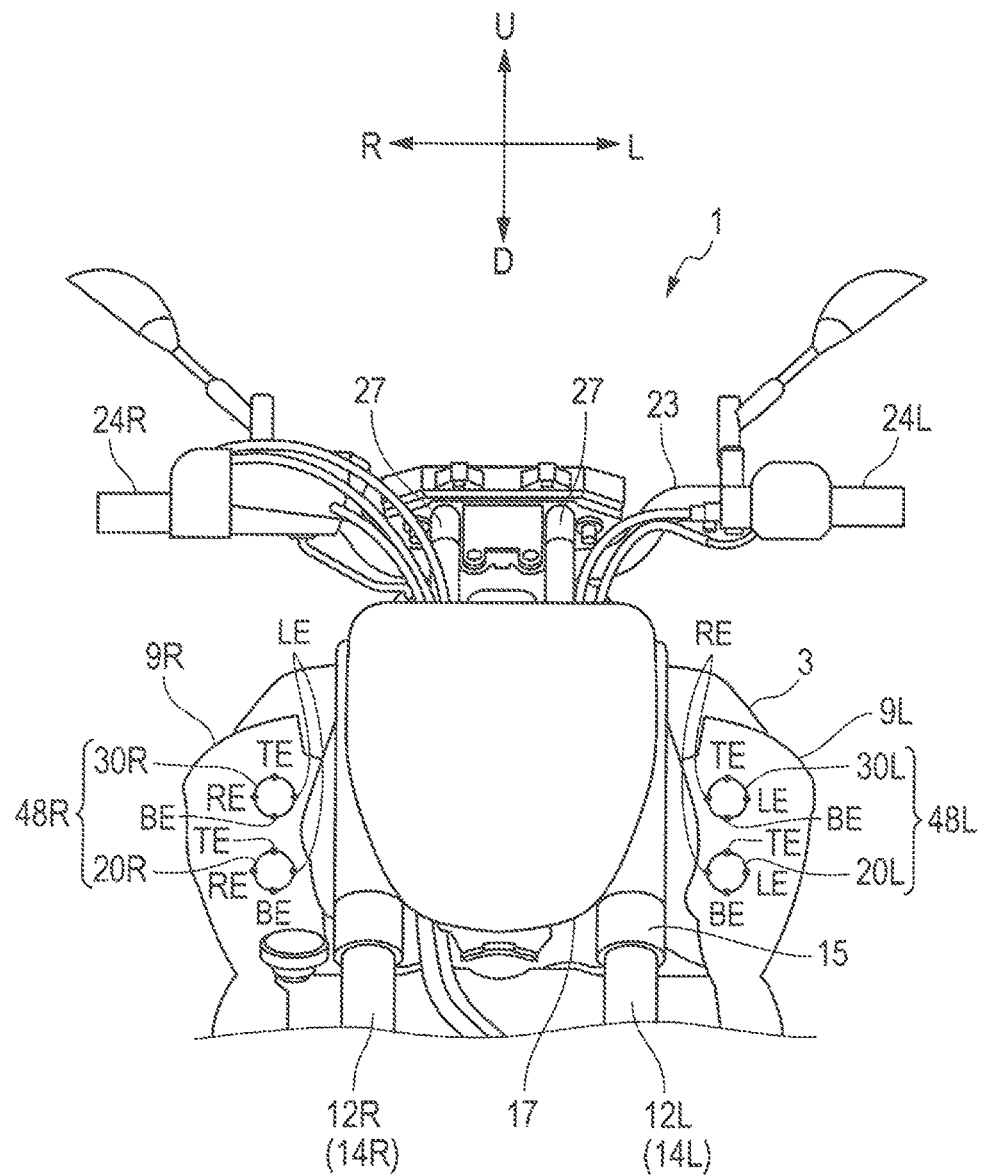
FIG. 27 is a front view illustrating the straddled vehicle according to Variation 1 of Embodiment 2 of the present invention.
Figure 28:
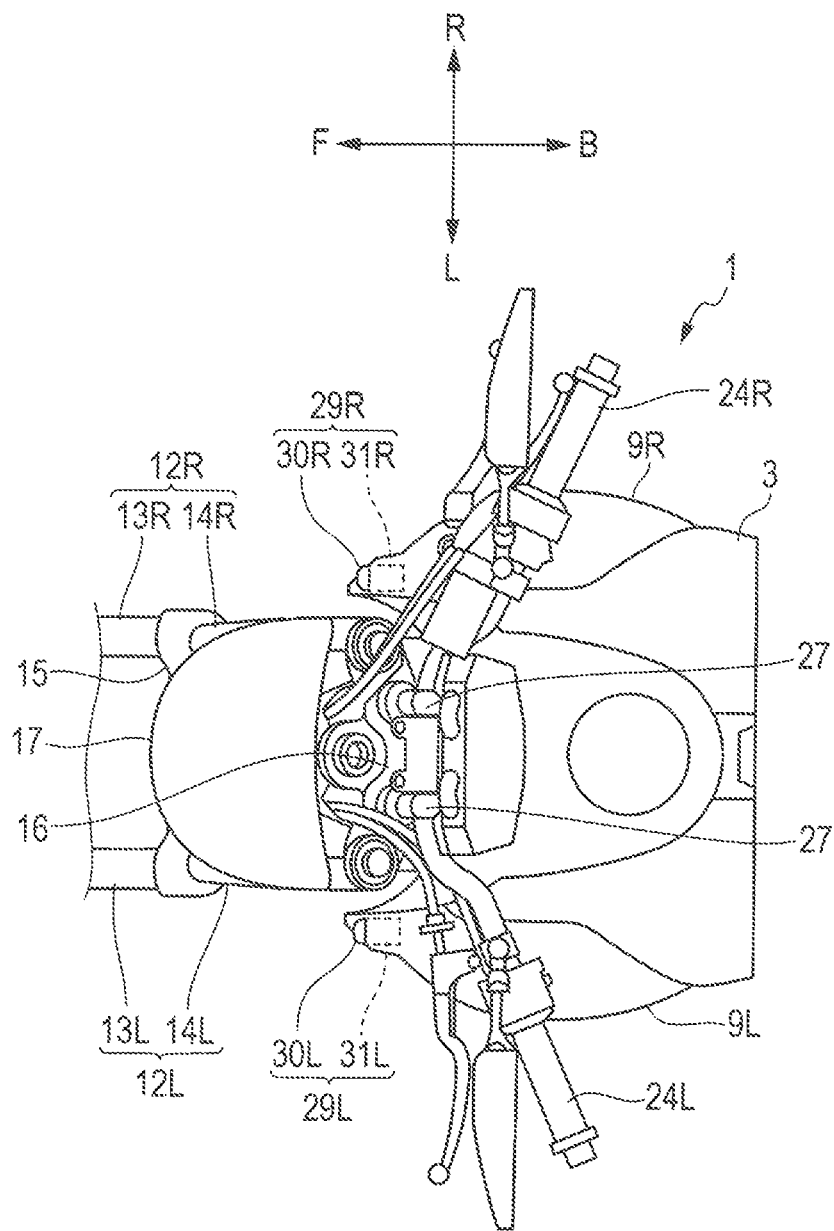
FIG. 28 is a plan view illustrating the straddled vehicle according to Variation 1 of Embodiment 2 of the present invention.

FIG. 26 is a side view of straddled vehicle 1 according to this variation. FIG. 27 is a front view of straddled vehicle 1 according to this variation. FIG. 28 is a plan view of straddled vehicle 1 according to this embodiment. In FIGS. 26 to 28, the same constituent elements as the constituent elements illustrated in FIGS. 1 to 3 are designated with the same reference signs, and the description will not be repeated.

As illustrated in FIGS. 26 to 28, leftward highly-directional light unit 29L is disposed above leftward highly-directional light unit 19L, and rightward highly-directional light unit 29R is disposed above rightward highly-directional light unit 19R. Leftward highly-directional light unit 29L is fixed and supported by left cover 9L, and rightward highly-directional light unit 29R is fixed and supported by right cover 9R. Leftward highly-directional light unit 29L includes, for example, optical lens section 30L and case 31L. Rightward highly-directional light unit 29R includes, for example, optical lens section 30R and case 31R.

As illustrated in FIGS. 26 and 28, case 31L of leftward highly-directional light unit 29L is disposed inside of left cover 9L, and case 31R of rightward highly-directional light unit 29R is inside of right cover 9R.

As illustrated in FIGS. 26 to 28, optical lens section 30L of leftward highly-directional light unit 29L is exposed to the outside of left cover 9L, and optical lens section 30R of rightward highly-directional light unit 29R is exposed to the outside of right cover 9R.

The light emitted outside from the light group including leftward highly-directional light unit 19L, leftward highly-directional light unit 29L, rightward highly-directional light unit 19R, and rightward highly-directional light unit 29R forms a main beam and a dipped beam.

Leftward highly-directional light unit 19L, leftward highly-directional light unit 29L, rightward highly-directional light unit 19R, and rightward highly-directional light unit 29R have any of the configurations illustrated in FIGS. 6A to 6C.

Leftward highly-directional light unit 19L, leftward highly-directional light unit 29L, rightward highly-directional light unit 19R, and rightward highly-directional light unit 29R have any of the configurations illustrated in FIGS. 20A to 20H.

In this variation, left optical lens body 48L includes optical lens section 20L and optical lens section 30L, and right optical lens body 48R includes optical lens section 20R and optical lens section 30R as illustrated in FIG. 27. In the example of FIG. 27, optical lens section 20L and optical lens section 30L are disposed without any misalignment in the left-right direction of body frame 2, as viewed from the front side in the front-rear direction of body frame 2. Therefore, the left end of left optical lens body 48L is the left end of one of optical lens section 20L and optical lens section 30L, and the right end of left optical lens body 48L is the right end of one of optical lens section 20L and optical lens section 30L. In the example of FIG. 27, optical lens section 20R and optical lens section 30R are disposed without any misalignment in the left-right direction of body frame 2 as viewed from the front side in the front-rear direction of body frame 2. Therefore, the left end of right optical lens body 48R is the left end of one of optical lens section 20R and optical lens section 30R, and the right end of right optical lens body 48R is the right end of one of optical lens section 20R and optical lens section 30R.

<Necessary Conditions of Highly-Directional Light Units>

Leftward highly-directional light unit 19L, leftward highly-directional light unit 29L, rightward highly-directional light unit 19R, and rightward highly-directional light unit 29R are disposed to satisfy the front-view arrangement conditions and the side-view arrangement conditions described in Embodiment 1.

More specifically, top end TE of optical lens section 20L of leftward highly-directional light unit 19L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L, as viewed from the front side in the front-rear direction of body frame 2 in straddled vehicle 1 of this variation.

In straddled vehicle 1 of this variation, top end TE of optical lens section 30L of leftward highly-directional light unit 29L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L as viewed from the front side in the front-rear direction of body frame 2.

In other words, the top end of left optical lens body 48L (top end TE of optical lens section 30L) is disposed below bottom edge B3 of handlebar 23, the bottom end of left optical lens body 48L (bottom end BE of optical lens section 20L) is disposed above the bottom end (virtual line Lc) of lower bracket 15, the left end of left optical lens body 48L (left end LE of one of optical lens section 20L and optical lens section 30L) is disposed on the right of the right end (virtual line L6) of left grip 24L, and the right end of left optical lens body 48L (right end RE of one of optical lens section 20L and optical lens section 30L) is disposed on the left of right edge B1 of left front-wheel support unit 12L.

In straddled vehicle 1 of this variation, at least part of leftward highly-directional light unit 19L and/or at least part of leftward highly-directional light unit 29L is provided at positions overlapping turn range TR of left front-wheel support unit 12L as viewed from the left side in the left-right direction of body frame 2.

In straddled vehicle 1 of this variation, top end TE of optical lens section 20R of rightward highly-directional light unit 19R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2.

In straddled vehicle 1 of this variation, top end TE of optical lens section 30R of rightward highly-directional light unit 29R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2.

In other words, the top end of right optical lens body 48R (top end TE of optical lens section 30R) is disposed below bottom edge B3 of handlebar 23, the bottom end of right optical lens body 48R (bottom end BE of optical lens section 20R) is disposed above the bottom end (virtual line Lc) of lower bracket 15, the left end of right optical lens body 48R (right end RE of one of optical lens section 20R and optical lens section 30R) is disposed on the left of the left end (virtual line L7) of right grip 24R, and the right end of right optical lens body 48R (right end RE of one of optical lens section 20R and optical lens section 30R) is disposed on the right of left edge B2 of right front-wheel support unit 12R.

In straddled vehicle 1 of this variation, at least part of rightward highly-directional light unit 19R and/or at least part of rightward highly-directional light unit 29R is provided at a position overlapping turn range TR of right front-wheel support unit 12 as viewed from the right side in the left-right direction of body frame 2.

Therefore, leftward highly-directional light units 19L and 29L and rightward highly-directional light units 19R and 29R are disposed at intervals in the left-right direction of body frame 2 and disposed in a range between the right end of left grip 24L and the left end of right grip 24R in the left-right direction of body frame 2 as viewed from the front side in the front-rear direction of body frame 2 in straddled vehicle 1 of this variation.

In straddled vehicle 1 of this variation, leftward highly-directional light units 19L and 29L and rightward highly-directional light units 19R and 29R are not disposed in a range surrounded by left front-wheel support unit 12L, right front-wheel support unit 12R, upper bracket 16, and lower bracket 15 as viewed from the front side in the front-rear direction of body frame 2, and a space can be provided at the center of the vehicle body.

In straddled vehicle 1 of this variation, leftward highly-directional light units 19L and 29L and rightward highly-directional light units 19R and 29R are not disposed forward of turn range TR in the front-rear direction of body frame 2, and an increase in the size of the body section in the front-rear direction can be limited.

Therefore, according to straddled vehicle 1 of this variation, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

In straddled vehicle 1 of this variation, leftward highly-directional light units 19L and 29L and rightward highly-directional light units 19R and 29R are disposed in a range between bottom edge B3 of handlebar 23 and the top end (virtual line Lc) of lower bracket 15 in the up-down direction of body frame 2 based on the front-view arrangement conditions as viewed from the front side in the front-rear direction of body frame 2. This can prevent the light included in the main beam or the dipped beam from interfering with fender 25.

<Additional Conditions of Highly-Directional Light Units>

In this variation, leftward highly-directional light unit 19L, leftward highly-directional light unit 29L, rightward highly-directional light unit 19R, and rightward highly-directional light unit 29R may be disposed to further satisfy at least one of the left-right length conditions, the up-down left-right length conditions, the up-down direction symmetrical conditions, the front-rear direction symmetrical conditions, and the left-right direction symmetrical conditions, while satisfying the front-view arrangement conditions and the side-view arrangement conditions. In this variation, when leftward highly-directional light unit 19L, leftward highly-directional light unit 29L, rightward highly-directional light unit 19R, and rightward highly-directional light unit 29R are disposed to satisfy at least one of the up-down direction symmetrical conditions, the front-rear direction symmetrical conditions, and the left-right direction symmetrical conditions, leftward highly-directional light unit 19L and rightward highly-directional light unit 19R form a pair of symmetrical lights, and leftward highly-directional light unit 29L and rightward highly-directional light unit 29R form a pair of symmetrical lights, for example. In this case, the pairs of symmetrical lights may be disposed to satisfy at least one of the up-down direction symmetrical conditions described with reference to FIGS. 11A to 11E, the front-rear direction symmetrical conditions described with reference to FIGS. 12A to 12C, and the left-right direction symmetrical conditions described with reference to FIG. 13.

Variation 2 of Embodiment 2

In the configuration described in Embodiment 2, the leftward highly-directional light unit and the rightward highly-directional light unit include optical lens sections each having a circular shape as viewed from the front side in the front-rear direction of the body frame. In the configuration described below in Variation 2 of Embodiment 2, the leftward highly-directional light unit and the rightward highly-directional light unit include optical lens sections each having a rectangular shape as viewed from the front side in the front-rear direction of the body frame.

Figure 29:
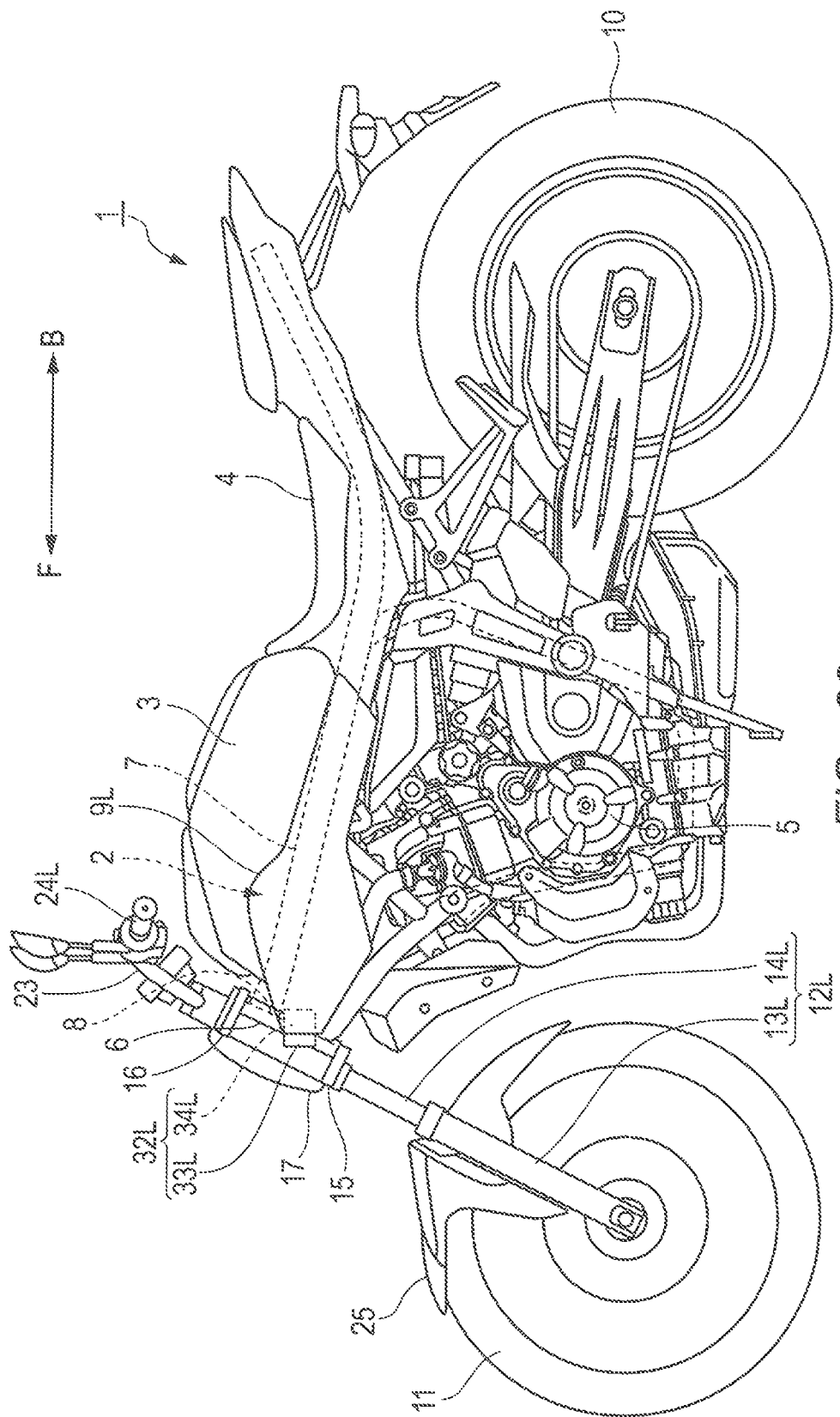
FIG. 29 is a side view illustrating the straddled vehicle according to Variation 2 of Embodiment 2 of the present invention.
Figure 30:
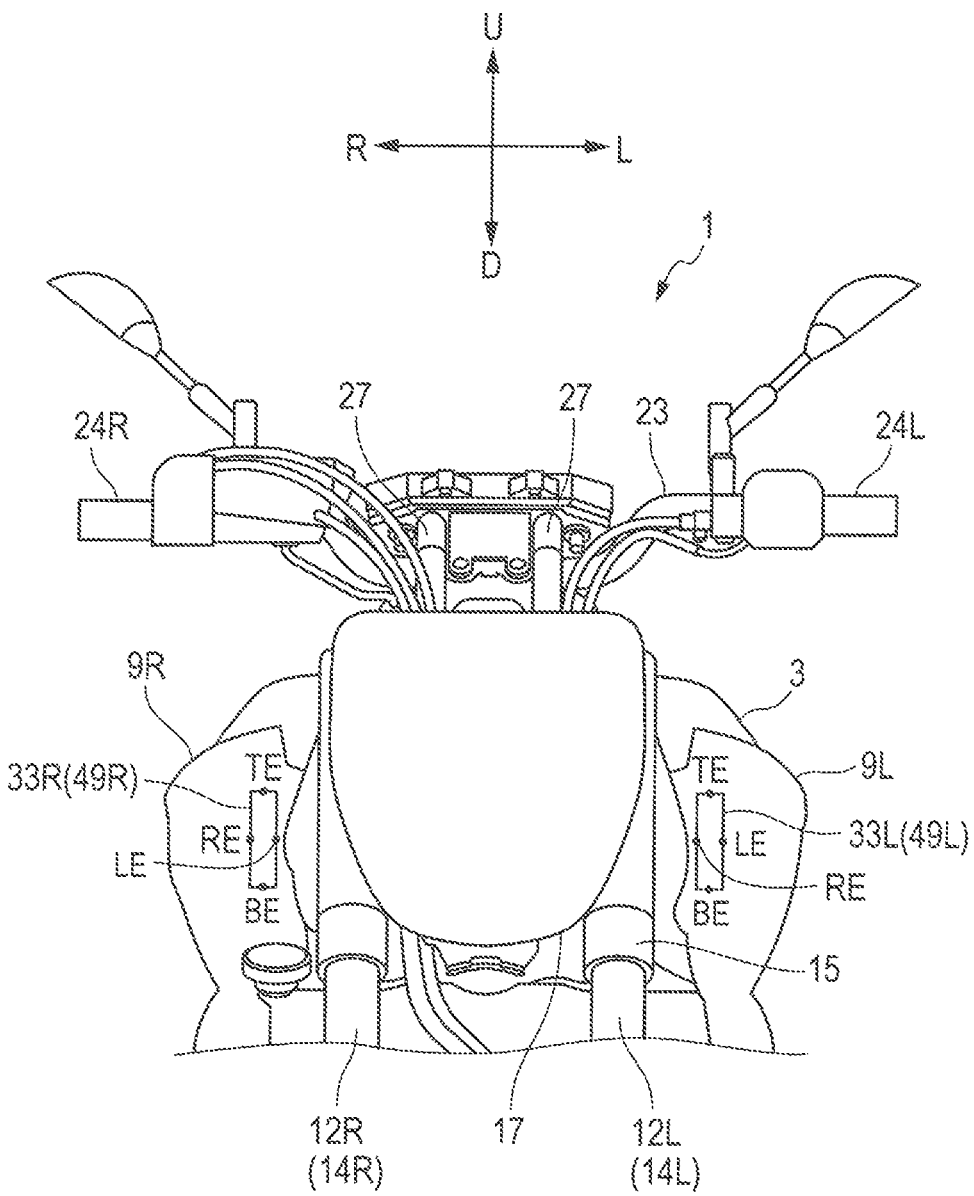
FIG. 30 is a front view illustrating the straddled vehicle according to Variation 2 of Embodiment 2 of the present invention.
Figure 31:
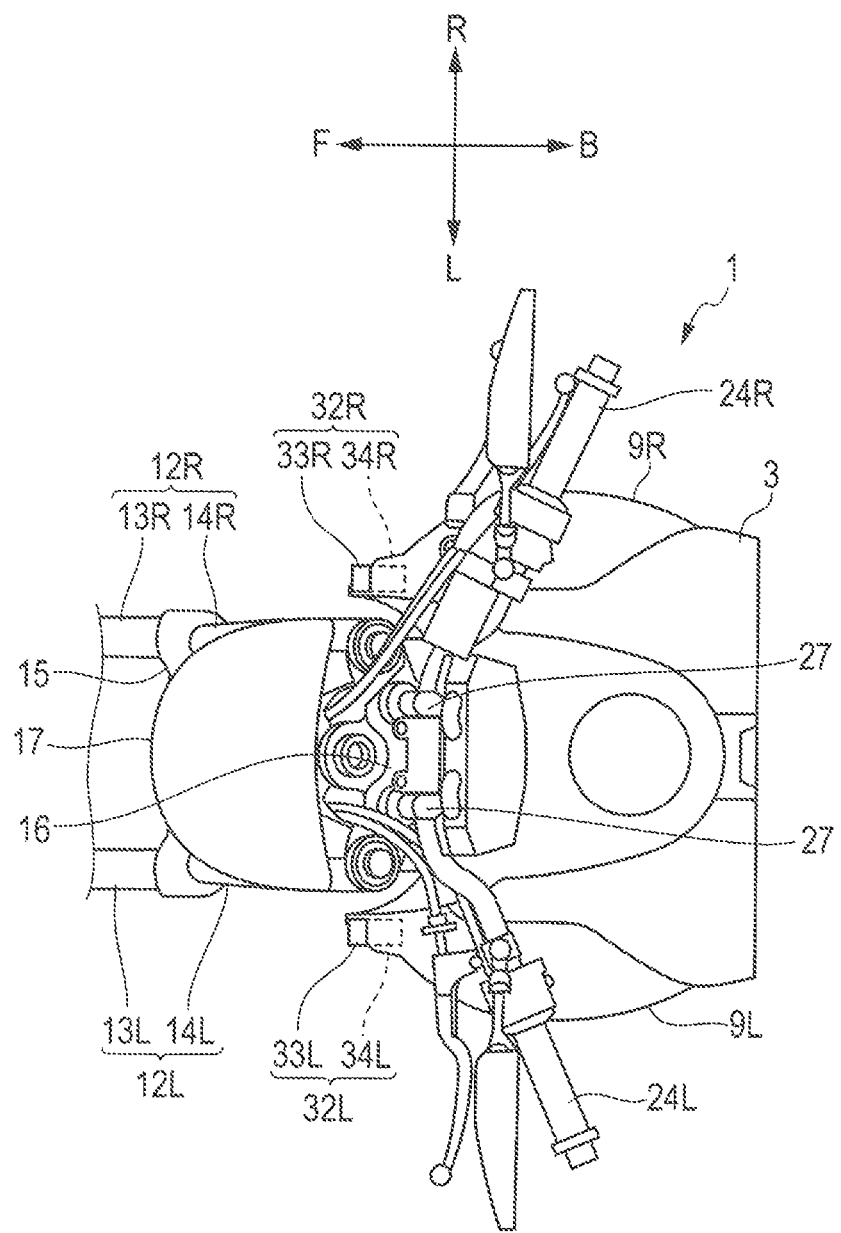
FIG. 31 is a plan view illustrating the straddled vehicle according to Variation 2 of Embodiment 2 of the present invention.

FIG. 29 is a side view of straddled vehicle 1 according to this variation. FIG. 30 is a front view of straddled vehicle 1 according to this variation. FIG. 31 is a plan view of straddled vehicle 1 according to this variation. In FIGS. 29 to 31, the same constituent elements as the constituent elements illustrated in FIGS. 1 to 3 are designated with the same reference signs, and the description will not be repeated.

As illustrated in FIGS. 29 to 31, leftward highly-directional light unit 32L is fixed and supported by left cover 9L, and rightward highly-directional light unit 32R is fixed and supported by right cover 9R. Leftward highly-directional light unit 32L includes, for example, optical lens section 33L and case 34L. Rightward highly-directional light unit 32R includes, for example, optical lens section 33R and case 34R.

As illustrated in FIGS. 29 and 31, case 34L of leftward highly-directional light unit 32L is disposed inside of left cover 9L, and case 34R of rightward highly-directional light unit 32R is disposed inside of right cover 9R.

As illustrated in FIGS. 29 to 31, optical lens section 33L of leftward highly-directional light unit 32L is exposed to the outside of left cover 9L, and optical lens section 33R of rightward highly-directional light unit 32R is exposed to the outside of right cover 9R.

As illustrated in FIG. 30, optical lens section 33L of leftward highly-directional light unit 32L and optical lens section 33R of rightward highly-directional light unit 32R have a rectangular shape that is long in the up-down direction of the body frame as viewed from the front side in the front-rear direction of body frame 2.

The light emitted outside from the light group including leftward highly-directional light unit 32L and rightward highly-directional light unit 32R form a main beam and a dipped beam.

Leftward highly-directional light unit 32L and rightward highly-directional light unit 32R have any of the configurations illustrated in FIGS. 6A to 6C.

In this variation, each of leftward highly-directional light unit 32L and rightward highly-directional light unit 32R includes only one optical lens section as illustrated in FIG. 30. Therefore, optical lens section 33L is regarded as left optical lens body 49L, and optical lens section 33R is regarded as right optical lens body 49R.

<Necessary Conditions of Highly-Directional Light Units>

Leftward highly-directional light unit 32L and rightward highly-directional light unit 32R are disposed to satisfy the front-view arrangement conditions and the side-view arrangement conditions described in Embodiment 1.

More specifically, top end TE of optical lens section 33L of leftward highly-directional light unit 32L is disposed below bottom edge B3 of handlebar 23, bottom end BE is disposed above the bottom end (virtual line Lc) of lower bracket 15, left end LE is disposed on the right of the right end (virtual line L6) of left grip 24L, and right end RE is disposed on the left of right edge B1 of left front-wheel support unit 12L, as viewed from the front side in the front-rear direction of body frame 2 in straddled vehicle 1 according to this variation. In other words, top end TE of left optical lens body 49L is disposed below bottom edge B3 of handlebar 23, bottom end BE of left optical lens body 49L is disposed above the bottom end (virtual line Lc) of lower bracket 15, left end LE of left optical lens body 49L is disposed on the right of the right end (virtual line L6) of left grip 24L, and right end RE of left optical lens body 49L is disposed on the left of right edge B1 of left front-wheel support unit 12L as viewed from the front side in the front-rear direction of body frame 2. At least part of leftward highly-directional light unit 32L is provided at a position overlapping turn range TR of left front-wheel support unit 12L as viewed from the left side in the left-right direction of body frame 2.

In straddled vehicle 1 of this variation, top end TE of optical lens section 33R of rightward highly-directional light unit 32R is disposed below bottom edge B3 of handlebar 23, bottom end BE is disposed above the bottom end (virtual line Lc) of lower bracket 15, right end RE is disposed on the left of the left end (virtual line L7) of right grip 24R, and left end LE is disposed on the right of left edge B2 of right front-wheel support unit 12R, as viewed from the front side in the front-rear direction of body frame 2. In other words, top end TE of right optical lens body 49R is disposed below bottom edge B3 of handlebar 23, bottom end BE of right optical lens body 49R is disposed above the bottom end (virtual line Lc) of lower bracket 15, right end RE of right optical lens body 49R is disposed on the left of the left end (virtual line L7) of right grip 24R, and left end LE of right optical lens body 49R is disposed on the right of left edge B2 of right front-wheel support unit 12R as viewed from the front side in the front-rear direction of body frame 2. At least part of rightward highly-directional light unit 32R is provided at a position overlapping turn range TR of right front-wheel support unit 12R as viewed from the right side in the left-right direction of body frame 2.

Therefore, in straddled vehicle 1 of this variation, leftward highly-directional light unit 32L and rightward highly-directional light unit 32R are disposed at an interval in the left-right direction of body frame 2 and are disposed in a range between the right end of left grip 24L and the left end of right grip 24R in the left-right direction of body frame 2, as viewed from the front side in the front-rear direction of body frame 2.

In straddled vehicle 1 of this variation, leftward highly-directional light unit 32L and rightward highly-directional light unit 32R are not disposed in a range surrounded by left front-wheel support unit 12L, right front-wheel support unit 12R, upper bracket 16, and lower bracket 15 as viewed from the front side in the front-rear direction of body frame 2, and a space can be provided at the center of the vehicle body.

In straddled vehicle 1 of this variation, leftward highly-directional light unit 32L and rightward highly-directional light unit 32R are not disposed forward of turn range TR in the front-rear direction of body frame 2, and an increase in the size of the body section in the front-rear direction can be limited.

Therefore, according to straddled vehicle 1 of this variation, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

In straddled vehicle 1 of this variation, leftward highly-directional light unit 32L and rightward highly-directional light unit 32R are disposed in a range between bottom edge B3 of handlebar 23 and the top end (virtual line Lc) of lower bracket 15 in the up-down direction of body frame 2 based on the front-view arrangement conditions as viewed from the front side in the front-rear direction of body frame 2. This can prevent the light included in the main beam or the dipped beam from interfering with fender 25.

<Additional Conditions of Highly-Directional Light Units>

In this variation, leftward highly-directional light unit 32L and rightward highly-directional light unit 32R may be disposed to further satisfy at least one of the lens width conditions, the up-down direction symmetrical conditions, the front-rear direction symmetrical conditions, and the left-right direction symmetrical conditions described above, while satisfying the front-view arrangement conditions and the side-view arrangement conditions.

Embodiment 3

In the configuration described in Embodiment 1, the leftward highly-directional light unit is supported by the left front-wheel support unit, and the rightward highly-directional light unit is supported by the right front-wheel support unit in the naked straddled vehicle. In the configuration described below in Embodiment 3, the leftward highly-directional light unit is included in the left front-wheel support unit, and the rightward highly-directional light unit is included in the right front-wheel support unit in an off-road straddled vehicle.

Figure 32:
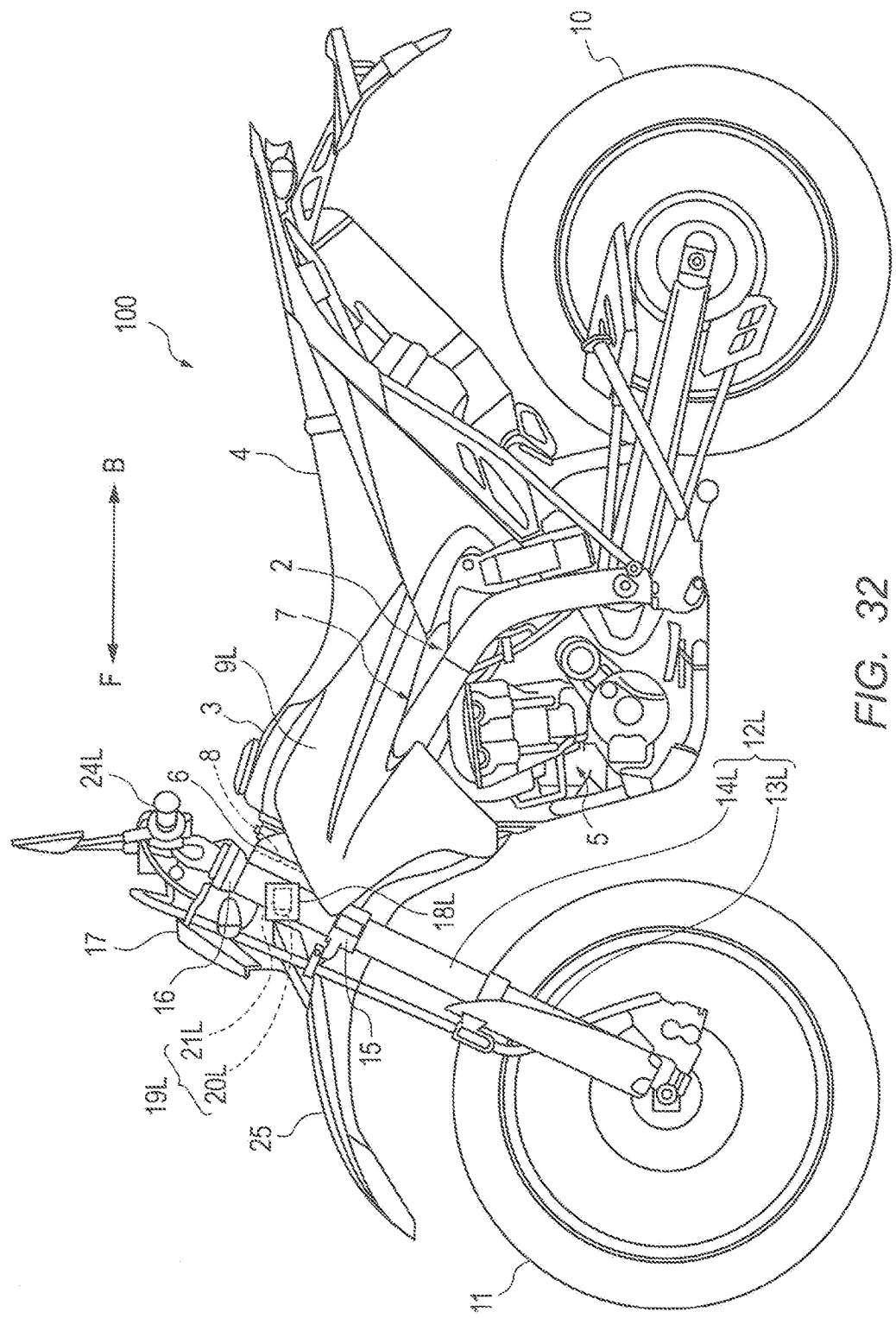
FIG. 32 is a side view illustrating a straddled vehicle according to Embodiment 3 of the present invention.
Figure 33:
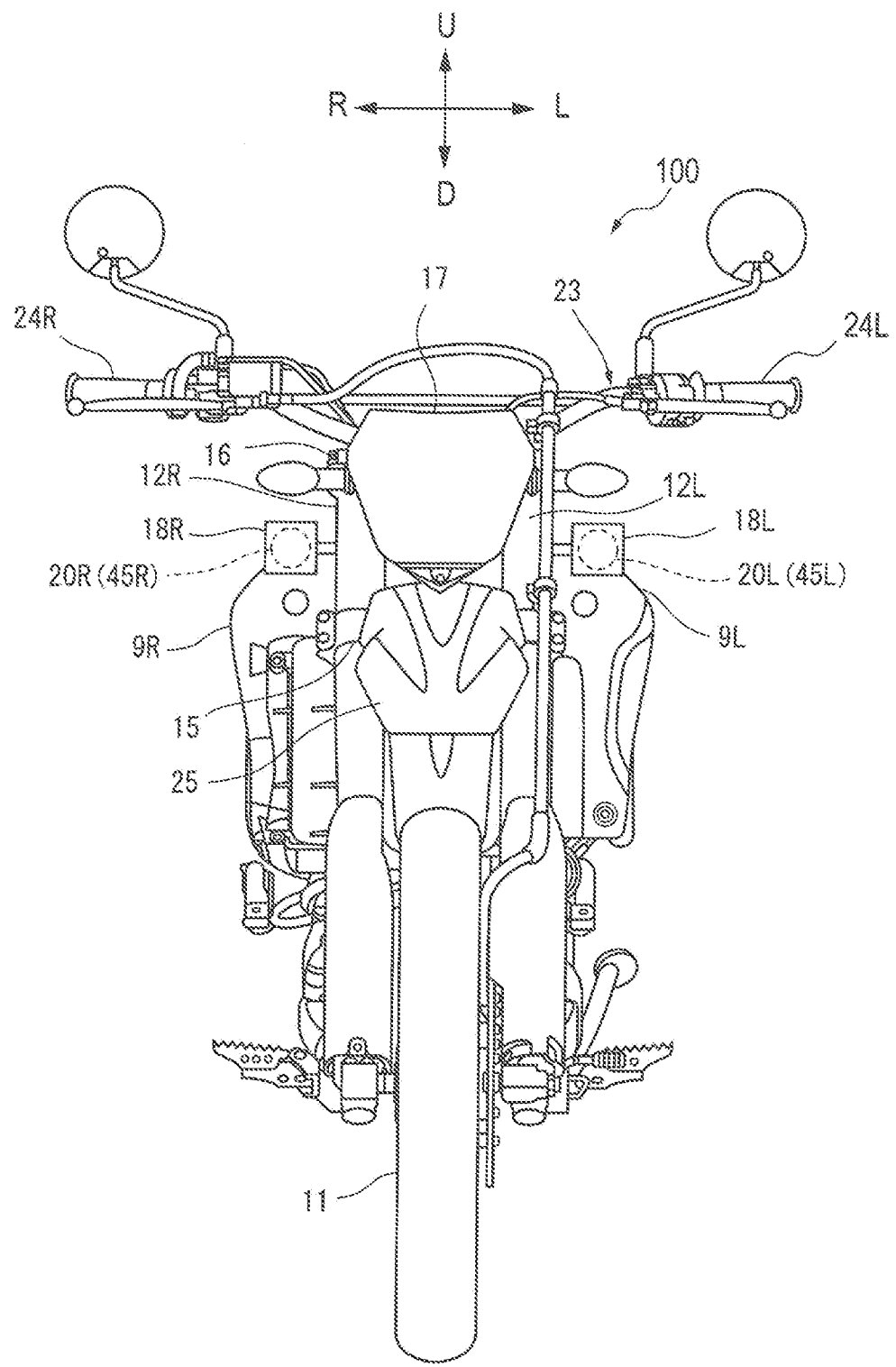
FIG. 33 is a front view of the straddled vehicle according to Embodiment 3 of the present invention.
Figure 34:
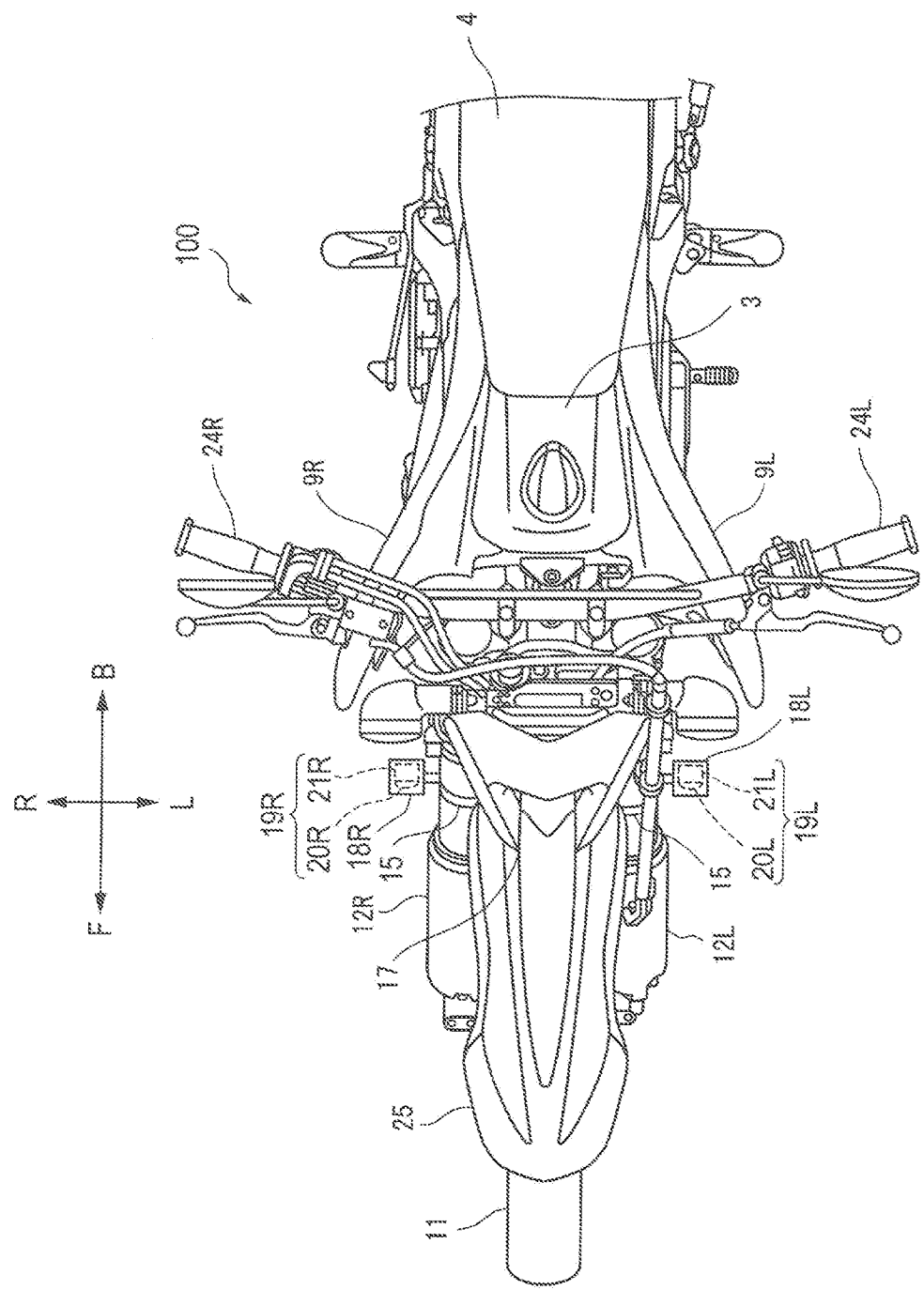
FIG. 34 is a plan view of the straddled vehicle according to Embodiment 3 of the present invention.

FIG. 32 is a side view of straddled vehicle 100 according to this embodiment. FIG. 33 is a front view of straddled vehicle 100 according to this embodiment. FIG. 34 is a plan view of straddled vehicle 100 according to this embodiment. In FIGS. 32 to 34, the same constituent elements as the constituent elements illustrated in FIGS. 1 to 3 are designated with the same reference signs, and the description will not be repeated.

As illustrated in FIGS. 32 to 34, straddled vehicle 100 is an off-road straddled vehicle. As illustrated in FIGS. 32 to 34, straddled vehicle 100 includes body frame 2, fuel tank 3, seat 4, power unit 5, steering shaft 8, left cover section 9L, right cover section 9R, rear wheel 10, front wheel 11, left front-wheel support unit 12L, right front-wheel support unit 12R, lower bracket 15, upper bracket 16, front surface cover 17, left lamp unit 18L, right lamp unit 18R, and handlebar 23.

In straddled vehicle 100, left lamp unit 18L is located on the left of left front-wheel support unit 12L in the left-right direction of body frame 2 and is fixed and supported by left front-wheel support unit 12L as illustrated in FIGS. 32 to 34.

In straddled vehicle 100, right lamp unit 18R is located on the right of right front-wheel support unit 12R in the left-right direction of body frame 2 and is fixed and supported by right front-wheel support unit 12R as illustrated in FIGS. 32 to 34.

The configurations of left lamp unit 18L, right lamp unit 18R, leftward highly-directional light unit 19L, and rightward highly-directional light unit 19R are already described in Embodiment 1, and the description will not be repeated here.

<Necessary Conditions of Highly-Directional Light Units>

Leftward highly-directional light unit 19L and rightward highly-directional light unit 19R are disposed to satisfy the front-view arrangement conditions and the side-view arrangement conditions described in Embodiment 1. As a result, in straddled vehicle 100 of this embodiment, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

<Additional Conditions of Highly-Directional Light Units>

In this embodiment, leftward highly-directional light unit 19L and rightward highly-directional light unit 19R may be disposed to further satisfy at least one of the lens width conditions, the up-down direction symmetrical conditions, the front-rear direction symmetrical conditions, and the left-right direction symmetrical conditions described above, while satisfying the front-view arrangement conditions and the side-view arrangement conditions.

Variation of Embodiment 3

In the configuration described below in a variation of Embodiment 3, the off-road straddled vehicle includes two leftward highly-directional light units and two rightward highly-directional light units.

Figure 35:
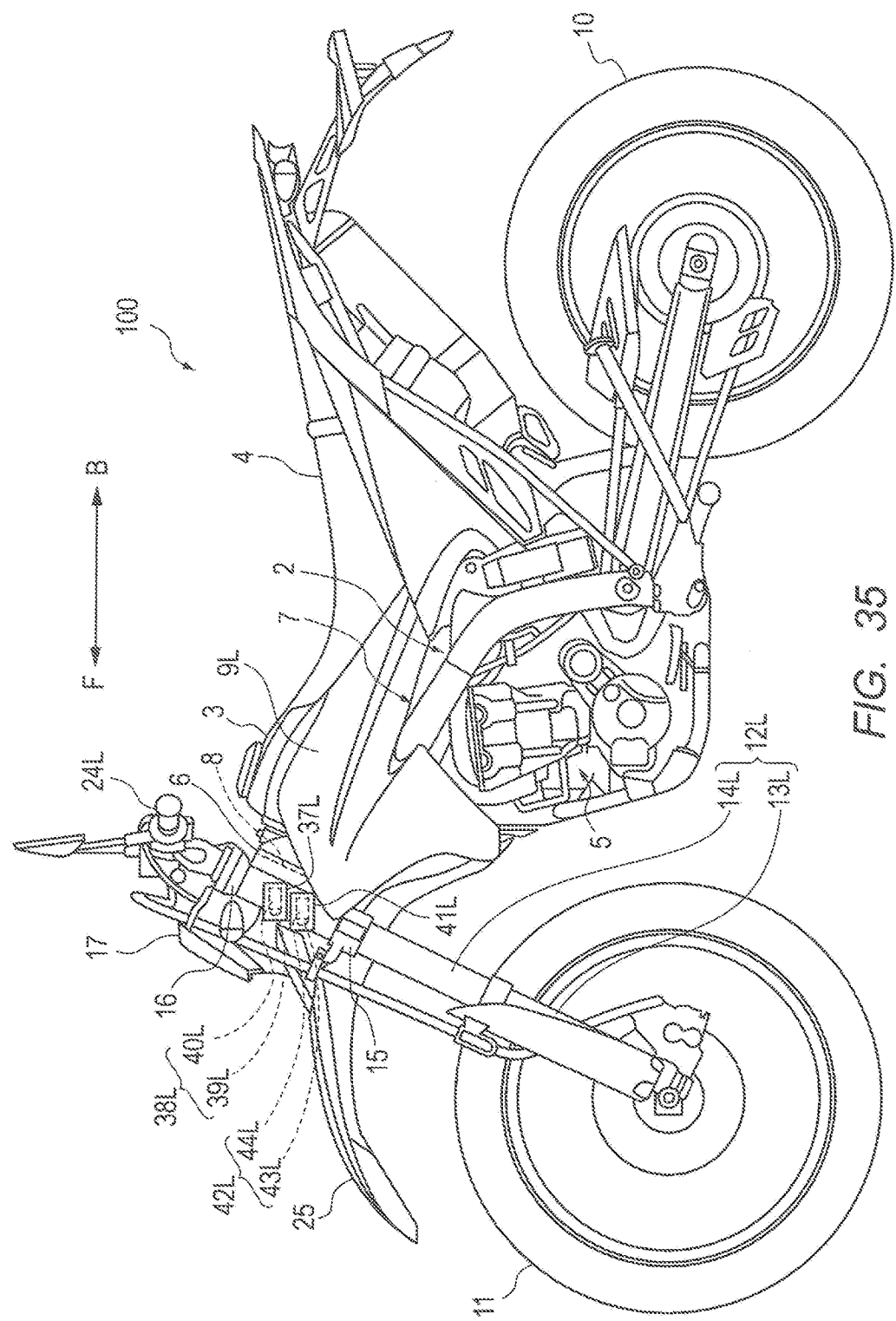
FIG. 35 is a side view illustrating the straddled vehicle according to a variation of Embodiment 3 of the present invention.
Figure 36:
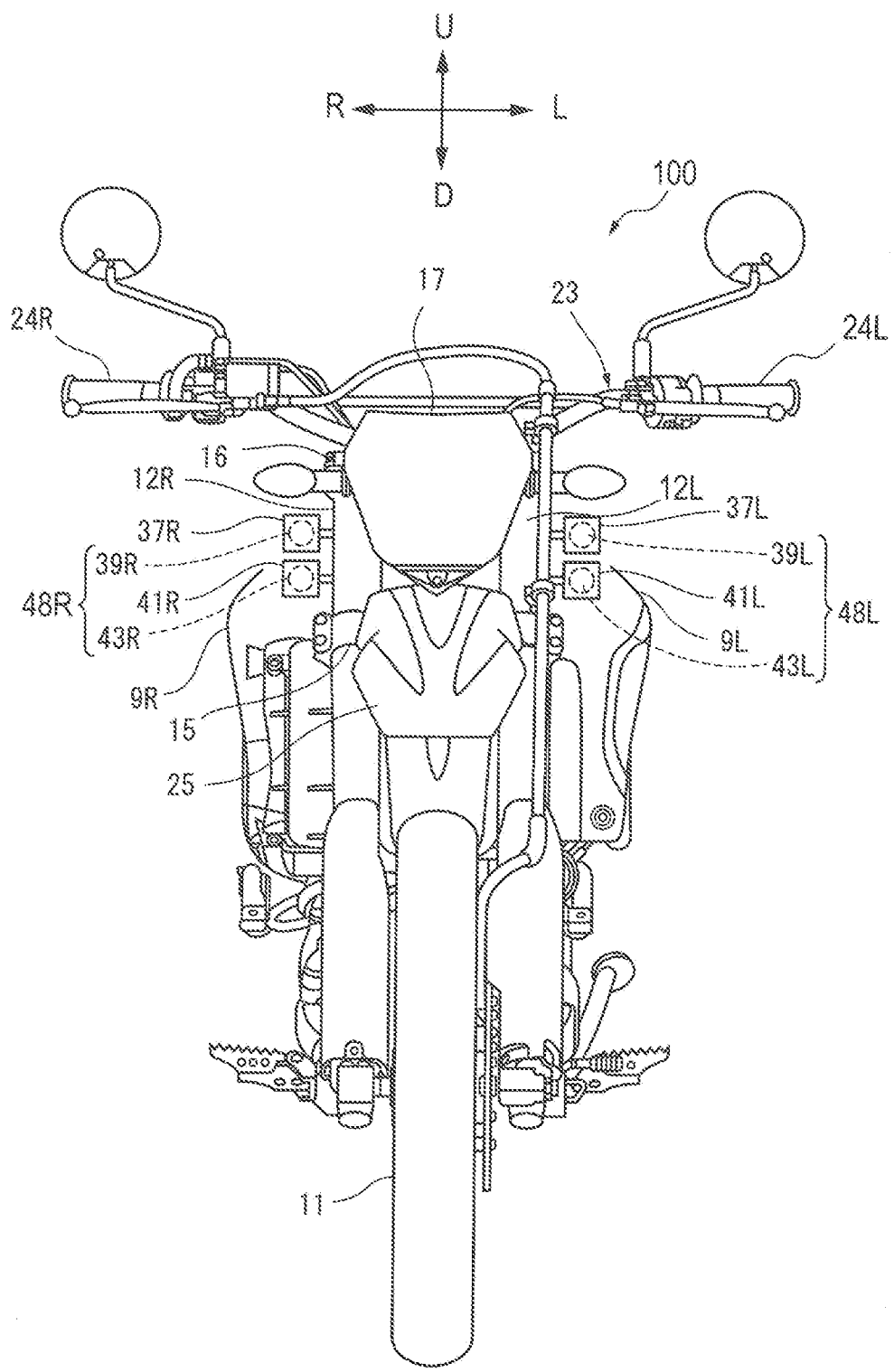
FIG. 36 is a front view illustrating the straddled vehicle according to the variation of Embodiment 3 of the present invention.
Figure 37:
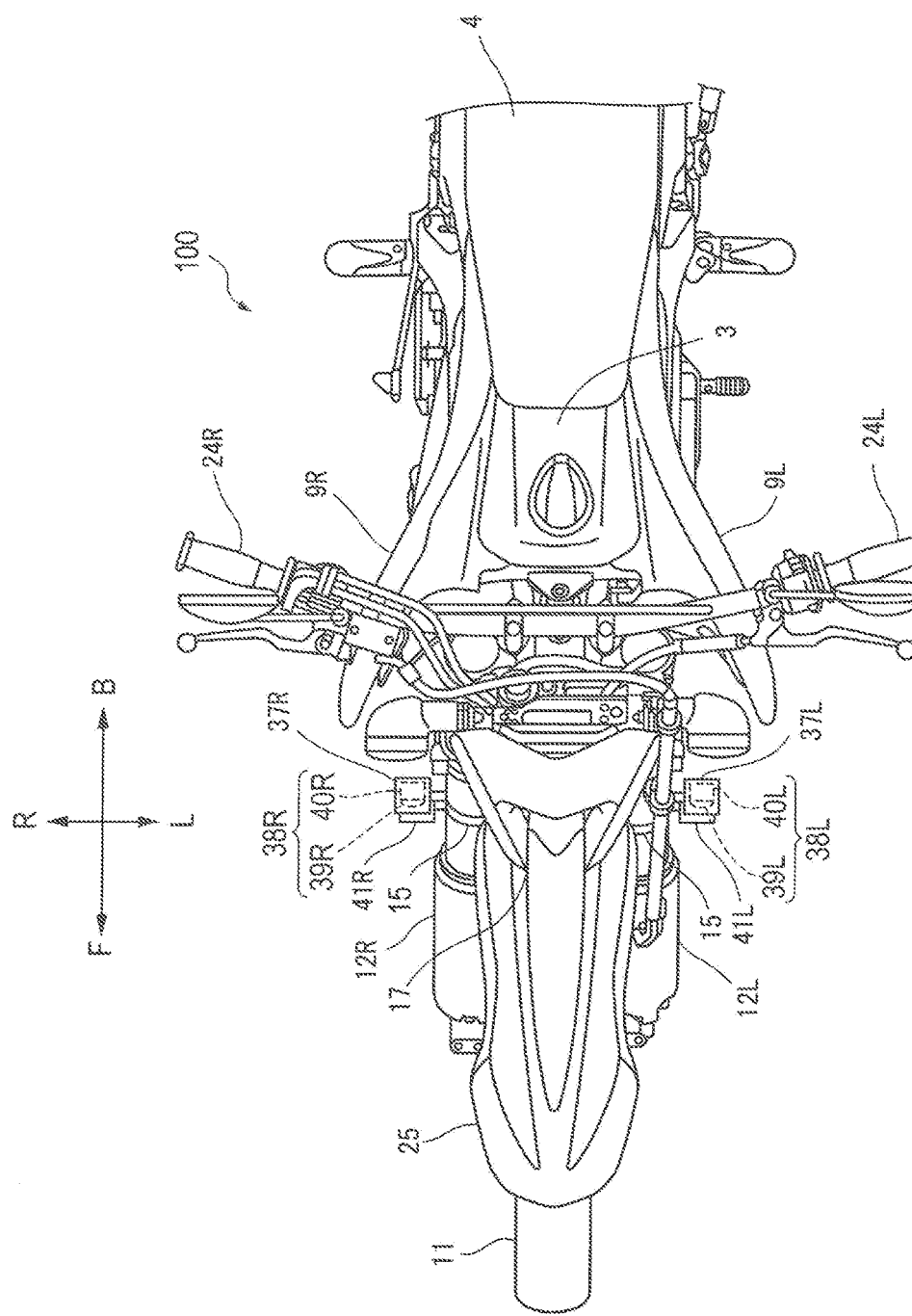
FIG. 37 is a plan view illustrating the straddled vehicle according to the variation of Embodiment 3 of the present invention.

FIG. 35 is a side view of straddled vehicle 100 according to this variation. FIG. 36 is a front view of straddled vehicle 100 according to this variation. FIG. 37 is a plan view of straddled vehicle 100 according to this variation. In FIGS. 35 to 37, the same constituent elements as the constituent elements illustrated in FIGS. 1 to 3 are designated with the same reference signs, and the description will not be repeated.

As illustrated in FIGS. 35 to 37, left lamp unit 37L is fixed and supported above by left front-wheel support unit 12L, and left lamp unit 41L is fixed and supported below by left front-wheel support unit 12L on the left of left front-wheel support unit 12L in the left-right direction of body frame 2.

As illustrated in FIGS. 35 to 37, right lamp unit 37R is fixed and supported above by right front-wheel support unit 12R, and right lamp unit 41R is fixed and supported below by right front-wheel support unit 12R on the right of right front-wheel support unit 12R in the left-right direction of body frame 2. Although not illustrated, right lamp unit 41R is provided with rightward highly-directional light unit 42R including optical lens section 43R and case 44R.

The configurations of left lamp unit 37L, left lamp unit 41L, right lamp unit 37R, right lamp unit 41R, leftward highly-directional light unit 38L, leftward highly-directional light unit 42L, rightward highly-directional light unit 38R, and rightward highly-directional light unit 42R are already described in the variation of Embodiment 1, and the description will not be repeated.

Leftward highly-directional light unit 38L, leftward highly-directional light unit 42L, rightward highly-directional light unit 38R, and rightward highly-directional light unit 42R have any of the configurations illustrated in FIGS. 20A to 20H.

<Necessary Conditions of Highly-Directional Light Units>

Leftward highly-directional light unit 38L, leftward highly-directional light unit 42L, rightward highly-directional light unit 38R, and rightward highly-directional light unit 42R are disposed to satisfy the front-view arrangement conditions and the side-view arrangement conditions described in Embodiment 1. As a result, in straddled vehicle 100 of this variation, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

<Additional Conditions of Highly-Directional Light Units>

In this variation, leftward highly-directional light unit 38L, leftward highly-directional light unit 42L, rightward highly-directional light unit 38R, and rightward highly-directional light unit 42R may be disposed to further satisfy at least one of the left-right length conditions, the up-down left-right length conditions, the up-down direction symmetrical conditions, the front-rear direction symmetrical conditions, and the left-right direction symmetrical conditions, while satisfying the front-view arrangement conditions and the side-view arrangement conditions. In this variation, when leftward highly-directional light unit 38L, leftward highly-directional light unit 42L, rightward highly-directional light unit 38R, and rightward highly-directional light unit 42R are disposed to satisfy at least one of the up-down direction symmetrical conditions, the front-rear direction symmetrical conditions, and the left-right direction symmetrical conditions, leftward highly-directional light unit 38L and rightward highly-directional light unit 38R form a pair of symmetrical lights, and leftward highly-directional light unit 42L and rightward highly-directional light unit 42R form a pair of symmetrical lights, for example. In this case, the pairs of symmetrical lights may be disposed to satisfy at least one of the up-down direction symmetrical conditions described with reference to FIGS. 11A to 11E, the front-rear direction symmetrical conditions described with reference to FIGS. 12A to 12C, and the left-right direction symmetrical conditions described with reference to FIG. 13.

Embodiment 4

In the configuration described in Embodiment 4, the leftward highly-directional light unit is provided in the left cover, and the rightward highly-directional light unit is provided in the right cover in the off-road straddled vehicle.

Figure 38:
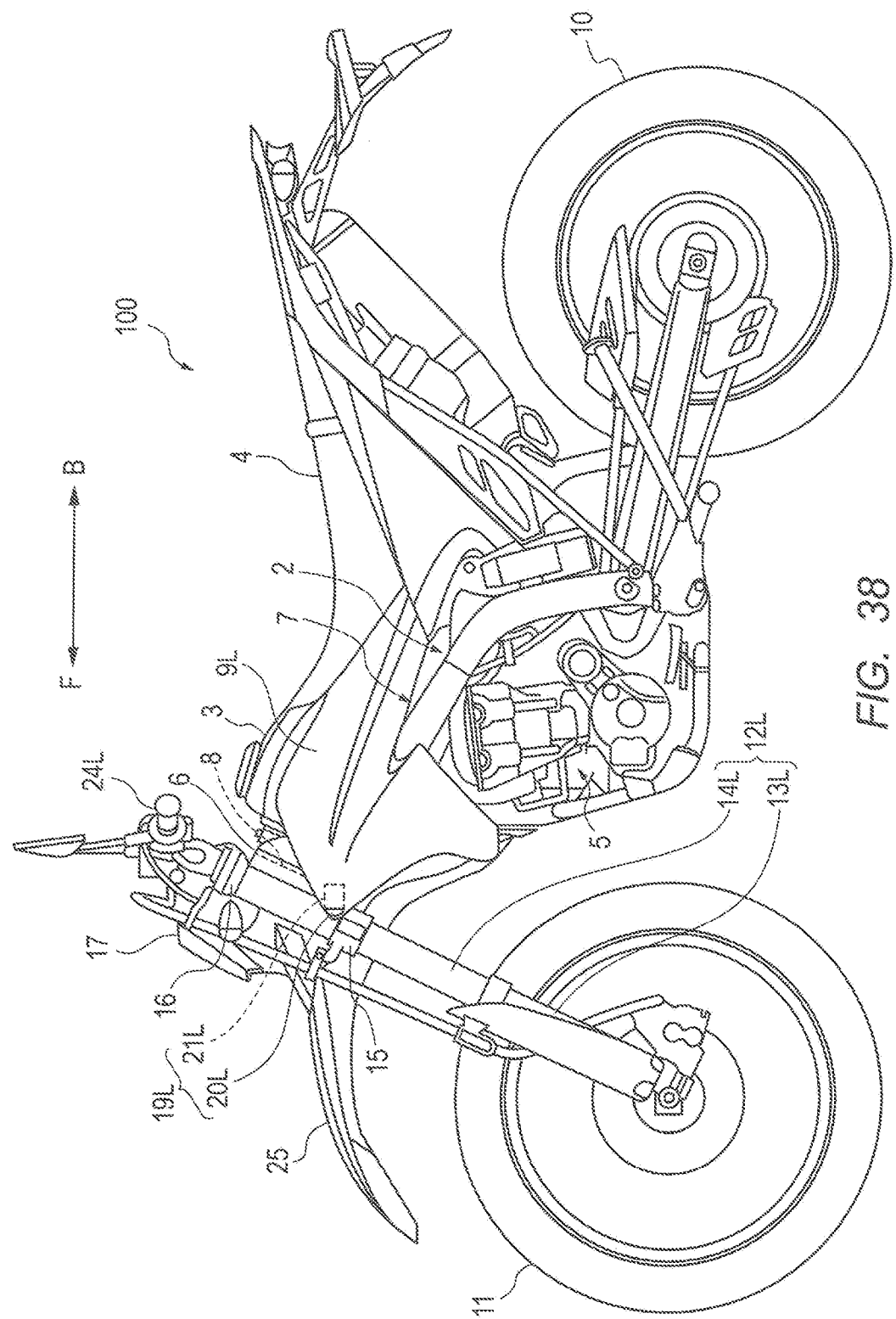
FIG. 38 is a side view illustrating the straddled vehicle according to Embodiment 4 of the present invention.
Figure 39:
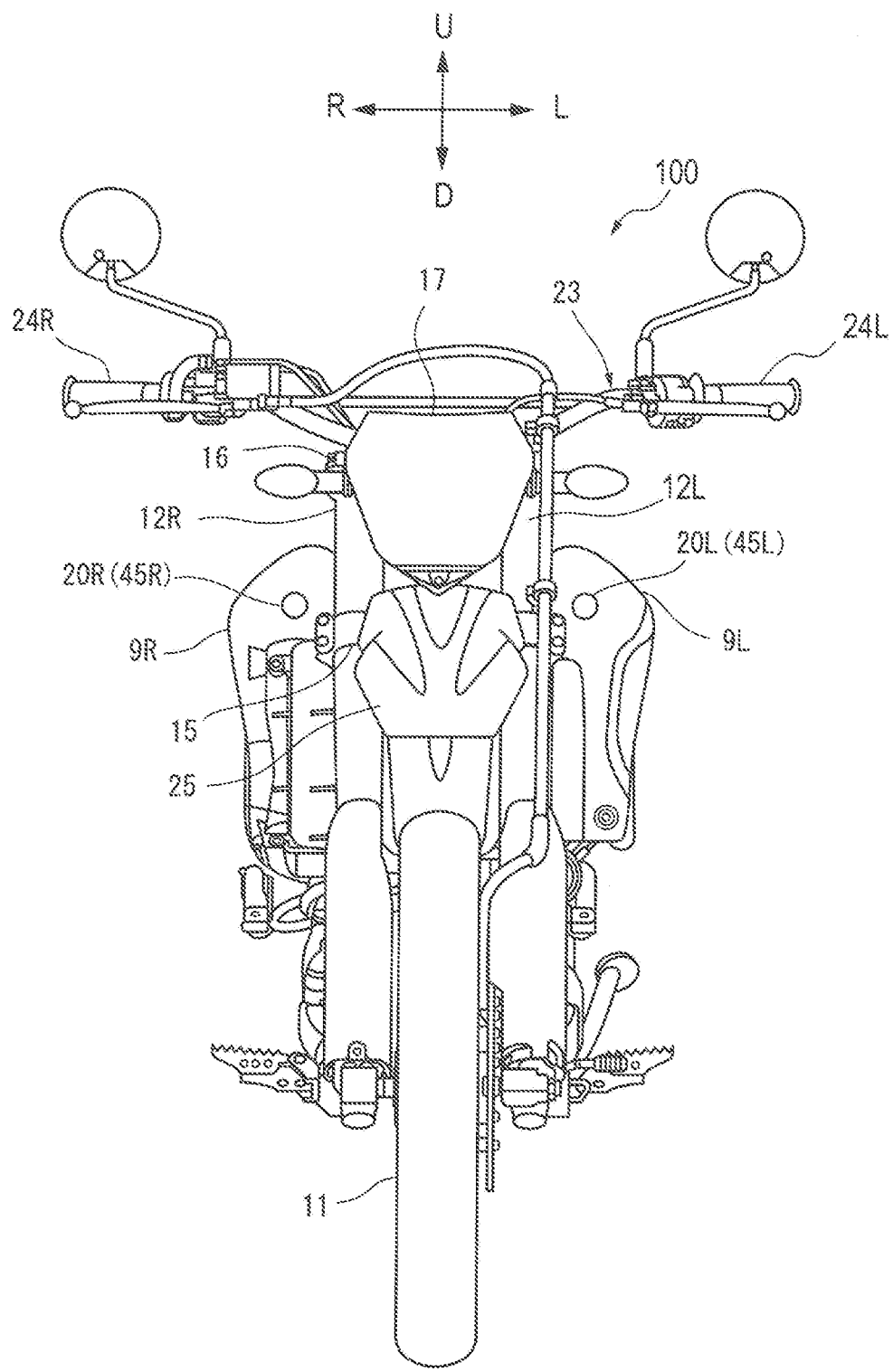
FIG. 39 is a front view of the straddled vehicle according to Embodiment 4 of the present invention.
Figure 40:
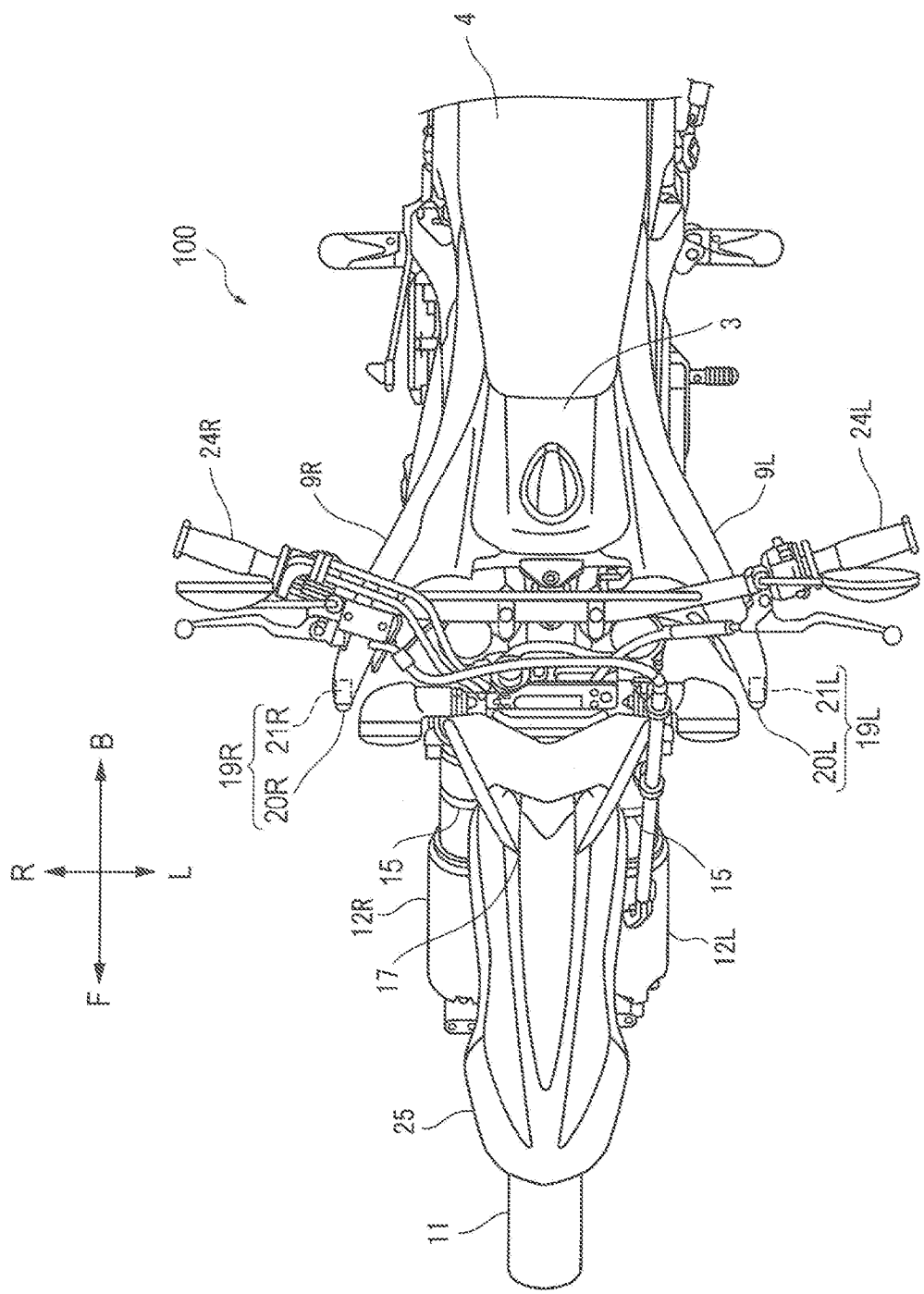
FIG. 40 is a plan view of the straddled vehicle according to Embodiment 4 of the present invention.

FIG. 38 is a side view illustrating straddled vehicle 100 according to Embodiment 4 of the present invention. FIG. 39 is a front view of straddled vehicle 100 according to Embodiment 4 of the present invention. FIG. 40 is a plan view of straddled vehicle 100 according to this Embodiment. In FIGS. 38 to 40, the same constituent elements as the constituent elements illustrated in FIGS. 1 to 3 are designated with the same reference signs, and the description will not be repeated.

As illustrated in FIGS. 38 to 40, straddled vehicle 100 includes body frame 2, fuel tank 3, seat 4, power unit 5, steering shaft 8, left cover section 9L, right cover section 9R, rear wheel 10, front wheel 11, left front-wheel support unit 12L, right front-wheel support unit 12R, lower bracket 15, upper bracket 16, front surface cover 17, left lamp unit 18L, right lamp unit 18R, and handlebar 23.

As illustrated in FIGS. 38 to 40, leftward highly-directional light unit 19L is fixed and supported by left cover 9L, and rightward highly-directional light unit 19R is fixed and supported by right cover 9R.

As illustrated in FIGS. 38 and 40, case 21L of leftward highly-directional light unit 19L is inside of left cover 9L, and case 21R of rightward highly-directional light unit 19R is inside of right cover 9R.

As illustrated in FIGS. 38 to 40, optical lens section 20L of leftward highly-directional light unit 19L is exposed to the outside of left cover 9L, and optical lens section 20R of rightward highly-directional light unit 19R is exposed to the outside of right cover 9R.

The configurations of leftward highly-directional light unit 19L and rightward highly-directional light unit 19R are already described in Embodiment 1, and the description will not be repeated here.

<Necessary Conditions of Highly-Directional Light Units>

Leftward highly-directional light unit 19L and rightward highly-directional light unit 19R are disposed to satisfy the front-view arrangement conditions and the side-view arrangement conditions described in Embodiment 1. As a result, in straddled vehicle 100 of this embodiment, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

<Additional Conditions of Highly-Directional Light Units>

In this Embodiment, leftward highly-directional light unit 19L and rightward highly-directional light unit 19R may be disposed to further satisfy at least one of the lens width conditions, the up-down direction symmetrical conditions, the front-rear direction symmetrical conditions, and the left-right direction symmetrical conditions, while satisfying the front-view arrangement conditions and the side-view arrangement conditions.

Variation 1 of Embodiment 4

In the configuration described below in variation 1 of Embodiment 4, the off-road straddled vehicle includes two leftward highly-directional light units and two rightward highly-directional light units.

Figure 41:
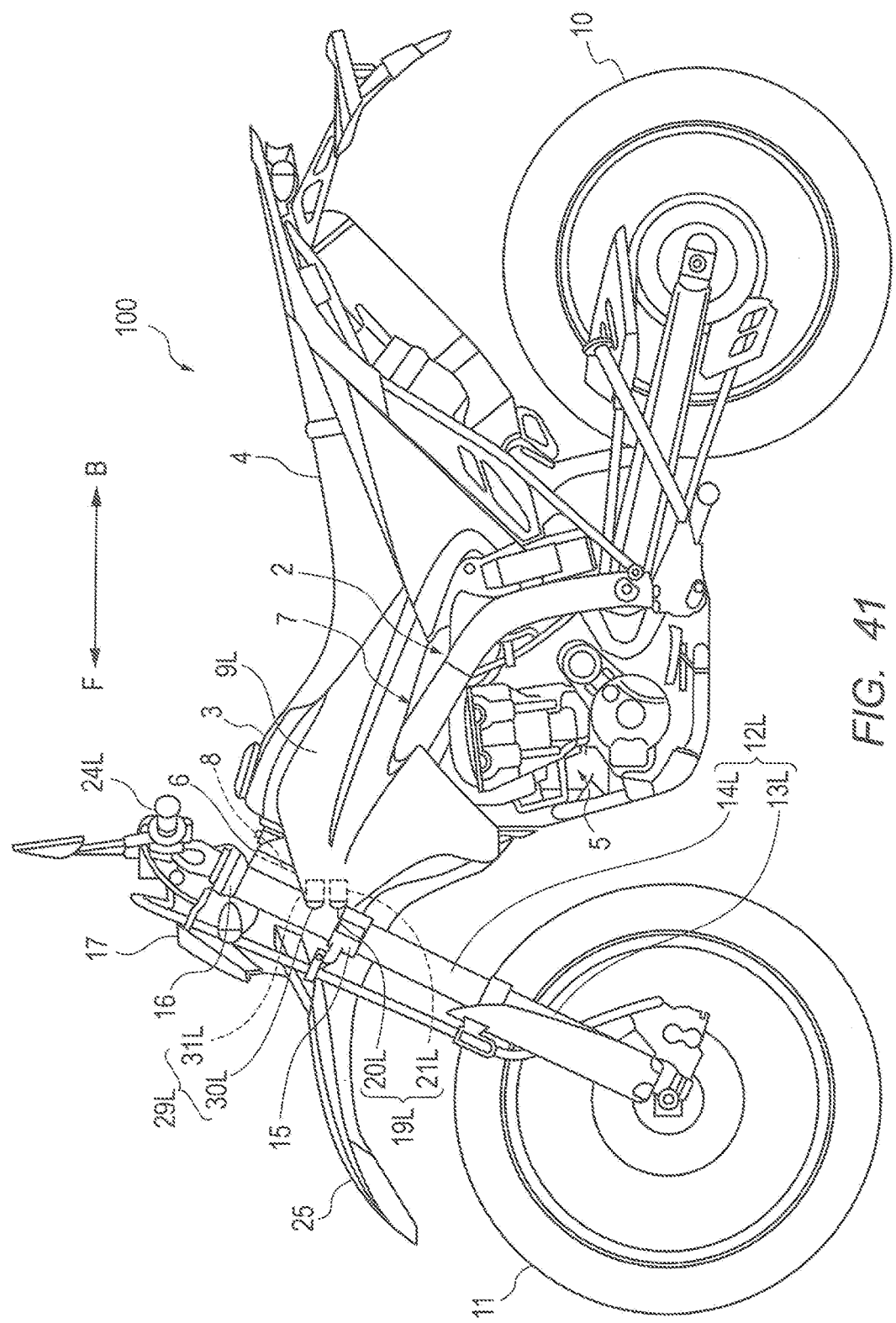
FIG. 41 is a side view illustrating the straddled vehicle according to Variation 1 of Embodiment 4 of the present invention.
Figure 42:
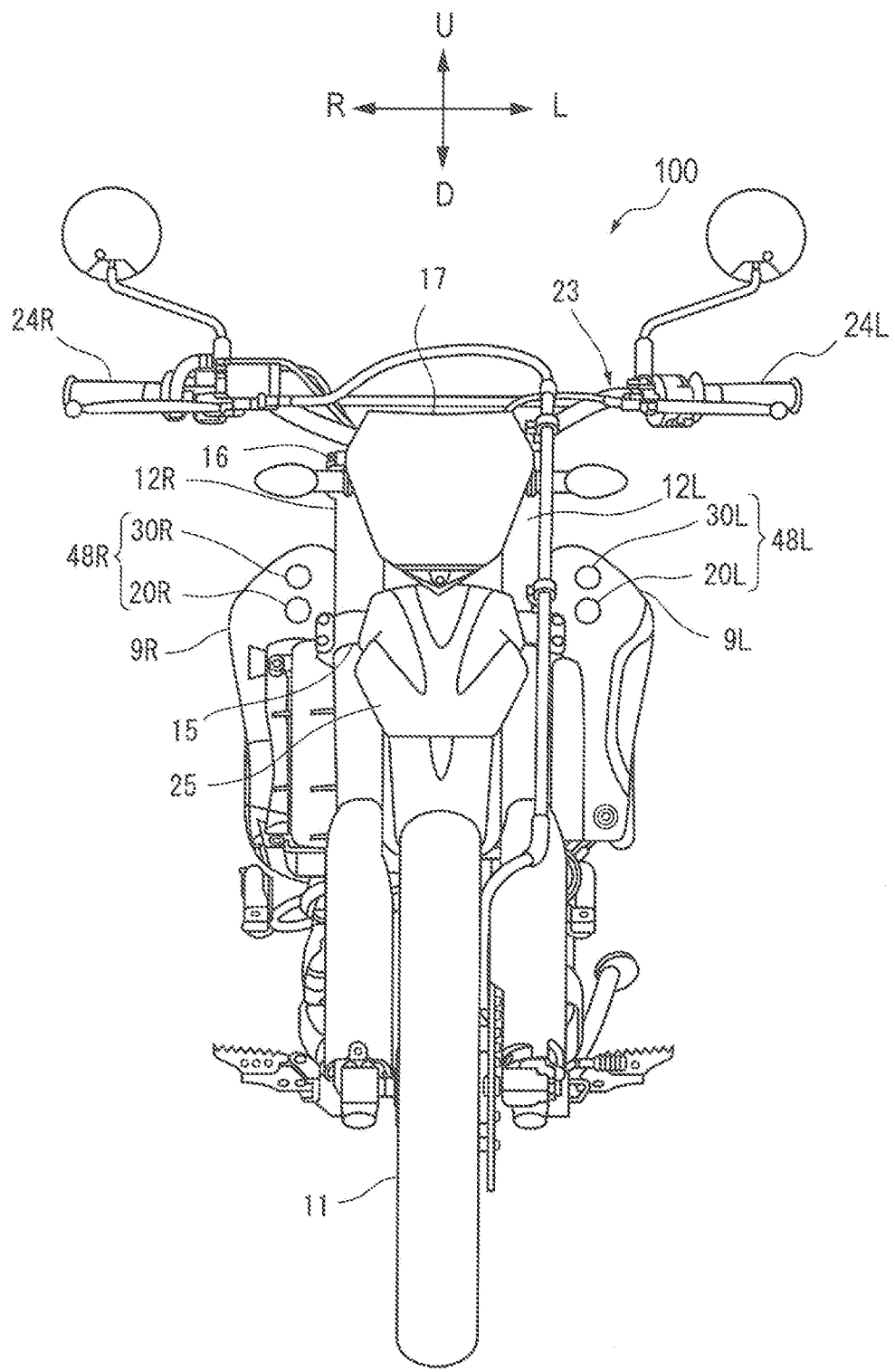
FIG. 42 is a front view illustrating the straddled vehicle according to Variation 1 of Embodiment 4 of the present invention.
Figure 43:
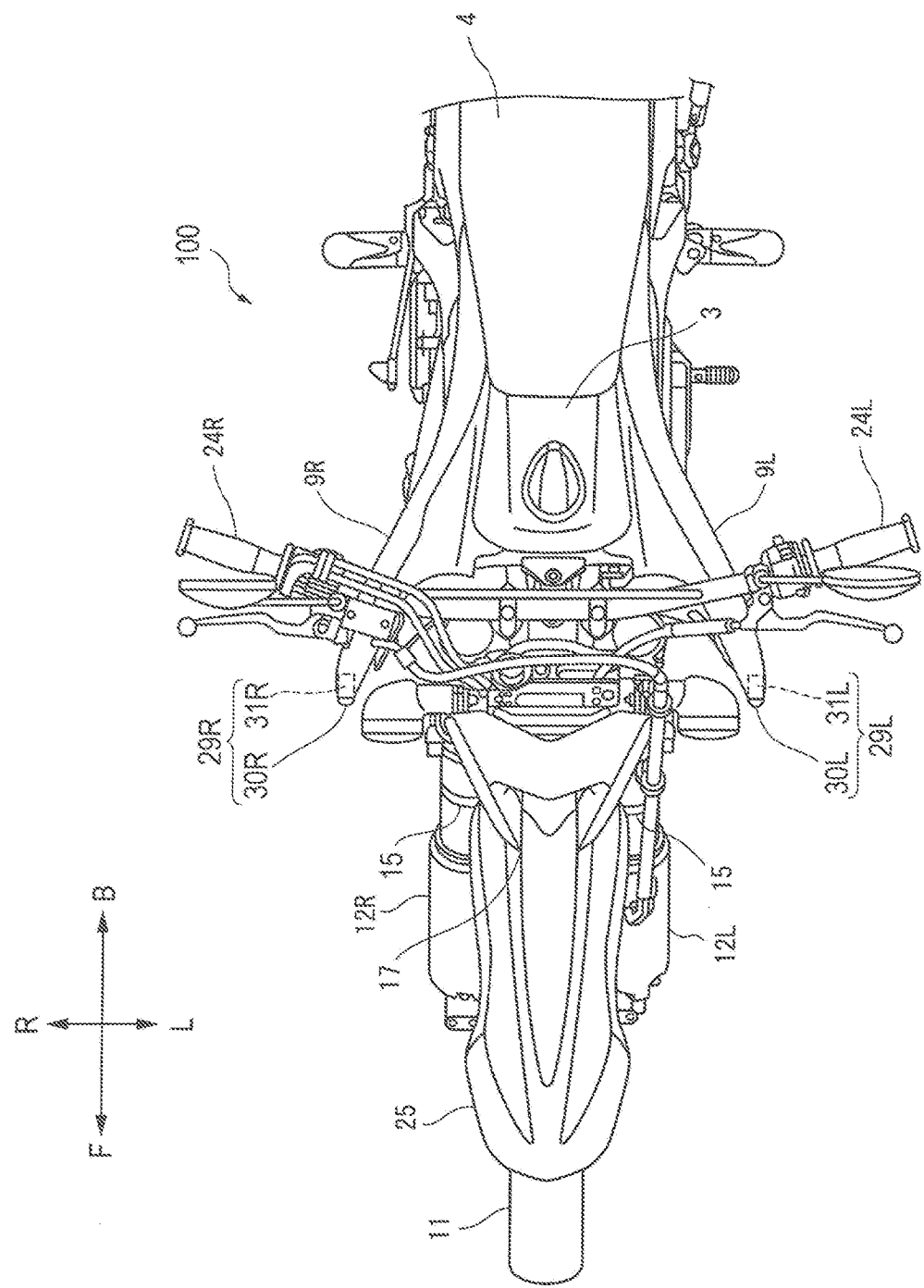
FIG. 43 is a plan view illustrating the straddled vehicle according to Variation 1 of Embodiment 4 of the present invention.

FIG. 41 is a side view of straddled vehicle 100 according to this variation. FIG. 42 is a front view of straddled vehicle 100 according to this variation. FIG. 43 is a plan view of straddled vehicle 100 according to this embodiment. In FIGS. 41 to 43, the same constituent elements as the constituent elements illustrated in FIGS. 1 to 3 are designated with the same reference signs, and the description will not be repeated.

As illustrated in FIGS. 41 to 43, leftward highly-directional light unit 29L is disposed above leftward highly-directional light unit 19L, and rightward highly-directional light unit 29R is disposed above rightward highly-directional light unit 19R (not illustrated). Leftward highly-directional light unit 29L is fixed and supported by left cover 9L, and rightward highly-directional light unit 29R is fixed and supported by right cover 9R.

As illustrated in FIGS. 41 and 43, case 31L of leftward highly-directional light unit 29L is inside of left cover 9L, and case 31R of rightward highly-directional light unit 29R is inside of right cover 9R.

As illustrated in FIGS. 41 to 43, optical lens section 30L of leftward highly-directional light unit 29L is exposed to the outside of left cover 9L, and optical lens section 30R of rightward highly-directional light unit 29R is exposed to the outside of right cover 9R.

The configurations of leftward highly-directional light unit 19L, leftward highly-directional light unit 29L, rightward highly-directional light unit 19R, and rightward highly-directional light unit 29R are already described in variation 1 of Embodiment 2, and the description will not be repeated here.

Leftward highly-directional light unit 19L, leftward highly-directional light unit 29L, rightward highly-directional light unit 19R, and rightward highly-directional light unit 29R have any of the configurations illustrated in FIGS. 20A to 20H.

<Necessary Conditions of Highly-Directional Light Units>

Leftward highly-directional light unit 19L, leftward highly-directional light unit 29L, rightward highly-directional light unit 19R, and rightward highly-directional light unit 29R are disposed to satisfy the front-view arrangement conditions and the side-view arrangement conditions described in Embodiment 1. As a result, in straddled vehicle 100 of this variation, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

<Additional Conditions of Highly-Directional Light Units>

In this variation, leftward highly-directional light unit 19L, leftward highly-directional light unit 29L, rightward highly-directional light unit 19R, and rightward highly-directional light unit 29R may be disposed to further satisfy at least one of the left-right length conditions, the up-down left-right length conditions, the up-down direction symmetrical conditions, the front-rear direction symmetrical conditions, and the left-right direction symmetrical conditions, while satisfying the front-view arrangement conditions and the side-view arrangement conditions. In this variation, when leftward highly-directional light unit 19L, leftward highly-directional light unit 29L, rightward highly-directional light unit 19R, and rightward highly-directional light unit 29R are disposed to satisfy at least one of the up-down direction symmetrical conditions, the front-rear direction symmetrical conditions, and the left-right direction symmetrical conditions, leftward highly-directional light unit 19L and rightward highly-directional light unit 19R form a pair of symmetrical lights, and leftward highly-directional light unit 29L and rightward highly-directional light unit 29R form a pair of symmetrical lights, for example. In this case, the pairs of symmetrical lights may be disposed to satisfy at least one of the up-down direction symmetrical conditions described with reference to FIGS. 11A to 11E, the front-rear direction symmetrical conditions described with reference to FIGS. 12A to 12C, and the left-right direction symmetrical conditions described with reference to FIG. 13.

Variation 2 of Embodiment 4

In the configuration described below in Variation 2 of Embodiment 4, the leftward highly-directional light unit and the rightward highly-directional light unit in the off-road straddled vehicle include optical lens sections each having a rectangular shape as viewed from the front side in the front-rear direction of the body frame.

Figure 44:
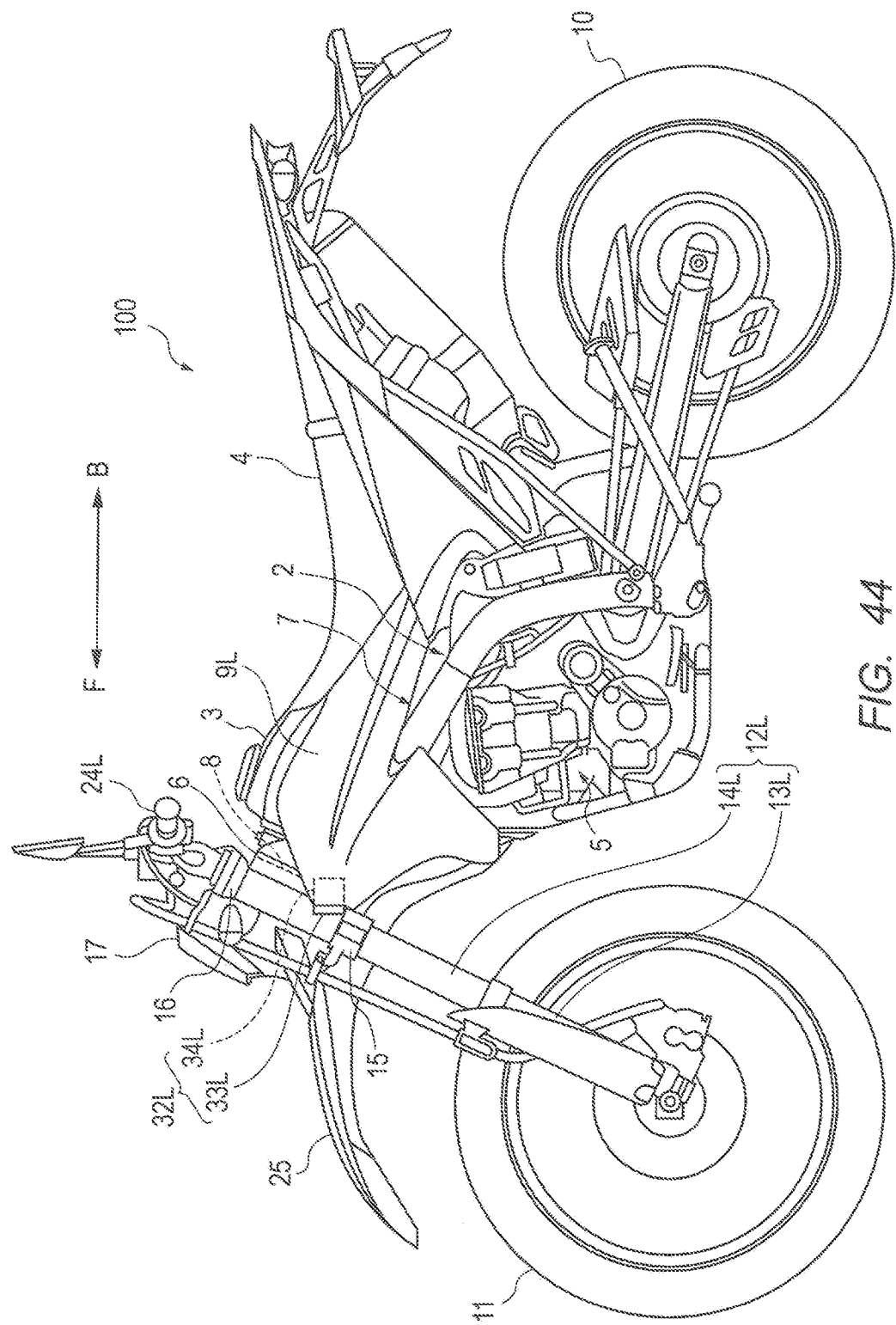
FIG. 44 is a side view illustrating the straddled vehicle according to Variation 2 of Embodiment 4 of the present invention.
Figure 45:
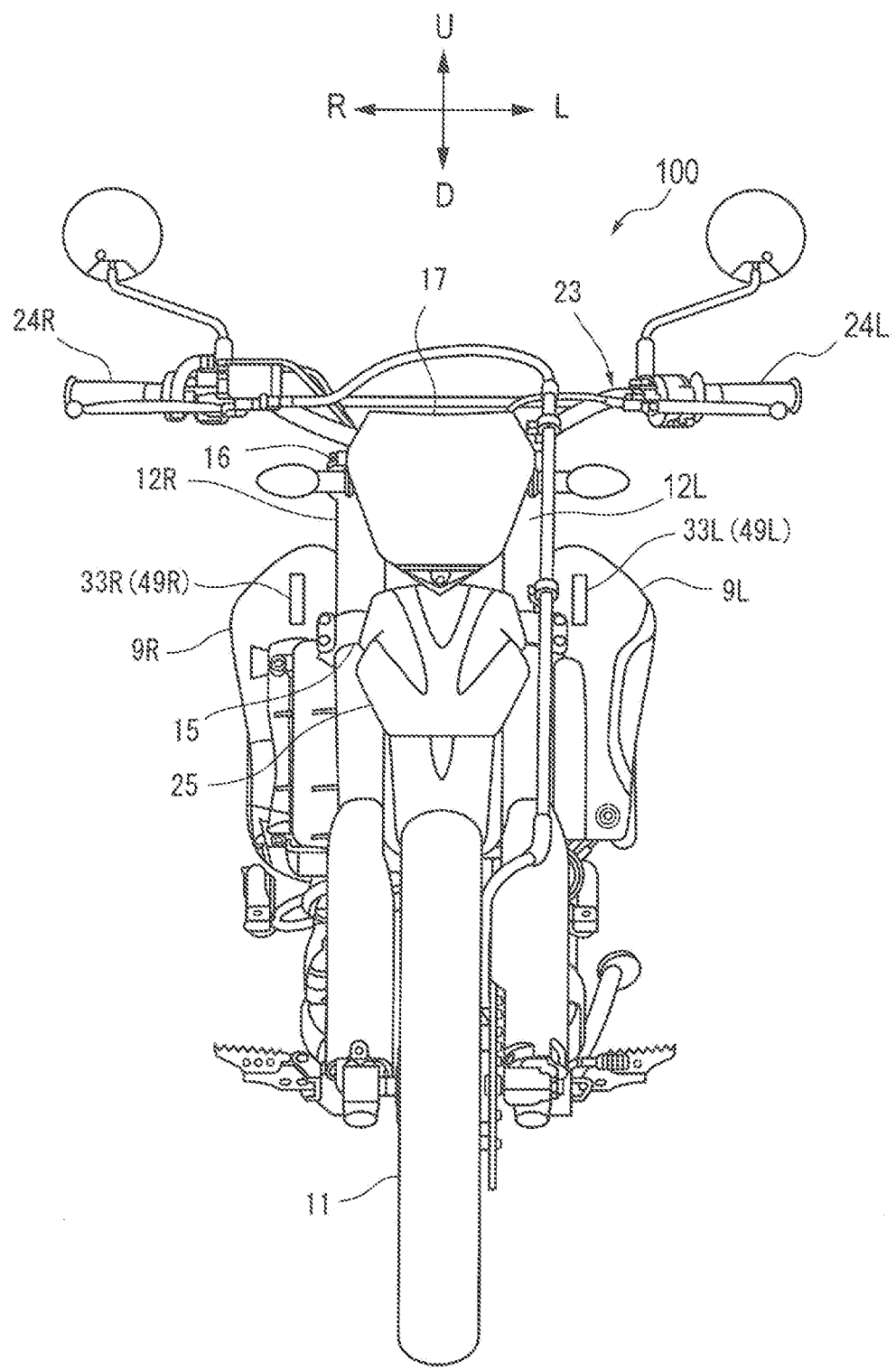
FIG. 45 is a front view illustrating the straddled vehicle according to Variation 2 of Embodiment 4 of the present invention.
Figure 46:
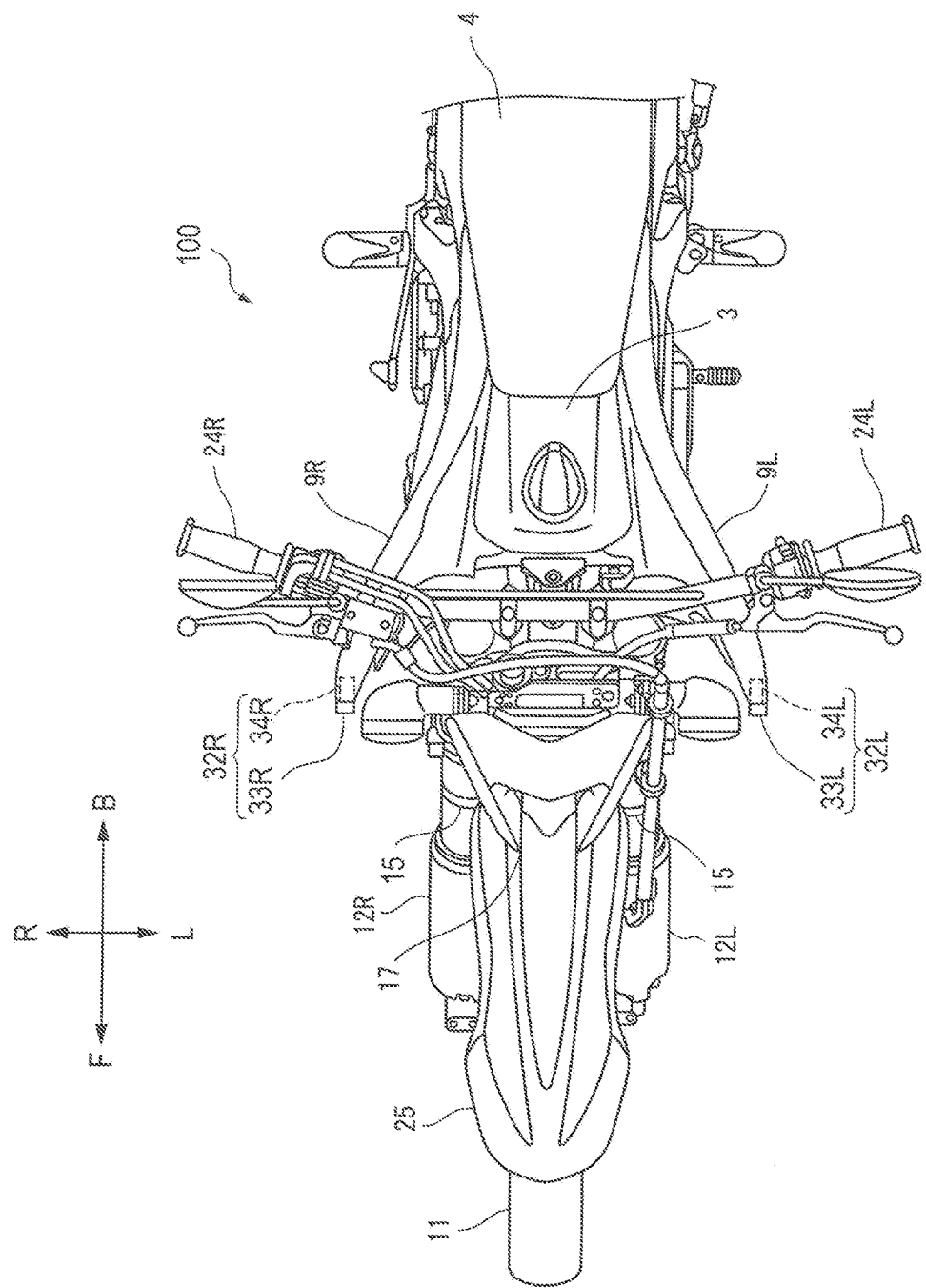
FIG. 46 is a plan view illustrating the straddled vehicle according to Variation 2 of Embodiment 4 of the present invention.

FIG. 44 is a side view of straddled vehicle 100 according to this variation. FIG. 45 is a front view of straddled vehicle 100 according to this variation. FIG. 46 is a plan view of straddled vehicle 100 according to this embodiment. In FIGS. 44 to 46, the same constituent elements as the constituent elements illustrated in FIGS. 1 to 3 are designated with the same reference signs, and the description will not be repeated.

As illustrated in FIGS. 44 to 46, leftward highly-directional light unit 32L is fixed and supported by left cover 9L, and rightward highly-directional light unit 32R is fixed and supported by right cover 9R.

As illustrated in FIGS. 44 and 46, case 34L of leftward highly-directional light unit 32L is inside of left cover 9L, and case 34R of rightward highly-directional light unit 32R is inside of right cover 9R.

As illustrated in FIGS. 44 to 46, optical lens section 33L of leftward highly-directional light unit 32L is exposed to the outside of left cover 9L, and optical lens section 33R of rightward highly-directional light unit 32R is exposed to the outside of right cover 9R.

As illustrated in FIG. 45, optical lens section 33L of leftward highly-directional light unit 32L and optical lens section 33R of rightward highly-directional light unit 32R have a rectangular shape that is long in the up-down direction of the body frame as viewed from the front side in the front-rear direction of body frame 2.

The configurations of leftward highly-directional light unit 32L and rightward highly-directional light unit 32R are already described in Variation 2 of Embodiment 2, and the description will not be repeated here.

<Necessary Conditions of Highly-Directional Light Units>

Leftward highly-directional light unit 32L and rightward highly-directional light unit 32R are disposed to satisfy the front-view arrangement conditions and the side-view arrangement conditions described in Embodiment 1. As a result, in straddled vehicle 100 of this embodiment, the highly-directional light unit including the light emitting section that emits highly-directional light and the optical lens section that refracts the light from the light emitting section to form a light distribution of at least part of the main beam or the dipped beam can be provided, an increase in the size of the body section of the straddled vehicle forward of the steering shaft in the left-right direction and the front-rear direction of the body frame can be limited while a space can be secured forward of the steering shaft.

<Additional Conditions of Highly-Directional Light Units>

In this variation, leftward highly-directional light unit 32L and rightward highly-directional light unit 32R may be disposed to further satisfy at least one of the lens width conditions, the up-down direction symmetrical conditions, the front-rear direction symmetrical conditions, and the left-right direction symmetrical conditions, while satisfying the front-view arrangement conditions and the side-view arrangement conditions.

The additional conditions of the highly-directional light units in the present embodiment have been described so far.

Note that the present invention is not limited to the embodiments. For example, as the left front-wheel support unit and the right front-wheel support unit of the present invention, more specifically, left front-wheel support unit 12L and right front-wheel support unit 12R in FIG. 4 have been presented. However, the left front-wheel support unit of the present invention may include: an upper member supported by the body frame; and a lower member that supports the front wheel and is displaceable in the up-down direction with respect to the upper member, and may be located on the left of the steering shaft in the left-right direction of the body frame. The right front-wheel support unit of the present invention may include: an upper member supported by the body frame; and a lower member that supports the front wheel and is displaceable in the up-down direction with respect to the upper member, and may be located on the right of the steering shaft in the left-right direction of the body frame. For example, both the left front-wheel support unit and the right front-wheel support unit may include a spring and a damper or include neither a spring nor a damper. One of the left front-wheel support unit and the right front-wheel support unit may include a spring and the other may include a damper. Alternatively, one of the left front-wheel support unit and the right front-wheel support unit may include a spring and a damper and the other may include neither a spring nor a damper.

The configuration of the highly-directional light unit of the present invention is not limited to the configurations illustrated in FIGS. 6A to 6C, and the highly-directional light unit only has to include: a light emitting section that emits highly-directional light; and an optical lens section that refracts the light from the light emitting section to form a light distribution, in which the light distribution formed by the optical lens section is a light distribution of at least part of the main beam or the dipped beam. For example, highly-directional light unit 19L illustrated in FIGS. 6A to 6C is a module of a unit of optical lens section 20L and light emitting section 51. However, optical lens section 20L and light emitting section 51 may not form a unit in highly-directional light unit 19L of the present invention. The configuration of the highly-directional light unit of the present invention is not limited to the configurations illustrated in FIGS. 6A to 6C, and part of the configurations illustrated in FIGS. 6A to 6C may be combined.

The straddled vehicle of the present invention may not be provided with the front surface cover that covers the front side of the body in at least part of the area between the right edge of the left front-wheel support unit and the left edge of the right front-wheel support unit and between the bottom end of the upper bracket and the top end of the lower bracket.

Note that the above embodiments have shown a bar-shaped handlebar which is long in the left-right direction of body frame 2 as an example of the handlebar, but, for example, a separate handlebar may be adopted which includes a left handlebar and a right handlebar, the left handlebar being fixed to the left part of the upper bracket and the right handlebar being fixed to the right part of the upper bracket. That is, the handlebar of the present invention can take any mode as long as it is long in the left-right direction of the body frame and integrally turns with the steering shaft by steering of the rider.

The straddled vehicle of the present invention may also include highly-directional light units apart from a light group if the light group (left light group and right light group) alone can radiate main beams and dipped beams required for the straddled vehicle. However, the light group preferably includes all the highly-directional light units.

The optical lens section of the highly-directional light unit of the present invention can have any configuration as long as the configuration includes a light-emitting section that emits highly-directional light and an optical lens section that refracts light of the light-emitting section and forms at least part of light distribution of main beam or dipped beam, and the shape as viewed from the front of the body frame in the front-rear direction is not limited. The shape of the optical lens section of the highly-directional light unit of the present invention as viewed from the front side in the front-rear direction of the body frame may be, for example, circular as illustrated in FIG. 2 and the like, elliptical as illustrated in FIG. 10, or rectangular as illustrated in FIG. 30 and the like, or may be other shapes.

When the leftward highly-directional light unit of the present invention is supported by the left cover, the entire leftward highly-directional light unit (for example, the optical lens section and the case) may be included inside of the left cover. When the rightward highly-directional light unit of the present invention is supported by the right cover, the entire rightward highly-directional light unit (for example, the optical lens section and the case) may be included inside of the right cover.

When the leftward highly-directional light unit of the present invention is supported by the left cover, the left lamp unit including the entire leftward highly-directional light unit (for example, the optical lens section and the case) may be provided outside of the left cover. When the rightward highly-directional light unit of the present invention is supported by the right cover, the right lamp unit including the entire rightward highly-directional light unit (for example, the optical lens section and the case) may be provided outside of the right cover.

When there are a plurality of leftward highly-directional light units of the present invention, at least one of the leftward highly-directional light units may be fixed and supported by the left front-wheel support unit, and at least one of the leftward highly-directional light units may be fixed and supported by the left cover. When there are a plurality of rightward highly-directional light units of the present invention, at least one of the rightward highly-directional light units may be fixed and supported by the right front-wheel support unit, and at least one of the rightward highly-directional light units may be fixed and supported by the right cover.

There may be three or more leftward highly-directional light units of the present invention, and there may be three or more rightward highly-directional light units of the present invention. In this case, the three or more leftward highly-directional light units and the three or more rightward highly-directional light units are disposed to satisfy the front-view arrangement conditions and the side-view arrangement conditions. The three or more leftward highly-directional light units and the three or more rightward highly-directional light units may be disposed to satisfy at least one of the left-right length conditions, the up-down left-right length conditions, the up-down direction symmetrical conditions, the front-rear direction symmetrical conditions, and the left-right direction symmetrical conditions, in addition to the front-view arrangement conditions and the side-view arrangement conditions. It is preferable that the three or more leftward highly-directional light units and the three or more rightward highly-directional light units include: at least two main beam highly-directional light units in which a light distribution formed by the optical lens sections becomes at least part of a light distribution of main beam and at least two dipped beam highly-directional light units in which a light distribution formed by the optical lens sections becomes at least part of a light distribution of dipped beam.

The optical lens section of the leftward highly-directional light unit and the optical lens section of the rightward highly-directional light unit of the present invention are not limited to the examples of arrangement illustrated in FIGS. 7 and 8. More specifically, it is only necessary that in the left light group of the present invention, the top end section of the left optical lens body formed by the optical lens section of the highly-directional light unit included in the left light group is disposed below the bottom edge of the handlebar in the up-down direction of the body frame as viewed from the front side in the front-rear direction of the body frame, the bottom end section of the left optical lens body is disposed above the bottom end section of the lower bracket in the up-down direction of the body frame as viewed from the front side in the front-rear direction of the body frame, the left end section of the left optical lens body is disposed on the right of the right end section of the left grip in the left-right direction of the body frame as viewed from the front side in the front-rear direction of the body frame, and the right end section of the left optical lens body is disposed on the left of the right edge of the left front-wheel support unit in the left-right direction of the body frame as viewed from the front side in the front-rear direction of the body frame. It is only necessary that in the right light group of the present invention, the top end section of the right optical lens body formed by the optical lens section of the highly-directional light unit included in the right light group is disposed below the bottom edge of the handlebar in the up-down direction of the body frame as viewed from the front side in the front-rear direction of the body frame, the bottom end section of the right optical lens body is disposed above the bottom end section of the lower bracket in the up-down direction of the body frame as viewed from the front side in the front-rear direction of the body frame, the right end section of the right optical lens body is disposed on the left of the left end section of the right grip in the left-right direction of the body frame as viewed from the front side in the front-rear direction of the body frame, and the left end section of the right optical lens body is disposed on the right of the left edge of the right front-wheel support unit in the left-right direction of the body frame as viewed from the front side in the front-rear direction of the body frame.

The leftward highly-directional light unit and the rightward highly-directional light unit of the present invention are not limited to the examples of arrangement illustrated in FIGS. 14A to 14C and 25A to 25C as viewed in the left-right direction of the body frame, at any of the steering angles from the steering angle at the time that the handlebar is steered to the extreme left with the rear wheel in the upright state to the steering angle at the time that the handlebar is steered to the extreme right. More specifically, it is only necessary that at least part of the leftward highly-directional light unit of the present invention is provided at a position overlapping the turn range of the left front-wheel support unit as viewed from the left side in the left-right direction of the body frame. It is only necessary that at least part of the rightward highly-directional light unit of the present invention is provided at a position overlapping the turn range of the right front-wheel support unit.

The maximum lens width in the left-right direction of each of the optical lens sections of the present invention is not limited to the lengths illustrated in FIGS. 9 and 10. More specifically, the maximum lens width in the left-right direction of the optical lens section of the leftward highly-directional light unit of the present invention may be shorter than the length between the left edge of the left front-wheel support unit and the right end of the left grip in the left-right direction of the body frame as viewed from the front side in the front-rear direction of the body frame. The maximum lens width in the left-right direction of the optical lens section of the rightward highly-directional light unit of the present invention may be shorter than the length between the right edge of the right front-wheel support unit and the left end of the right grip in the left-right direction of the body frame as viewed from the front side in the front-rear direction of the body frame.

When one leftward highly-directional light unit of the present invention and one rightward highly-directional light unit of the present invention form a pair of symmetrical lights, the pair of symmetrical lights are not limited to the examples of arrangement illustrated in FIGS. 11A to 13. More specifically, it is only necessary that at least part of the optical lens section of one of the highly-directional light units of the pair of symmetrical lights is below the top end of the optical lens section of the other highly-directional light unit of the pair of symmetrical lights in the up-down direction of the body frame and above the bottom end of the optical lens section of the other highly-directional light unit of the pair of symmetrical lights in the up-down direction of the body frame, as viewed from the front side in the front-rear direction of the body frame. It is only necessary that at least part of one of the highly-directional light units of the pair of symmetrical lights is behind the front end of the other highly-directional light unit of the pair of symmetrical lights in the front-rear direction of the body frame and forward of the back end of the other highly-directional light unit of the pair of symmetrical lights in the front-rear direction of the body frame, as viewed from above in the up-down direction of the body frame. It is only necessary that the length from the center of the optical lens section of the leftward highly-directional light unit of the pair of symmetrical lights to the center virtual line is greater than the length from the left end of the optical lens section of the rightward highly-directional light unit of the pair of symmetrical lights to the center virtual line and smaller than the length from the right end of the optical lens section of the rightward highly-directional light unit of the pair of symmetrical lights to the center virtual line, as viewed from the front side in the front-rear direction of the body frame. It is only necessary that the length from the center of the optical lens section of the rightward highly-directional light unit of the pair of symmetrical lights to the center virtual line is greater than the length from the right end of the optical lens section of the leftward highly-directional light unit of the pair of symmetrical lights to the center virtual line and smaller than the length from the left end of the optical lens section of the leftward highly-directional light unit of the pair of symmetrical lights to the center virtual line, as viewed from the front side in the front-rear direction of the body frame.

When there are a plurality of leftward highly-directional light units of the present invention and a plurality of rightward highly-directional light units of the present invention, the length in the left-right direction of the body frame between the left end of the optical lens section of the leftward highly-directional light unit at the leftmost position in the left-right direction of the body frame in the plurality of leftward highly-directional light units and the right end of the optical lens section of the leftward highly-directional light unit at the rightmost position in the left-right direction of the body frame in the plurality of leftward highly-directional light units as viewed from the front side in the front-rear direction of the body frame and the length in the left-right direction of the body frame between the right end of the optical lens section of the rightward highly-directional light unit at the rightmost position in the left-right direction of the body frame in the plurality of rightward highly-directional light units and the left end of the optical lens section of the rightward highly-directional light unit at the leftmost position in the left-right direction of the body frame in the plurality of rightward highly-directional light units as viewed from the front side in the front-rear direction of the body frame are not limited to the lengths illustrated in FIG. 18. More specifically, the length in the left-right direction of the body frame between the left end of the optical lens section of the leftward highly-directional light unit at the leftmost position in the left-right direction of the body frame in the plurality of leftward highly-directional light units of the present invention and the right end of the optical lens section of the leftward highly-directional light unit at the rightmost position in the left-right direction of the body frame of the plurality of leftward highly-directional light units may be shorter than the length in the left-right direction of the body frame between the left end of the left front-wheel support unit and the right end of the left grip, as viewed from the front side in the front-rear direction of the body frame. The length in the left-right direction of the body frame between the right end of the optical lens section of the rightward highly-directional light unit at the rightmost position in the left-right direction of the body frame in the plurality of rightward highly-directional light units of the present invention and the left end of the optical lens section of the rightward highly-directional light unit at the leftmost position in the left-right direction of the body frame in the plurality of rightward highly-directional light units of the present invention may be shorter than the length in the left-right direction of the body frame between the right end of the right front-wheel support unit and the left end of the right grip, as viewed from the front side in the front-rear direction of the body frame.

When there is one leftward highly-directional light unit of the present invention and one rightward highly-directional light unit of the present invention, the one leftward highly-directional light unit may be a highly-directional light unit for main beam in which the light distribution formed by the optical lens section is a light distribution of at least part of the main beam, and the one rightward highly-directional light unit may be a highly-directional light unit for dipped beam in which the light distribution formed by the optical lens section is a light distribution of at least part of the dipped beam. The one rightward highly-directional light unit may be a highly-directional light unit for main beam in which the light distribution formed by the optical lens section is a light distribution of at least part of the main beam, and the one leftward highly-directional light unit may be a highly-directional light unit for dipped beam in which the light distribution formed by the optical lens section is a light distribution of at least part of the dipped beam.

The present invention can be implemented in many different modes. This disclosure should be considered to provide embodiments of the principles of the present invention. Many illustrated embodiments are described here under the understanding that those embodiments are not intended to limit the present invention to the embodiments described and/or illustrated herein.

Several illustrated embodiments of the present invention have been described here. The present invention is not limited to the various preferred embodiments described herein. The present invention includes all embodiments including uniform elements, corrections, deletions, combinations (e.g., combinations of features that span various embodiments), improvements and/or variations that can be recognized by those skilled in the art based on this disclosure. Limitations of the claims should be broadly interpreted based on the terms used in the claims and should not be limited to the embodiments described in the present specification or prosecution of the present application. Such embodiments should be interpreted to be non-exclusive. For example, the terms such as "preferably" or "may be" are nonexclusive and mean "preferable but not limited to this" or "may be so but not limited to this."

The disclosures of Japanese Patent Applications No. 2014-120235 and No. 2014-120236 both filed on Jun. 11, 2014, and No. 2014-256393 filled on Dec. 18, 2014, including the specifications, drawings, and abstracts are incorporated herein by reference in their entirety.

INDUSTRIAL APPLICABILITY

The present invention is suitable for use in a straddled vehicle.

REFERENCE SIGNS LIST 1, 100 straddled vehicles
2 body frame
3 fuel tank
4 seat
5 power unit
6 head tube
7 body frame
8 steering shaft
9L left cover section
9R right cover section
10 rear wheel
11 front wheel
12L left front-wheel support unit
12R right front-wheel support unit
13L lower left member
13R lower right member
14L upper left member
14R upper right member
15 lower bracket
16 upper bracket
17 front surface cover
18L, 35L, 37L, 41L left lamp units
18R, 35R, 37R, 41R right lamp units
19L, 29L, 32L, 38L, 42L leftward highly-directional light units
19R, 29R, 32R, 38R, 42R rightward highly-directional light units
20L, 30L, 33L, 36L, 39L, 43L optical lens sections of leftward highly-directional light units
20R, 30R, 33R, 36R, 39R, 43R optical lens sections of rightward highly-directional light units
21L, 31L, 34L, 40L, 44L cases of leftward highly-directional light units
21R, 31R, 34R, 40R, 44R cases of rightward highly-directional light units
23 handlebar
24L left grip
24R right grip
25 fender
27 handlebar holder
45L, 46L, 47L, 48L, 49L left optical lens bodies
45R, 46R, 47R, 48R, 49R right optical lens bodies
50 substrate
51 light emitting section
52 heat sink
53 optical fiber
54 optical source
55 reflector
60, 61, 62, 63 parts

The invention claimed is:
1. A straddled vehicle comprising:
a body frame;
a front wheel portion;
a steering shaft turnably supported by the body frame;
an upper bracket having a central portion that is disposed at an upper portion of the steering shaft;

a lower bracket having a central portion that is disposed at a lower portion of the steering shaft;
a left front-wheel support unit disposed on a left of the steering shaft in a left-right direction of the body frame, the left front-wheel support unit connected to the steering shaft to turn integrally with the steering shaft, the left front-wheel support unit including
a left upper member supported by a left portion of the upper bracket and a left portion of the lower bracket, and
a left lower member that supports the front wheel portion and that is displaceable in an up-down direction with respect to the left upper member,
a right front-wheel support unit disposed on a right of the steering shaft in the left-right direction of the body frame, the right front-wheel support unit connected to the steering shaft to turn integrally with the steering shaft, the right front-wheel support unit including
a right upper member supported by a right portion of the upper bracket and a right portion of the lower bracket, and
a right lower member that supports the front wheel portion and that is displaceable in an up-down direction with respect to the right upper member,
a handlebar disposed at an upper part of the steering shaft, the handlebar being configured to turn integrally with the steering shaft and extending in the left-right direction of the body frame;
a left grip disposed at a left portion of the handlebar;
a right grip disposed at a right portion of the handlebar;
a left light group being disposed on the left of the steering shaft in the left-right direction of the body frame, the left light group forming a left light distribution, the left light distribution forming at least one of a main beam and a dipped beam, the left light group including at least one left highly-directional light unit each including
a left light-emitting section that emits highly-directional left light, and
a left optical lens section that refracts the left light to form at least part of the left light distribution; and
a right light group being disposed on the right of the steering shaft in the left-right direction of the body frame, the right light group forming a right light distribution which forms at least one of the main beam and the dipped beam, the right light group including at least one right highly-directional light unit each including
a right light-emitting section that emits highly-directional right light, and
a right optical lens section that refracts the right light to form at least part of the right light distribution,
wherein
in the left light group,
a top end portion of a left optical lens body, which is composed of the at least one left optical lens section, is disposed below a bottom edge of the handlebar in the up-down direction of the body frame as viewed from a front of the body frame in a front-rear direction,
a bottom end portion of the left optical lens body is disposed above a bottom end portion of the lower bracket in the up-down direction of the body frame as viewed from the front of the body frame in the front-rear direction,
a left end portion of the left optical lens body is disposed on a right of a right end portion of the left grip in the left-right direction of the body frame as viewed from the front of the body frame in the front-rear direction,
a right end portion of the left optical lens body is disposed on a left of a right edge of the left front-wheel support unit in the left-right direction of the body frame as viewed from the front of the body frame in the front-rear direction,
at least part of the left optical lens body is disposed on a left of a left edge of the left front-wheel support unit in the left-right direction of the body frame as viewed from the front of the body frame in the front-rear direction,
at least part of the left light group is disposed at a position overlapping with a turn range of the left front-wheel support unit as viewed from the left of the left-right direction of the body frame,
further wherein in the right light group,
a top end portion of a right optical lens body, which is composed of the at least one right optical lens section, is disposed below the bottom edge of the handlebar in the up-down direction of the body frame as viewed from the front of the body frame in the front-rear direction,
a bottom end portion of the right optical lens body is disposed above the bottom end portion of the lower bracket in the up-down direction of the body frame as viewed from the front of the body frame in the front-rear direction,
a right end portion of the right optical lens body is disposed on the left of a left end portion of the right grip in the left-right direction of the body frame as viewed from the front of the body frame in the front-rear direction,
a left end portion of the right optical lens body is disposed on the right of a left edge of the right front-wheel support unit in the left-right direction of the body frame as viewed from the front of the body frame in the front-rear direction,
at least part of the right optical lens body is disposed on a right of a right edge of the right front-wheel support unit in the left-right direction of the body frame as viewed from the front of the body frame in the front-rear direction, and
at least part of the right light group is disposed at a position overlapping with a turn range of the right front-wheel support unit as viewed from the right of the left-right direction of the body frame.

2. The straddled vehicle according to claim 1, wherein
a maximum lens width of the at least one left optical lens section in the left-right direction is shorter than a length between the left edge of the left front-wheel support unit and the right end portion of the left grip in the left-right direction of the body frame as viewed from the front in the front-rear direction of the body frame, and
a maximum lens width of the at least one right optical lens section in the left-right direction is shorter than a length between the right edge of the right front-wheel support unit and the left end portion of the right grip in the left-right direction of the body frame as viewed from the front in the front-rear direction of the body frame.

3. The straddled vehicle according to claim 1, wherein
a length between the left end portion of the left optical lens body and the right end portion of the left optical lens body in the left-right direction of the body frame is shorter than a length between the left edge of the left front-wheel support unit and the right end portion of the left grip in the left-right direction of the body frame as viewed from the front in the front-rear direction of the body frame, and
a length between the right end portion of the right optical lens body and the left end portion of the right optical lens body in the left-right direction of the body frame is shorter than a length between the right edge of the right front-wheel support unit and the left end portion of the right grip in the left-right direction of the body frame as viewed from the front in the front-rear direction of the body frame.

4. The straddled vehicle according to claim 1, wherein, as viewed from the front of the body frame in the front-rear direction, at least part of the left optical lens body is disposed both
below the top end portion of the right optical lens body in the up-down direction of the body frame, and
above the bottom end portion of the right optical lens body in the up-down direction of the body frame.

5. The straddled vehicle according to claim 1, wherein, as viewed from the front of the body frame in the front-rear direction, at least part of the at least one left optical lens section is disposed both below
a top end portion of the at least one right optical lens section in the up-down direction of the body frame, and
above a bottom end portion of the at least one right optical lens section in the up-down direction of the body frame.

6. The straddled vehicle according to claim 1, wherein, as viewed from above the body frame in the up-down direction of the body frame, at least part of the at least one left highly-directional light unit is disposed both
behind a front end portion of the at least one right highly-directional light unit in the front-rear direction of the body frame, and
forward of a rear end portion of the at least one right highly-directional light unit in the front-rear direction of the body frame.

7. The straddled vehicle according to claim 1, wherein, in a case where a straight line passing through a center of the body frame in the up-down direction of the body frame is set to be a center virtual line,
as viewed from the front in the front-rear direction of the body frame, a length from a center of the at least one left optical lens section to the center virtual line is both
greater than a length from a left end portion of the at least one right optical lens section to the center virtual line as viewed from the front in the front-rear direction of the body frame, and
smaller than a length from a right end portion of the at least one right optical lens section to the center virtual line as viewed from the front in the front-rear direction of the body frame, and
as viewed from the front in the front-rear direction of the body frame, a length from a center of the at least one right optical lens section to the center virtual line is both
greater than a length from a right end portion of the at least one left optical lens section to the center virtual line as viewed from the front in the front-rear direction of the body frame, and
smaller than a length from a left end portion of the at least one left optical lens section to the center virtual line as viewed from the front in the front-rear direction of the body frame.

8. The straddled vehicle according to claim 1, wherein
at least one of the at least one left highly-directional light unit is supported by the left front-wheel support unit, and
at least one of the at least one right highly-directional light unit is supported by the right front-wheel support unit.

9. The straddled vehicle according to claim 1, further comprising:
a left cover section that covers at least a left side of the body frame; and
a right cover section that covers at least a right side of the body frame, wherein
at least one of the at least one left highly-directional light unit in the left light group is supported by the left cover section, and
at least one of the at least one right highly-directional light unit in the right light group is supported by the right cover section.

10. The straddled vehicle according to claim 1, wherein
a length between the top end portion of the left optical lens body and the bottom end portion of the left optical lens body in the up-down direction of the body frame is longer than a length between the left end portion of the left optical lens body and the right end portion of the left optical lens body in the left-right direction of the body frame, and
a length between the top end portion of the right optical lens body and the bottom end portion of the right optical lens body in the up-down direction of the body frame is longer than a length between the right end portion of the right optical lens body and the left end portion of the right optical lens body in the left-right direction of the body frame.

11. The straddled vehicle according to claim 1, wherein
the left light distribution forms the main beam from the at least one of the main beam and the dipped beam,
the right light distribution forms the dipped beam from the at least one of the main beam and the dipped beam,
the at least one left highly-directional light unit includes two left highly-directional light units that each forms the respective part of the left light distribution to be at least part of a light distribution of the main beam, and
the at least one right highly-directional light units includes two right highly-directional light units that each forms the respective part of the right light distribution to be at least part of a light distribution of the dipped beam.

12. The straddled vehicle according to claim 1, wherein
the left light distribution forms the main beam from the at least one of the main beam and the dipped beam,
the right light distribution forms the dipped beam from the at least one of the main beam and the dipped beam,
the at least one left highly-directional light unit includes two left highly-directional light units, wherein
a first of the left highly-directional light units forms the respective part of the left light distribution to be at least part of a light distribution of the main beam, and
a second of the left highly-directional light units forms the respective part of the left light distribution to be at least part of a light distribution the dipped beam, and
the at least one right highly-directional light unit includes two right highly-directional light units, wherein
a first of the right highly-directional light units forms the respective part of the right light distribution to be at least part of the light distribution of the main beam, and a second of the right highly-directional light units forms the respective part of the right light distribution to be at least part of the light distribution of the dipped beam.

13. The straddled vehicle according to claim 1, further comprising
a front surface cover that covers, in the front-rear direction of the body frame, a front side of at least part of an area when as viewed from the front side in the front-rear direction of the body frame is formed
between the right edge of the left front-wheel support unit and the left edge of the right front-wheel support unit, and
between a bottom end portion of the upper bracket and a top end portion of the lower bracket.

14. The straddled vehicle according to claim 1, wherein
at least one of an electric part and an electronic part, other than the left and right highly-directional light units, of a throttle wire, a brake wire, a brake hose, a clutch wire, a wire harness and a key cylinder is disposed between
as viewed from the front of the body frame in the front-rear direction, a left virtual line passing through a right end portion of the at least one left optical lens section and which extends in the up-down direction of the body frame, and
as viewed from the front of the body frame in the front-rear direction, a right virtual line passing through a left end portion of the at least one right optical lens section and which extends in the up-down direction of the body frame, and
the at least one of the electric part and the electronic part further being, as viewed from above in the up-down direction of the body frame, behind a front end of the left light group and the right light group in the front-rear direction of the body frame and forward of a rear end of the left light group and the right light group in the front-rear direction of the body frame.

15. The straddled vehicle according to claim 1, wherein
each of the at least one left highly-directional light unit is a module including the respective one of the at least one left light-emitting section and the respective one of the at least one left optical lens section,
each of the at least one right highly-directional light unit is a module including the respective one of the at least one right light-emitting section and the respective one of the at least one right optical lens section.

16. The straddled vehicle according to claim 1, wherein
the at least one left highly-directional light unit includes two of the left highly-directional light units that each forms the respective part of the left light distribution to form at least part of a light distribution of the dipped beam,
the at least one right highly-directional light unit includes two of the right highly-directional light units that each forms the respective part of the right light distribution to form at least part of a light distribution of the main beam.

* * * * *